US012633858B2

(12) United States Patent     (10) Patent No.:   US 12,633,858 B2

Komiya et al.     (45) Date of Patent:    May 19, 2026

(54) CURRENT MEASUREMENT APPARATUS, CURRENT MEASUREMENT PROGRAM, AND CURRENT MEASUREMENT METHOD

(71) Applicant: DENSO CORPORATION, Kariya-city (JP)

(72) Inventors: Kazuki Komiya, Kariya-city (JP); Yasuaki Aoki, Kariya-city (JP)

(73) Assignee: DENSO CORPORATION, Kariya (JP)

( * ) Notice: Subject to any disclaimer, the term of this patent is extended or adjusted under 35 U.S.C. 154(b) by 143 days.

(21) Appl. No.: 18/581,684

(22) Filed: Feb. 20, 2024

(65) Prior Publication Data

US 2024/0195337 A1     Jun. 13, 2024

Related U.S. Application Data

(63) Continuation of application No. PCT/JP2022/030823, filed on Aug. 12, 2022.

(30) Foreign Application Priority Data

Aug. 19, 2021   (JP) ................................. 2021-134164
Aug. 5, 2022   (JP) ................................. 2022-125679

(51) Int. Cl.
    *H02P 5/74*       (2006.01)
    *H02P 5/46*       (2006.01)
        (Continued)

(52) U.S. Cl.
    CPC ................ *H02P 23/14* (2013.01); *H02P 5/46* (2013.01); *H02P 21/141* (2013.01); *H02P 21/22* (2016.02); *H02P 27/06* (2013.01)

(58) Field of Classification Search
    CPC .......... H02P 21/22; H02P 21/141; H02P 5/46; H02P 5/74; H02P 23/14; H02P 27/06
           (Continued)

(56) References Cited

U.S. PATENT DOCUMENTS 7,960,927 B2 *   6/2011   Chen ....................... H02P 27/08
                                    318/608
2011/0224937 A1    9/2011   Nishimura
                 (Continued)

FOREIGN PATENT DOCUMENTS

JP      2004061217 A   *   2/2004
JP      2013051871 A   *   3/2013

OTHER PUBLICATIONS

JP2004061217_A_English_Machine_Translation (Year: 2004).*
JP2013051871_A_English_Machine_Translation (Year: 2013).*

*Primary Examiner* — Gabriel Agared
(74) *Attorney, Agent, or Firm* — Oliff PLC

(57)          ABSTRACT

A current measurement apparatus includes a corrector. The corrector calculates an error arising in a measured value of at least one target phase current due to magnetic flux generated from each of multiphase power lines in accordance with an error factor defined for each multiphase power line with respect to the at least one target phase current. The error factor defined for each multiphase power line with respect to the at least one target phase current is a constant value or a variable determined based on (i) one or more shields located between the current sensor and the corresponding multiphase power line and (ii) a distance between the current sensor and the corresponding multiphase power line. The corrector corrects the measured value of the at least one target phase current based on the calculated error.

18 Claims, 21 Drawing Sheets

(51) Int. Cl.
  *H02P 21/14*      (2016.01)
  *H02P 21/22*      (2016.01)
  *H02P 23/14*      (2006.01)
  *H02P 27/06*      (2006.01)

(58) Field of Classification Search
  USPC .................................................. 318/400.01
  See application file for complete search history.

(56)            References Cited

U.S. PATENT DOCUMENTS

2015/0028792 A1*  1/2015  Tang ....................... H02P 25/02
                                           318/798
2017/0201201 A1*  7/2017  Aoki ........................ H02P 6/16
2019/0317136 A1   10/2019  Roberts et al.

* cited by examiner

FIG.2

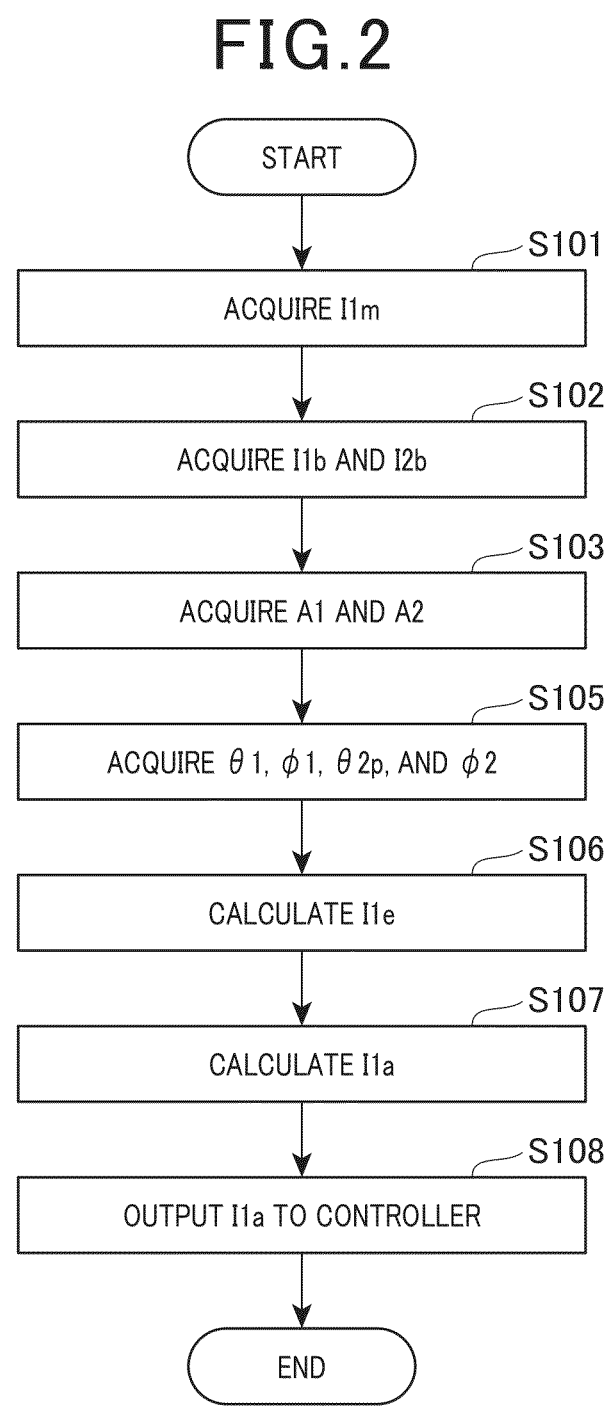

START

S101
ACQUIRE I1m

S102
ACQUIRE I1b AND I2b

S103
ACQUIRE A1 AND A2

S105
ACQUIRE $\theta 1$, $\phi 1$, $\theta 2p$, AND $\phi 2$

S106
CALCULATE I1e

S107
CALCULATE I1a

S108
OUTPUT I1a TO CONTROLLER

END

FIG.3

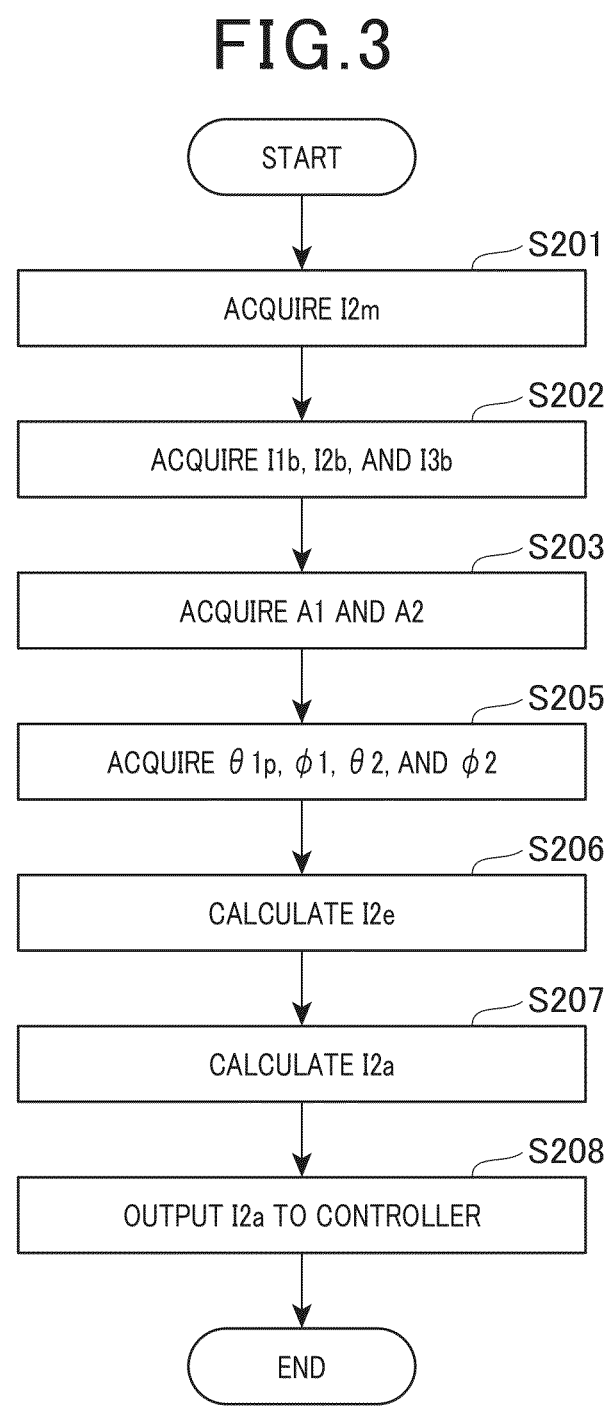

START $\downarrow$

S201
ACQUIRE I2m $\downarrow$

S202
ACQUIRE I1b, I2b, AND I3b $\downarrow$

S203
ACQUIRE A1 AND A2

$\downarrow$

S205
ACQUIRE $\theta 1p$, $\phi 1$, $\theta 2$, AND $\phi 2$ $\downarrow$

S206
CALCULATE I2e $\downarrow$

S207
CALCULATE I2a $\downarrow$

S208
OUTPUT I2a TO CONTROLLER $\downarrow$

END

FIG.7

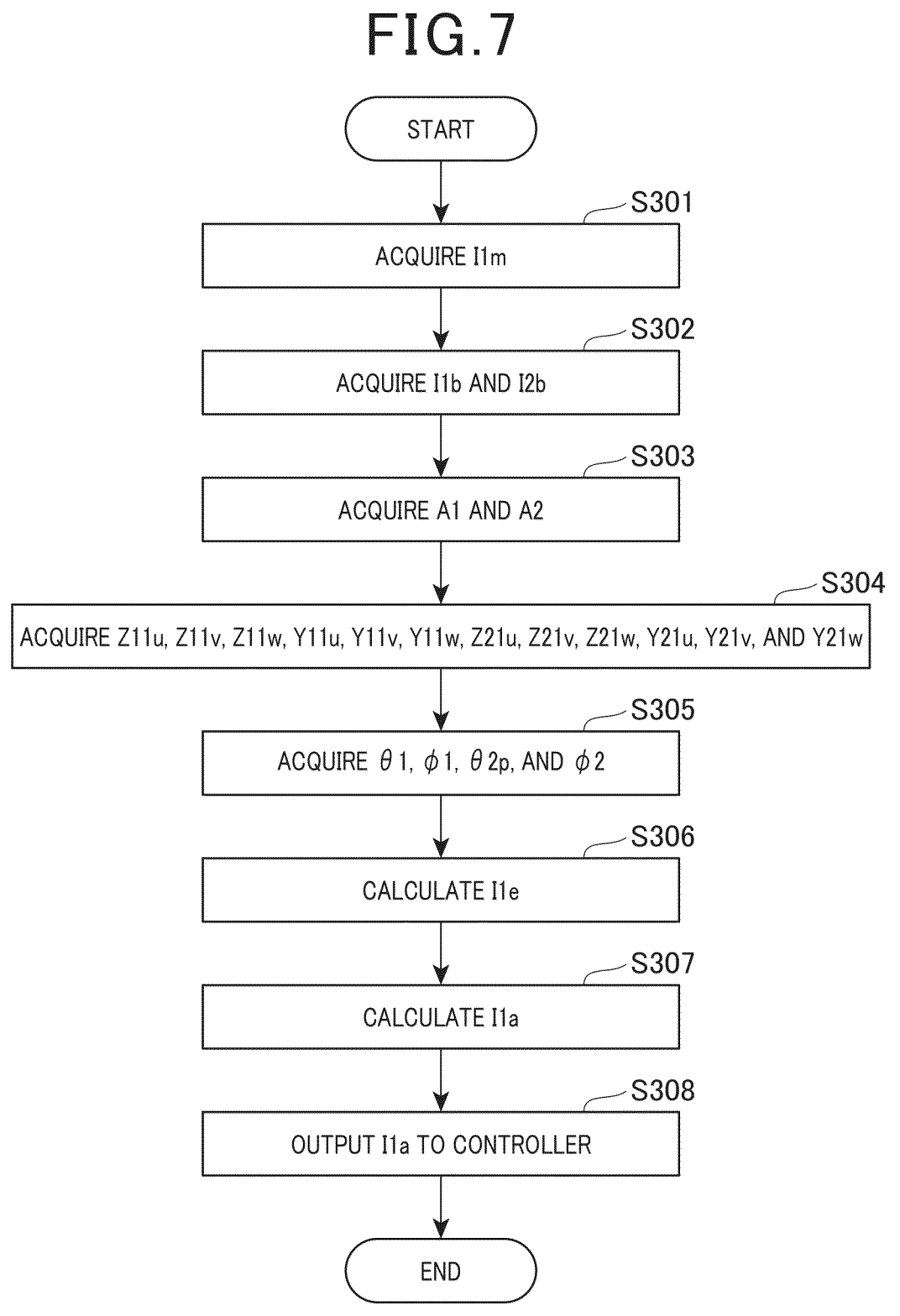

START

S301
ACQUIRE I1m

S302
ACQUIRE I1b AND I2b

S303
ACQUIRE A1 AND A2

S304
ACQUIRE Z11u, Z11v, Z11w, Y11u, Y11v, Y11w, Z21u, Z21v, Z21w, Y21u, Y21v, AND Y21w

S305
ACQUIRE $\theta 1$, $\phi 1$, $\theta 2p$, AND $\phi 2$

S306
CALCULATE I1e

S307
CALCULATE I1a

S308
OUTPUT I1a TO CONTROLLER

END

FIG.8

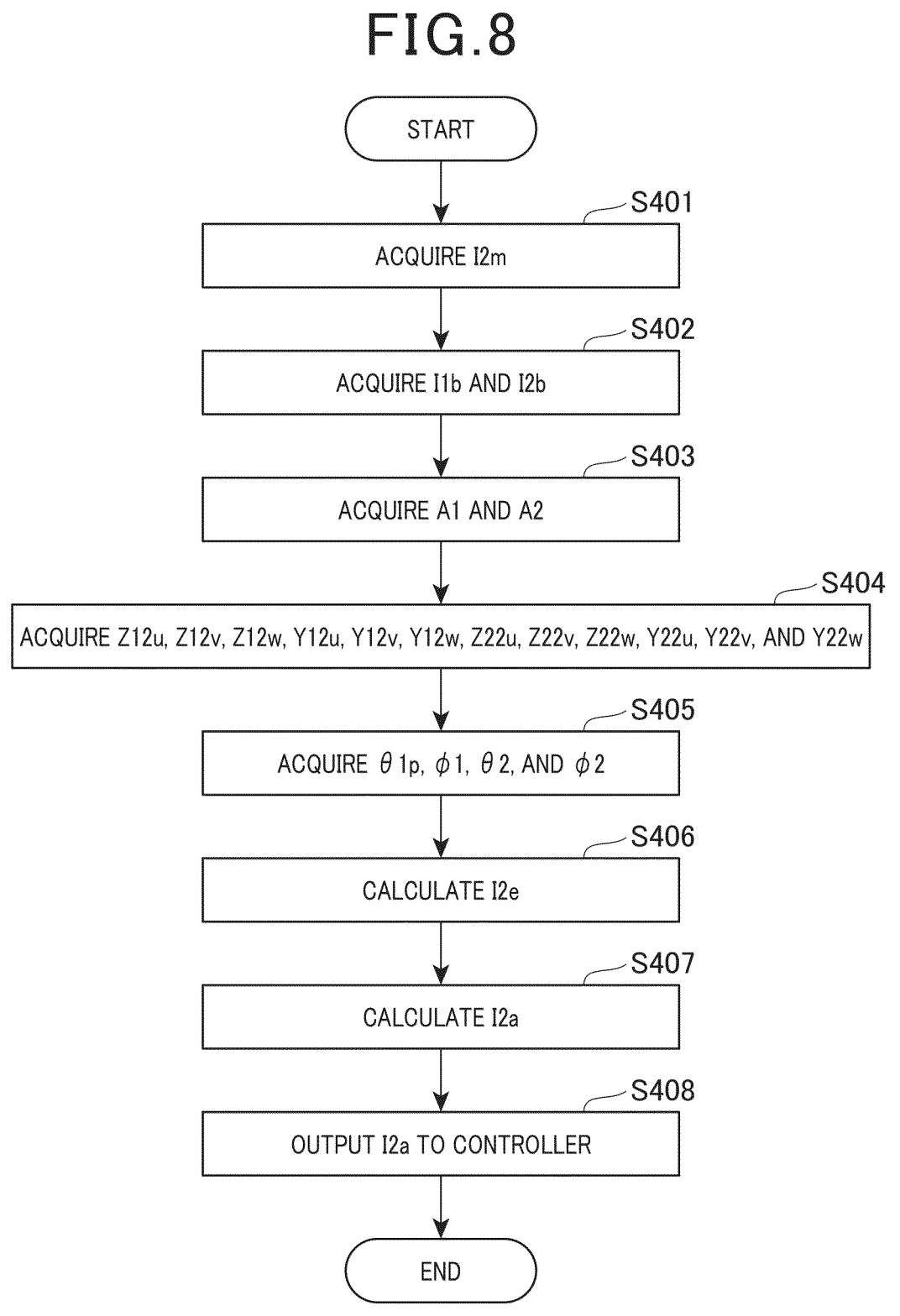

START

S401
ACQUIRE I2m

S402
ACQUIRE I1b AND I2b

S403
ACQUIRE A1 AND A2

S404
ACQUIRE Z12u, Z12v, Z12w, Y12u, Y12v, Y12w, Z22u, Z22v, Z22w, Y22u, Y22v, AND Y22w

S405
ACQUIRE $\theta 1p$, $\phi 1$, $\theta 2$, AND $\phi 2$

S406
CALCULATE I2e

S407
CALCULATE I2a

S408
OUTPUT I2a TO CONTROLLER

END

START

S701
ACQUIRE I3m

S702
ACQUIRE I1b AND I2b

S703
ACQUIRE A1 AND A2

S705
ACQUIRE $\theta 1p$, $\phi 1$, $\theta 2$, AND $\phi 2$

S706
CALCULATE I3r

S707
CALCULATE I3a

S708
OUTPUT I3a TO CONTROLLER

END

START

S801
ACQUIRE I1m

S802
ACQUIRE I1b AND I3b

S803
ACQUIRE A1

S804
ACQUIRE $\theta 1$ AND $\phi 1$

S805
ACQUIRE I3r

S806
CALCULATE I1e

S807
CALCULATE I1a

S808
OUTPUT I1a TO CONTROLLER

END

FIG.18A
FIG.18B
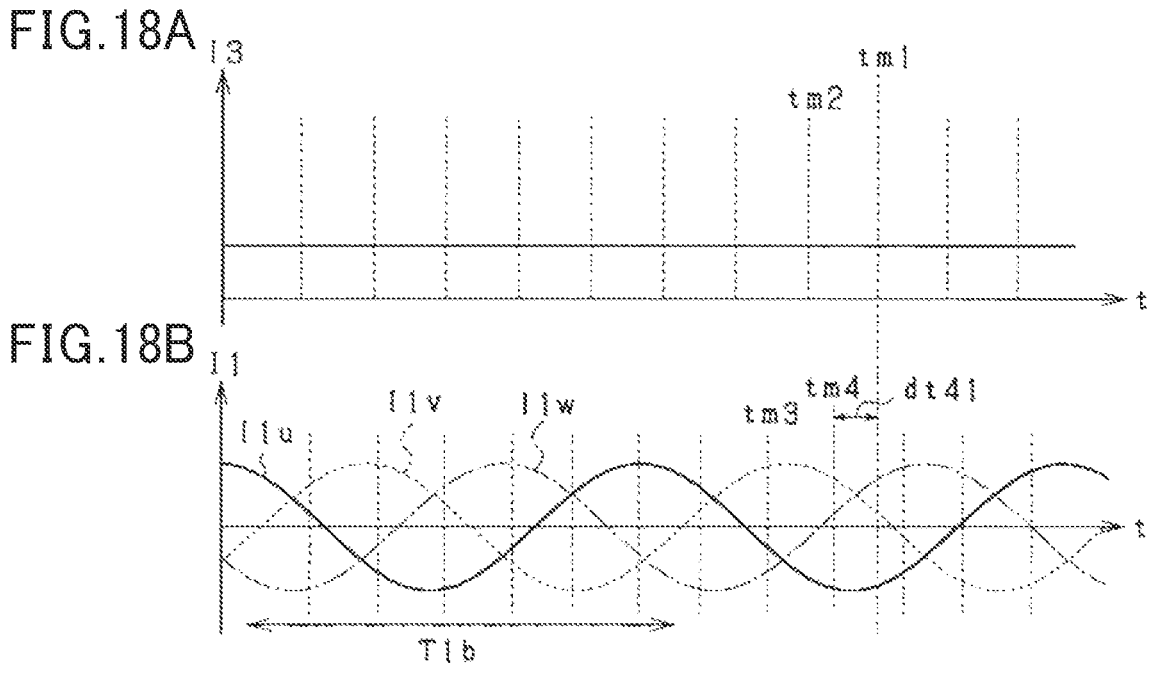
FIG.19A
FIG.19B
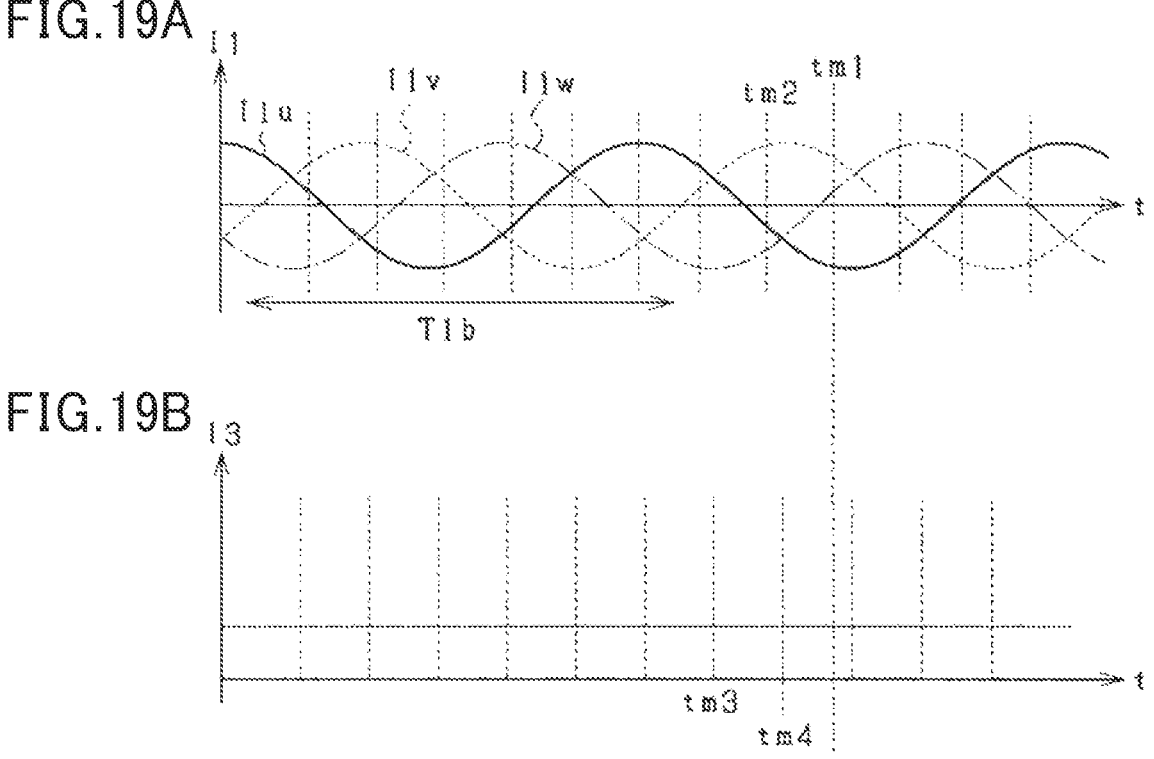

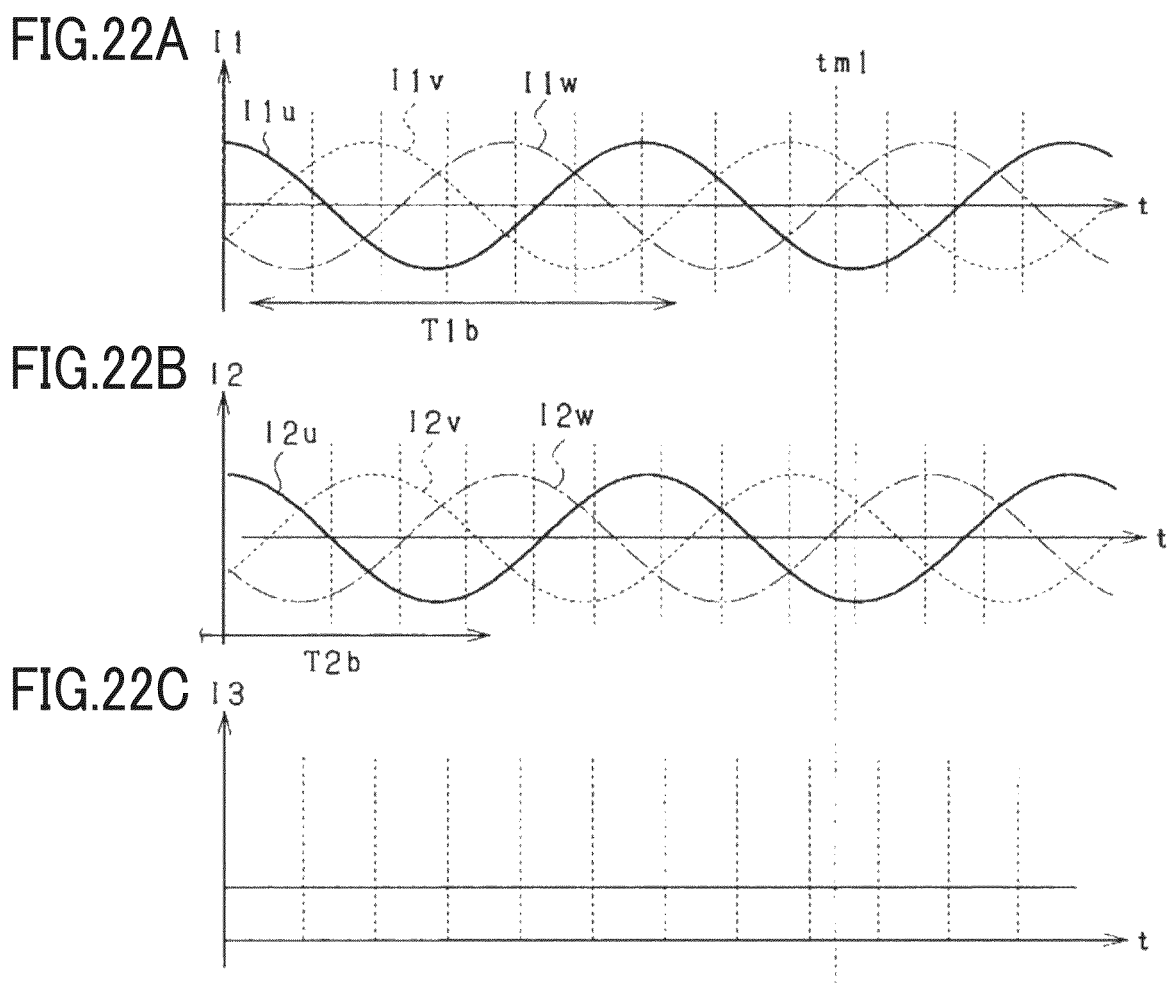
FIG.22A
FIG.22B
FIG.22C
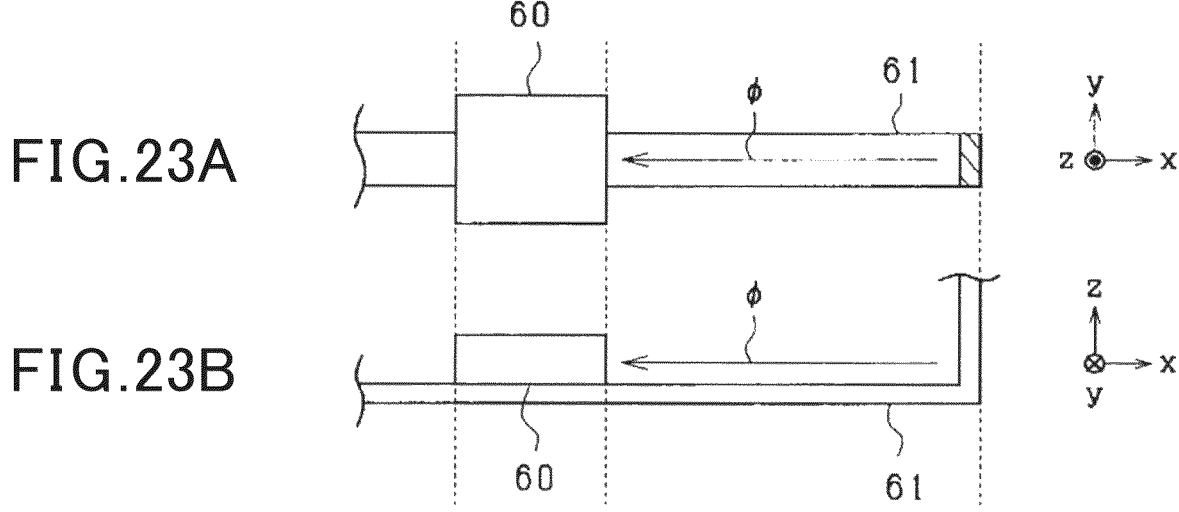
FIG.23A
FIG.23B

CURRENT MEASUREMENT APPARATUS, CURRENT MEASUREMENT PROGRAM, AND CURRENT MEASUREMENT METHOD

REFERENCE TO RELATED APPLICATIONS

This application is a bypass continuation application of currently pending international application No. PCT/JP2022/030823 filed on Aug. 12, 2022 designating the United States of America, the entire disclosure of which is incorporated herein by reference, the international application being based on and claims the benefit of priority from Japanese Patent Applications No. 2021-134164 and No. 2022-125679 filed on Aug. 19, 2021 and filed on Aug. 5, 2022, respectively, the entire disclosure of each of which is incorporated herein by reference.

TECHNICAL FIELD

The present disclosure relates to current measurement apparatuses, current measurement programs, and current measurement methods.

BACKGROUND OF THE INVENTION

Japanese Patent Application Publication No. 2004-61217 discloses a current measurement apparatus for measuring three-phase alternating-current (AC) power supplied to a rotary electric machine through three power supply lines using three current sensors provided for the respective three power supply lines.

The current measurement apparatus disclosed in the patent publication corrects a measurement value of a target phase current measured by the corresponding target phase current sensor in accordance with an error arising from the other non-target phase currents flowing through the respective other non-target phase power supply lines.

Specifically, the current measurement apparatus corrects the measurement value of the target phase current measured by the corresponding phase current sensor in accordance with (i) the distances of the target phase current sensor from the other non-target phase power supply lines and (ii) measurement values of the other non-target phase currents.

SUMMARY OF THE INVENTION

As described above, the current measurement apparatus of the patent publication corrects a measurement value of a target phase current measured by the corresponding phase current sensor in accordance with (i) the distances of the target phase current sensor from the other non-target phase power supply lines and (ii) measurement values of the other non-target phase currents. This may increase the calculation load of the current measurement apparatus.

In particular, if such a current measurement apparatus is applied to a system for controlling a plurality of rotary electric machines, the current measurement apparatus may have a larger calculation load depending on the number of the other non-target phases that are a cause of the error.

Additionally, the current measurement apparatus, which is applied to a control system for controlling a plurality of rotary electric machines, may make it difficult to ensure calculation accuracy of the error if the measurement times of the target and non-target phase currents are different from one another, because control frequencies and/or rotational speeds of the respective rotary electric machines may be different from one another.

In view of the circumstances set forth above, the present disclosure seeks to provide current measurement technologies applicable to control apparatuses for one or more multiphase rotary electric machines, each of which is capable of balancing both reduction of calculation load and ensuring of calculation accuracy.

The present disclosure provides a current measurement apparatus, applicable to a control apparatus for at least one multiphase rotary electric machine, for measuring phase currents flowing through respective multiphase power lines used for power supply to the at least one multiphase rotary electric machine. The current measurement apparatus includes a measured current acquiring unit configured to acquire, from a current sensor, a measured value of at least one target phase current flowing through a corresponding at least one target phase power line included in the multiphase power lines. The current measurement apparatus includes a corrector configured to calculate an error arising in the measured value of the at least one target phase current due to magnetic flux generated from each of the multiphase power lines in accordance with an error factor defined for each of the multiphase power lines with respect to the at least one target phase current. The error factor defined for each of the multiphase power lines with respect to the at least one target phase current is a constant value or a variable determined based on (i) one or more shields located between the current sensor and the corresponding one of the multiphase power lines and (ii) a distance between the current sensor and the corresponding one of the multiphase power lines. The corrector is configured to correct the measured value of the at least one target phase current based on the calculated error.

The disclosing persons of the present disclosure have focused attention on the findings that the error factor defined for each of the multiphase power lines with respect to the at least one target phase current is a constant value or a variable determined based on (i) one or more shields located between the current sensor and the corresponding one of the multiphase power lines and (ii) a distance between the current sensor and the corresponding one of the multiphase power lines. Then, the disclosing persons have found out, based on the findings, that using the error factor defined for each of the multiphase power lines with respect to the at least one target phase current enables simpler calculation of the error arising in the measured value of the at least one target phase current due to magnetic flux generated from each of the multiphase power lines.

The current measurement apparatus, which enables simpler calculation of the error arising in the measured value of the at least one target phase current due to magnetic flux generated from each of the multiphase power lines using the error factor defined for each of the multiphase power lines with respect to the at least one target phase current, makes it possible to correct the measured value of the at least one target phase current while balancing both reduction of calculation load and ensuring of calculation accuracy.

The present disclosure provides a current measurement program, applicable to a control apparatus for at least one multiphase rotary electric machine, for measuring phase currents flowing through respective multiphase power lines used for power supply to the at least one multiphase rotary electric machine. The current measurement program causes a computer to execute a measured current acquiring step of acquiring, from a current sensor, a measured value of at least one target phase current flowing through a corresponding at least one target phase power line included in the multiphase power lines. The current measurement program causes the computer to execute a correction step of calculating an error arising in the measured value of the at least one target phase current due to magnetic flux generated from each of the multiphase power lines in accordance with an error factor defined for each of the multiphase power lines with respect to the at least one target phase current. The error factor defined for each of the multiphase power lines with respect to the at least one target phase current is a constant value or a variable determined based on (i) one or more shields located between the current sensor and the corresponding one of the multiphase power lines and (ii) a distance between the current sensor and the corresponding one of the multiphase power lines. The correction step corrects the measured value of the at least one target phase current based on the calculated error.

The present disclosure provides a current measurement method, applicable to a control apparatus for at least one multiphase rotary electric machine, for measuring phase currents flowing through respective multiphase power lines used for power supply to the at least one multiphase rotary electric machine. The current measurement method includes a measured current acquiring step of acquiring, from a current sensor, a measured value of at least one target phase current flowing through a corresponding at least one target phase power line included in the multiphase power lines. The current measurement method includes a correction step of calculating an error arising in the measured value of the at least one target phase current due to magnetic flux generated from each of the multiphase power lines in accordance with an error factor defined for each of the multiphase power lines with respect to the at least one target phase current. The error factor defined for each of the multiphase power lines with respect to the at least one target phase current is a constant value or a variable determined based on (i) one or more shields located between the current sensor and the corresponding one of the multiphase power lines and (ii) a distance between the current sensor and the corresponding one of the multiphase power lines. The correction step corrects the measured value of the at least one target phase current based on the calculated error.

Each of the current measurement program and current measurement method, which enables simpler calculation of the error arising in the measured value of the at least one target phase current due to magnetic flux generated from each of the multiphase power lines using the error factor defined for each of the multiphase power lines with respect to the at least one target phase current, makes it possible to correct the measured value of the at least one target phase current while balancing both reduction of calculation load and ensuring of calculation accuracy.

BRIEF DESCRIPTION OF THE DRAWINGS

The above object, other objects, characteristics, and advantageous benefits of the present disclosure will become apparent from the following description with reference to the accompanying drawings in which:

FIG. 2 is a flowchart illustrating a measured-current correction routine for a first motor;

FIG. 3 is a flowchart illustrating a measured-current correction routine for a second motor;

FIG. 7 is a flowchart illustrating a measured-current correction routine for the first motor;

FIG. 8 is a flowchart illustrating a measured-current correction routine for the second motor;

FIGS. 18A and 18B are each a graph, and illustrate a timing chart of current measurement times for the booster circuit;

FIGS. 19A and 19B are each a graph, and illustrate a timing chart of current measurement times for the first motor;

FIGS. 22A to 22C are each a graph, and illustrate a timing chart of current measurement times for the first motor according to the sixth embodiment; and FIGS. 23A and 23B are each a view illustrating a relationship among (i) a shield disposed between a current sensor and a power line, (ii) a distance of the power line from the current sensor, and (iii) magnetic flux generated from the power line.

DETAILED DESCRIPTION

First Embodiment

Figure 1:
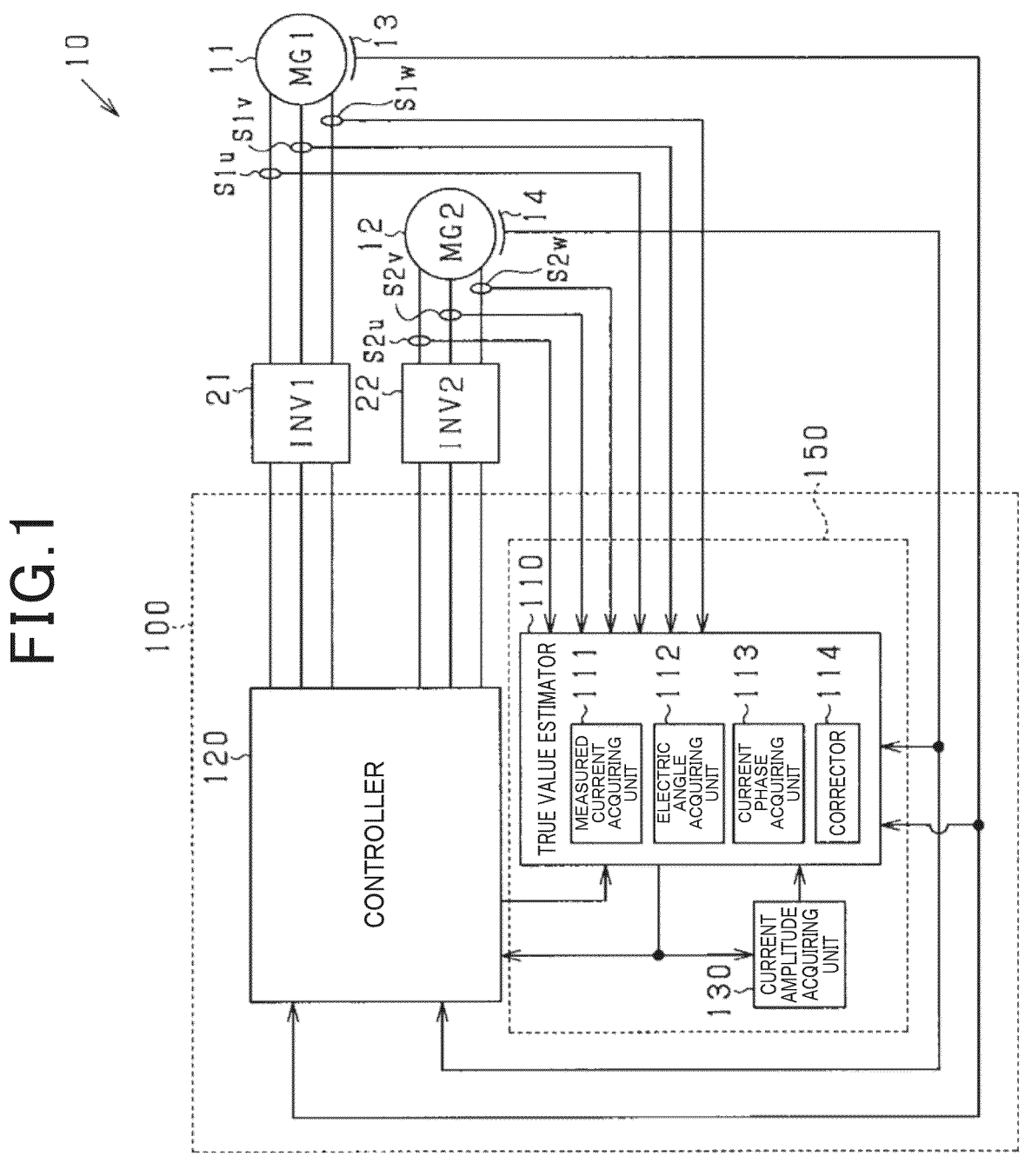
FIG. 1 is a block and circuit diagram illustrating a control apparatus, which includes a current measurement apparatus of the first embodiment, for rotary electric machines.

A control apparatus 10 for rotary electric machines illustrated in FIG. 1 aims to control a first motor 11 and a second motor 12 which are examples of the rotary electric machines. The control apparatus 10 includes a first inverter 21, a second inverter 22, a first electric-angle sensor 13, a second electric-angle sensor 14, current sensors S1u, S1v, S1w, S2u, S2v, and S2w, and a microcomputer 100. The microcomputer 100 includes a controller 120 and a current measurement unit 150.

The first motor 11 is a three-phase motor, and is connected to the controller 120 through the first inverter 21 and U-, V-, and W-phase power lines. The current sensor S1u is provided on the U-phase power line, and is configured to measure a U-phase current I1$u$ flowing through the U-phase power line. Similarly, the current sensor S1$v$ is provided on the V-phase power line, and is configured to measure a V-phase current I1$v$ flowing through the V-phase power line. Additionally, the current sensor S1$w$ is provided on the W-phase power line, and is configured to measure a W-phase current I1$w$ flowing through the W-phase power line.

The second motor 12 is a three-phase motor, and is connected to the controller 120 through the second inverter 22 and U-, V-, and W-phase power lines. The current sensor S2$u$ is provided on the U-phase power line, and is configured to measure a U-phase current I2$u$ flowing through the U-phase power line. Similarly, the current sensor S2$v$ is provided on the V-phase power line, and is configured to measure a V-phase current I2$v$ flowing through the V-phase power line. Additionally, the current sensor S2$w$ is provided on the W-phase power line, and is configured to measure a W-phase current I2$w$ flowing through the W-phase power line.

Specifically, each current sensor S1$u$, S1$v$, S1$w$, S2$u$, S2$v$, and S2$w$ is configured to measure magnetic flux generated based on the corresponding phase current flowing through the corresponding phase power line to accordingly measure the corresponding phase current.

The first electric-angle sensor 13 is configured to measure an electric angle θ1 of the first motor 11, and the second electric-angle sensor 14 is configured to measure an electric angle θ2 of the second motor 12.

The current measurement unit 150 includes a true value estimator 110, and a current amplitude acquiring unit 130. The true value estimator 110 includes a measured current acquiring unit 111, an electric angle acquiring unit 112, a current phase acquiring unit 113, and a corrector 114.

The measured current acquiring unit 111 is configured to acquire, from a corresponding one of the current sensors S1$u$, S1$v$, S1$w$, S2$u$, S2$v$, and S2$w$, a measured value of a target phase current flowing through a corresponding phase power line. Specifically, the measured current acquiring unit 111 is configured to acquire, from the current sensors S1$u$, S1$v$, S1$w$, S2$u$, S2$v$, and S2$w$, measured values of phase currents I1$u$, I1$v$, I1$w$, I2$u$, I2$v$, and I2$w$ flowing through the corresponding phase power lines measured by the current sensors S1$u$, S1$v$, S1$w$, S2$u$, S2$v$, and S2$w$, respectively. The measured current acquiring unit 111 can be configured to acquire, from sensors selected from the current sensors S1$u$, S1$v$, S1$w$, S2$u$, S2$v$, and S2$w$, measured values of phase currents measured by the selected sensors at a given measurement time.

The electric angle acquiring unit 112 is configured to acquire, from the first electric-angle sensor 13, the electric angle θ1 of the first motor 11 measured by the first electric-angle sensor 13, and acquire, from the second electric-angle sensor 14, the electric angle θ2 of the second motor 12 measured by the second electric-angle sensor 14.

The current measurement unit 150 can be configured to store the electric angle θ1, θ2 of each of the first and second motors 11 and 12 acquired by the electric angle acquiring unit 112, calculate, based on the stored electric angle θ1, θ2 of each of the first and second motors 11 and 12, a predicted electric angle of the corresponding one of the first and second motors 11 and 12 at any future time, and store the predicted electric angle of each of the first and second motors 11 and 12.

The current phase acquiring unit 113 is configured to acquire, from each of the first and second motors 11 and 12, the current phase φ1, φ2 of the corresponding one of the first and second motors 11 and 12.

For example, current commands outputted from the controller 120 for each of the first and second motors 11 and 12 define the current phase of the corresponding one of the first and second motors 11 and 12, and the current phase of each of the first and second motors 11 and 12 defined by the current commands for the corresponding one of the first and second motors 11 and 12 can be used as the current phase of the corresponding one of the first and second motors 11 and 12.

As another example, voltage commands outputted from the controller 120 for each of the first and second motors 11 and 12 are related to the current phase of the corresponding one of the first and second motors 11 and 12, and the current phase of each of the first and second motors 11 and 12 calculated from the voltage commands for the corresponding one of the first and second motors 11 and 12 can be used as the current phase of the corresponding one of the first and second motors 11 and 12.

The corrector 114 can be configured to correct values of the phase currents I1$u$, I1$v$, I1$w$, I2$u$, I2$v$, and I2$w$ measured by the respective current sensors S1$u$, S1$v$, S1$w$, S2$u$, S2$v$, and S2$w$.

The corrector 114 of the control apparatus 10 for controlling plural rotational electric machines can be configured to calculate, for each multiphase rotary electric machine, an error in the measured value of at least one target phase current in accordance with (i) a predetermined error factor defined for each of all the power lines of all the multiphase rotary electric machines with respect to the at least one target phase current, (ii) phase differences among all the phase currents of the corresponding multiphase rotary electric machine, (iii) an acquired current amplitude of the corresponding multiphase rotary electric machine, (iv) an acquired electric angle of the corresponding multiphase rotary electric machine, and (v) an acquired current phase of the corresponding multiphase rotary electric machine. Then, the corrector 114 can be configured to correct the measured value of the at least one target phase current based on the calculated error.

The error factor defined for each of all the power lines with respect to at least one target phase current is a constant value or a variable determined based on (i) one or more shields located between the corresponding current sensor and the corresponding one of all the power lines and (ii) the distance between the corresponding current sensor and the corresponding one of all the power lines. Because the error factor defined for each of all the power lines with respect to at least one target phase current has been known since a design phase of the current measurement unit 150, the error factor defined for each of all the power lines with respect to at least one target phase current can be previously stored in the microcomputer 100.

For measurement of a value of a target phase current flowing through a corresponding target phase power line, multiplying the error factor defined for each multiphase power line with respect to the target phase current by a current value flowing through the corresponding multiphase power line enables an error arising in the measured value of the target phase current to be calculated.

That is, in each rotary electric machine, the sum of plural-phase products, each of which is the product of the phase current flowing through the corresponding one of the multiphase power lines and the error factor defied for the corresponding one of the multiphase power lines with respect to a target phase current, enables an error arising in a measured value of the target phase current to be calculated.

For example, let us assume that each of U-, V-, and W-phase currents for the first motor 11 is represented as a j-phase current (j is each of U, V, and W), a measured value of the j-phase current for the first motor 11 is represented as I1*mj*, a true value of the j-phase current for the first motor 11 is represented as I1*rj*, and an error arising in the measured value of the j-phase current for the first motor 11 is represented as I1*ej*. In this assumption, the measured value I1*mj* of the j-phase current can be expressed by the following equation (1):

$$I1mj = I1rj + I1ej \quad (1)$$

The error I1*ej* arising in the measured value of the j-phase current is subjected to a current flowing through each power line for the first motor 11 and a current flowing through each power line for the second motor 12. Assuming that an error arising in the measured value of the j-phase current for the first motor 11 due to the current flowing through each power line for the first motor 11 is represented as I11*ej* and an error arising in the measured value of the j-phase current for the first motor 11 due to the current flowing through each power line for the second motor 12 is represented as I21*ej*, the error I1*ej* arising in the measured value of the j-phase current can be expressed by the following equation (2):

$$I1ej = I11ej + I21ej \quad (2)$$

The error I11*ej* arising in the j-phase current due to a k-phase current flowing through the corresponding k-phase power line for the first motor 11 (k is each of U, V, and W) can be calculated in accordance with the product of a true value I1*rk* of the k-phase current flowing in the corresponding k-phase power line for the first motor 11 and the corresponding error factor C1*k*1*j* (see the following equation (3)). Similarly, the error I21*ej* arising in the j-phase current due to a k-phase current flowing through the corresponding k-phase power line for the second motor 12 (k is each of U, V, and W) can be calculated in accordance with the product of a true value I2*rk* of the k-phase current flowing in the corresponding k-phase power line for the second motor 12 and the corresponding error factor C2*k*1*j* (see the following equation (4)).

$$I11ej = C1u1j \times I1ru + C1v1j \times I1rv + C1w1j \times I1rw \quad (3)$$

where:
I1*ru* represents a true value of the U-phase current flowing through the corresponding power line for the first motor 11;
I1*rv* represents a true value of the V-phase current flowing through the corresponding power line for the first motor 11;
I1*rw* represents a true value of the W-phase current flowing through the corresponding power line for the first motor 11;
C1*u*1*j* represents an error factor defined for the U-phase power line for the first motor 11 with respect to the j-phase current of the first motor 11;

C1*v*1*j* represents an error factor defined for the V-phase power line for the first motor 11 with respect to the j-phase current of the first motor 11;
C1*w*1*j* represents an error factor defined for the W-phase power line for the first motor 11 with respect to the j-phase current of the first motor 11;

$$I21ej = C2u1j \times I2ru + C2v1j \times I2rv + C2w1j \times I2rw \quad (4)$$

where:
I2*ru* represents a true value of the U-phase current flowing through the corresponding power line for the second motor 12;
I2*rv* represents a true value of the V-phase current flowing through the corresponding power line for the second motor 12;
I2*rw* represents a true value of the W-phase current flowing through the corresponding power line for the second motor 12;
C2*u*1*j* represents an error factor defined for the U-phase power line for the second motor 12 with respect to the j-phase current of the first motor 11;
C2*v*1*j* represents an error factor defined for the V-phase power line for the second motor 12 with respect to the j-phase current of the first motor 11; and
C2*w*1*j* represents an error factor defined for the W-phase power line for the second motor 12 with respect to the j-phase current of the first motor 11.

The error factors C1*k*1*j* and C2*k*1*j* are constant values or variables that have been known since the design phase of the current measurement unit 150. The index "1*k*1*j*" attached to the error factor C1*k*1*j* represents that an energized phase is the k-phase of the first motor 11, and that a target phase, i.e., an evaluation-target phase, is the j-phase of the first motor 11 is the j-phase.

In a multiphase AC rotary electric machine, multiphase currents flowing through respective power lines have a predetermined phase difference therebetween. For example, in a three-phase AC rotary electric machine, a V-phase current has a delay or 120° relative to a U-phase current, and has an advance of 120° relative to a W-phase current.

Each of the equations (3) and (4) can be therefore simplified using the characteristics where the true U-phase current I1*ru*, the true V-phase current I1*rv*, and the true W-phase current I1*rw* respectively have sinusoidal waveforms with 120° apart therebetween.

Assuming that the current amplitude of the first motor 11 is represented as A1, the equation (3) can be converted into the following equation (5) using the electric angle θ1 of the first motor 11 and the phase φ1 of the first motor 11, and the error I11*ej* arising in the j-phase current for the first motor 11 can be expressed by the following equation (5). Similarly, assuming that the current amplitude of the second motor 12 is represented as A2, the equation (4) can be converted into the following equation (6) using the electric angle θ2 of the second motor 12 and the phase φ2 of the second motor 12, and the error I12*ej* arising in the j-phase current for the second motor 12 can be expressed by the following equation (6).

$$I11ej = C1u1j \times A1 \times \sin(\theta 1 + \phi 1) \quad (5)$$
$$+ C1v1j \times A1 \times \sin(\theta 1 - 2\pi/3 + \phi 1)$$

-continued $$+C1w1j \times A1 \times \sin(\theta1 + 2\pi/3 + \phi1)$$

$$I21ej = C2u1j \times A2 \times \sin(\theta2 + \phi2) \quad (6)$$

$$+C2v1j \times A2 \times \sin(\theta2 - 2\pi/3 + \phi2)$$

$$+C2w1j \times A2 \times \sin(\theta2 + 2\pi/3 + \phi2)$$

Using parameters $X11j$, $Y11j$, $X21j$, and $Y21j$ expressed by the following respective equations (7) to (10) enables the equations (5) and (6) to be converted into the following equations (11) and (12). The error factors $C1k1j$ and $C2k1j$ are each a constant value that has been known in the design phase of the current measurement unit 150, so that each of the parameters $X11j$, $Y11j$, $X21j$, and $Y21j$ that can be calculated from the error factors $C1k1j$ and/or $C2k1j$ is also a constant value that has been known in the design phase of the current measurement unit 150. The parameter $X11j$ is a correction coefficient for correcting the current amplitude A1, and the parameter $X21j$ is a correction coefficient for correcting the current amplitude A2. The parameter $Y11j$ is a correction coefficient for correcting the electric angle $\theta1$ and the phase $\phi1$, and the parameter $Y21j$ is a correction coefficient for correcting the electric angle $\theta2$ and the phase $\phi2$. Constant values, each of which is represented by the uppercase alphabetic character X and an index attached thereto, such as $X11j$ or $X21j$, will also be referred to as amplitude-correction coefficients. Similarly, constant values, each of which is represented by the uppercase alphabetic character Y and an index attached thereto, such as $Y11j$ or $Y21j$, will also be referred to as angle-correction coefficients. The correction coefficients $X11j$ and $Y11j$ can be calculated from the error factor $C1k1j$, and the correction coefficients $X21j$ and $Y21j$ can be calculated from the error factor $C2k1j$.

$$X11j = \sqrt{\left\{\frac{1}{4}(2C1u1j - C1w1j - C1v1j)^2 + \frac{3}{4}(C1w1j - C1v1j)^2\right\}} \quad (7)$$

$$Y11j = \quad (8)$$

$$\arcsin\left(\frac{\frac{\sqrt{3}}{2}(C1w1j - C1v1j)}{\left\{\frac{1}{4}(2C1u1j - C1w1j - C1v1j)^2 + \frac{3}{4}(C1w1j - C1v1j)^2\right\}}\right)$$

$$X21j = \sqrt{\left\{\frac{1}{4}(2C2u1j - C2w1j - C2v1j)^2 + \frac{3}{4}(C2w1j - C2v1j)^2\right\}} \quad (9)$$

$$Y21j = \quad (10)$$

$$\arcsin\left(\frac{\frac{\sqrt{3}}{2}(C2w1j - C2v1j)}{\left\{\frac{1}{4}(2C2u1j - C2w1j - C2v1j)^2 + \frac{3}{4}(C2w1j - C2v1j)^2\right\}}\right)$$

$$I11ej = A1 \times X11j \times \sin(\theta1 + \phi1 + Y11j) \quad (11)$$

$$I21ej = A2 \times X21j \times \sin(\theta2 + \phi2 + Y21j) \quad (12)$$

The above equations (2), (11), and (12) enable the error $I1ej$ arising in the measured value of the j-phase current to be calculated in accordance with the following equation (13). In the equation (13), because the parameters $X11j$, $Y11j$, $X21j$, and $Y21j$ are each a constant value, the error $I1ej$ arising in the measured value of the j-phase current can be calculated based on (i) the current amplitude A1 of the first motor 11, (ii) the electric angle $\theta1$ of the first motor 11, (iii) the current phase $\phi1$ of the first motor 11, (iv) the current amplitude A2 of the second motor 12, (v) the electric angle $\theta2$ of the second motor 12, (vi) the current phase $\phi2$ of the second motor 12.

For example, the current amplitudes A1 and A2 can be acquired from the current amplitude acquiring unit 130. The electric angles $\theta1$ and $\theta2$ can be acquired from the respective first and second electric angle sensors 13 and 14. The current phase $\phi1$ can be calculated based on the current commands and/or voltage commands used by the controller 120 for controlling the first motor 11. Similarly, the current phase $\phi2$ can be calculated based on the current commands and/or voltage commands used by the controller 120 for controlling the second motor 12. As each parameter A1, A2, $\theta1$, $\theta2$, $\phi1$, and $\phi2$, a measured value of an estimated value can be used. The estimated value of each parameter A1, A2, $\theta1$, $\theta2$, $\phi1$, and $\phi2$ can be estimated by, for example, the corrector 114 or another component included in the current measurement unit 150.

$$I1ej = \quad (13)$$

$$A1 \times X11j \times \sin(\theta1 + \phi1 + Y11j) + A2 \times X21j \times \sin(\theta2 + \phi2 + Y21j)$$

Interchanging specified indices "1" with corresponding indices "2" in each of the equations (1) to (13) enables modified equations to be created, and using the modified equations enables a true value of the j-phase current for the second motor 12 to be calculated.

Specifically, amplitude-correction coefficients $X12j$ and $X22j$ and angle-correction coefficients $Y12j$ and $Y22j$ can be calculated in accordance with the following equations (14) to (17).

Let us assume that each of U-, V-, and W-phase currents for the second motor 12 is represented as a j-phase current (j is each of U, V, and W), a measured value of the j-phase current for the second motor 12 is represented as $I2mj$, a true value of the j-phase current for the second motor 12 is represented as $I2rj$, and an error arising in the measured value of the j-phase current for the second motor 12 is represented as $I2ej$. In this assumption, the error $I2ej$ arising in the measured value of the j-phase current for the second motor 12 can be calculated in accordance with the following equation (18), and the true value $I2rj$ of the j-phase current for the second motor 12 can be calculated in accordance with the following equation (19). As shown in the following equations (14) to (17), the correction coefficients $X12j$ and $Y12j$ can be calculated from the error factor $C2k1j$, and the correction coefficients $X22j$ and $Y22j$ can be calculated from the error factor $C2k2j$. The error factors $C2k1j$ and $C2k2j$ are each a constant value that has been known in the design phase of the current measurement unit 150, so that each of the parameters $X12j$, $Y12j$, $X22j$, and $Y22j$ that can be calculated from the error factors $C2k1j$ and/or $C2k2j$ is also a constant value that has been known in the design phase of the current measurement unit 150.

$$X12j = \sqrt{\left\{\frac{1}{4}(2C1u2j - C1w2j - C1v2j)^2 + \frac{3}{4}(C1w2j - C1v2j)^2\right\}} \quad (14)$$

-continued $$Y12j = \tag{15}$$

$$\arcsin\left(\frac{\frac{\sqrt{3}}{2}(C1w2j - C1v2j)}{\left\{\frac{1}{4}(2C1u2j - C1w2j - C1v2j)^2 + \frac{3}{4}(C1w2j - C1v2j)^2\right\}}\right)$$

$$X22j = \sqrt{\left\{\frac{1}{4}(2C2u2j - C2w2j - C2v2j)^2 + \frac{3}{4}(C2w2j - C2v2j)^2\right\}} \tag{16}$$

$$Y22j = \tag{17}$$

$$\arcsin\left(\frac{\frac{\sqrt{3}}{2}(C2w2j - C2v2j)}{\left\{\frac{1}{4}(2C2u2j - C2w2j - C2v2j)^2 + \frac{3}{4}(C2w2j - C2v2j)^2\right\}}\right)$$

$$I2ej = \tag{18}$$

$$A1 \times X12j \times \sin(\theta1 + \phi1 + Y12j) + A2 \times X22j \times \sin(\theta2 + \phi2 + Y22j)$$

$$I2mj = I2rj + I2ej \tag{19}$$

The corrector 114 is configured to calculate the true value of the j-phase current for the first motor 11 in accordance with the equations (1) and (13). The corrector 114 is also configured to calculate the true value of the j-phase current for the second motor 12 in accordance with the equations (18) and (19).

If the control apparatus 10 is configured to control three or more rotary electric machines, the control apparatus 10 can calculate the true values $I1rj$ and $I2rj$ in the same approach as that stated above.

For example, let us assume that each of U-, V-, and W-phase currents in a third motor is represented as a j-phase current (j is each of U, V, and W), a measured value of the j-phase current in the third motor is represented as $I3mj$, a true value of the j-phase current in the third motor is represented as $I3rj$, and an error arising in the measured value of the j-phase current in the third motor is represented as $I3ej$. In this assumption, adding the error $I3ej$ to the right-hand side of the equation (2) enables the error $I1ej$ to be calculated. The true value $I3rj$ of the j-phase current in the third motor can be calculated in accordance with the equations that are identical to those used for calculation of the true value $I1rj$ of the j-phase current for the first motor 11 or for calculation of the true value $I2rj$ of the j-phase current for the second motor 12.

The true value estimator 110 is configured to output, to the controller 120 and the current amplitude acquiring unit 130, the true value $I1rj$ calculated by the corrector 114 as a corrected value of the measured value of the target phase (j-phase) current flowing through the corresponding power line for the first motor 11, and the true value $I2rj$ calculated by the corrector 114 as a corrected value of the measured value of the target phase (j-phase) current flowing through the corresponding power line for the second motor 12.

The current amplitude acquiring unit 130 is configured to acquire, from each of the first and second motors 11 and 12, the amplitude of the waveform of a selected at least one phase current of the corresponding one of the first and second motors 11 and 12.

The amplitude of the waveform of a selected at least one phase current of each of the first and second motors 11 and 12 will also be referred to as the current amplitude of each of the first and second motors 11 and 12.

For example, the current amplitude acquiring unit 130 can directly acquire, from each of the first and second motors 11 and 12, the current amplitude of the corresponding one of the first and second motors 11 and 12. As another example, the current amplitude acquiring unit 130 can acquire, from each of the first and second motors 11 and 12, a waveform parameter, such as the current waveform related to the current amplitude of the corresponding one of the first and second motors 11 and 12, and calculate the current amplitude of each of the first and second motors 11 and 12 based on the waveform parameter related to the current amplitude of the corresponding one of the first and second motors 11 and 12. That is, the current amplitude acquiring unit 130 can handle the calculated current amplitude of each of the first and second motors 11 and 12 as the acquired current amplitude of the corresponding one of the first and second motors 11 and 12.

As the current waveform of the first motor 11, a previously corrected current waveform of the first motor 11 can be used; the previously corrected current waveform of the first motor 11 can be acquired from the true value estimator 110. This can be applied to the second motor 12.

As the current waveform of the first motor 11, the current amplitude acquiring unit 130 can be configured to use the current waveform defined based on the voltage commands or current commands for controlling drive of the first motor 11. The current waveform defined based on the voltage commands or current commands can be acquired from the controller 120. This can be applied to the second motor 12.

For example, the current amplitude acquiring unit 130 can be configured to acquire, from the controller 120, d-, and q-axis current commands as the current commands for the first motor 11, and acquire the amplitude of the current vector based on the d-, and q-axis current commands as the current amplitude of the first motor 11.

The current amplitude acquiring unit 130 can be configured to acquire the current amplitude of the first motor 11 only each time the current waveform is changed. For example, the current amplitude acquiring unit 130 can be configured to acquire the current amplitude of the first motor 11 each time the current commands, which are selected as parameters for acquiring the current amplitude, for controlling the first motor 11 are changed to new ones. This can be applied to the second motor 12. This reduces the frequency of acquiring the current amplitude of each of the first and second motors 11 and 12, resulting in reduction of the computing load of the microcomputer 100.

The current amplitude acquiring unit 130 can be configured to acquire the peak amplitude of the waveform of a selected at least one phase current in each of the first and second motors 11 and 12 during at least one electric-angular period thereof as the current amplitude of the corresponding one of the first and second motors 11 and 12. For example, the current amplitude acquiring unit 130 can be configured to acquire, from the true value estimator 110, the previously corrected waveform of the selected at least one phase current for the first motor 11, and acquire, from the previously corrected waveform of the selected at least one phase current for the first motor 11, the peak amplitude of the waveform of the selected at least one phase current for the first motor 11 during at least one electric-angular period thereof as the current amplitude of the first motor 11.

Additionally, the current amplitude acquiring unit 130 can be configured to transform at least two-phase currents in a three-phase coordinate system flowing through at least two power lines for the first motor 11 or the second motor 12 into two-phase currents in a rotating coordinate system, i.e., a dq coordinate system, or a stationary coordinate system, i.e., an αβ coordinate system, to accordingly acquire, based on the amplitude of the current vector of the two-phase currents, the current amplitude of the first motor 11 or the second motor 12. Specifically, the three-phase vector currents Iu, Iv, and Iw in the three-phase coordinate system can be transformed into two-phase current vectors Iα, Iβ in the stationary coordinate system or two-phase current vectors Id, Iq in the rotating coordinate system in accordance with the following equations (20) and/or (21). In the following equation (20), each of Ca and Cb is a constant value. Ca represents a coordinate transformation coefficient, and Ca is $\sqrt{2/3}$ if the coordinate transformation is an absolute transformation, and Ca is $2/3$ if the coordinate transformation is a relative transformation.

$$\begin{bmatrix} i_\alpha \\ i_\beta \\ i_o \end{bmatrix} = Ca \begin{bmatrix} 1 & -\frac{1}{2} & -\frac{1}{2} \\ 0 & \frac{\sqrt{3}}{2} & -\frac{\sqrt{3}}{2} \\ Cb & Cb & Cb \end{bmatrix} \begin{bmatrix} I_u \\ I_v \\ I_w \end{bmatrix} \quad (20)$$

$$\begin{bmatrix} i_d \\ i_q \end{bmatrix} = \begin{bmatrix} \cos\omega t & \sin\omega t \\ -\sin\omega t & \cos\omega t \end{bmatrix} \begin{bmatrix} i_\alpha \\ i_\beta \end{bmatrix} \quad (21)$$

The current amplitude A in the three-phase coordinate system of each of the first motor 11 and the second motor 12 can be expressed as the product of the magnitude of the transformed current vector and the coordinate transformation coefficient Ca in the stationary coordinate system based on the absolute transformation (see the following equation (22)) or the product of the amplitude of the transformed current vector and the coordinate transformation coefficient Ca in the rotating coordinate system based on the absolute transformation (see the following equation (23)). Alternatively, the current amplitude A in the three-phase coordinate system of each of the first motor 11 and the second motor 12 can be expressed as the product of the magnitude of the transformed current vector and the coordinate transformation coefficient Ca in the stationary coordinate system based on the relative transformation (see the following equation (24)) or the product of the amplitude of the transformed current vector and the coordinate transformation coefficient Ca in the rotating coordinate system based on the relative transformation (see the following equation (25)).

$$A = Ca \times \sqrt{(i_\alpha^2 + i_\beta^2)} \quad (22)$$

$$A = Ca \times \sqrt{(i_d^2 + i_q^2)} \quad (23)$$

$$A = \sqrt{(i_\alpha^2 + i_\beta^2)} \quad (24)$$

$$A = \sqrt{(i_d^2 + i_q^2)} \quad (25)$$

The above coordinate transformation function can be installed in the controller 120, and the current amplitude acquiring unit 130 can be configured to acquire, from the controller 120, the magnitude of the transformed current vector of each of the first and second motors 11 and 12, and calculate the current amplitude of each of the first and second motors 11 and 12 in accordance with the magnitude of the transformed current vector of the corresponding one of the first and second motors 11 and 12.

For example, the controller 120 can be configured to acquire, from the true value estimator 110, the previously corrected current waveform of the first motor 11, transform the previously corrected current waveform into a d-axis current id and a q-axis current in the rotating coordinate system based on one of the absolute transformation and the relative transformation, and thereafter transmits the amplitude of the current vector of the transformed d- and q-axis currents id and iq to the current amplitude acquiring unit 130. At that time, the current amplitude acquiring unit 130 can be configured to estimate, based on the magnitude of the current vector based on the converted d- and q-axis currents id and iq, the current waveform of the first motor 11. If estimating the current waveform of the first motor 11 in accordance with the current vector in the rotating coordinate system or the stationary coordinate system that is obtained by the absolute transformation of the three-phase coordinate system, the current amplitude acquiring unit 130 can be configured to calculate the product of the magnitude of the current vector of the transformed d- and q-axis currents id and iq and the coordinate transformation coefficient Ca shown in the equations (22) and (23), and thereafter output the product to the true value estimator 110. Alternatively, the current amplitude acquiring unit 130 can be configured to output the magnitude of the current vector of the transformed d- and q-axis currents id and iq to the true value estimator 110, and the true value estimator 130 can be configured to calculate the product of the amplitude of the current vector of the transformed d- and q-axis currents id and iq and the coordinate transformation coefficient Ca.

The controller 120 is configured to acquire, from the current measurement unit 150, the true value I1rj of the j-phase current for the first motor 11 as the corrected value, and the true value I2rj of the j-phase current for the second motor 11 as the corrected value. Additionally, the controller 120 is configured to acquire, from the first electric angle sensor 13, the measured electric angle θ1 of the first motor 11, and, from the second electric angle sensor 14, the measured electric angle θ2 of the second motor 12.

The controller 120 is configured to control (i) the first motor 11 through the first inverter 21 in accordance with the true value I1rj of the j-phase current, which is the corrected measured value of the j-phase current, supplied to the first motor 11, and (ii) the second motor 12 through the second inverter 22 in accordance with the true value I2rj of the j-phase current, which is the corrected measured value of the j-phase current, supplied to the second motor 12.

Specifically, the controller 120 is configured to perform PID control based on the true value I1rj of the j-phase current supplied to the first motor 11 to accordingly generate control signals for controlling the first motor 11, and perform PID control based on the true value I2rj of the j-phase current supplied to the second motor 12 to accordingly generate control signals for controlling the second motor 12. For example, the controller 120 is configured to transform, based on the measured electric angle θ1 of the first motor 11, the true value I1rj of the j-phase current supplied to the first motor 11 into the d- and q-axis current values i1d and i1q in the rotating coordinate system, and transform, based on the measured electric angle θ2 of the second motor 12, the true value I2rj of the j-phase current supplied to the second motor 12 into d- and q-axis current values i2d and 21q in the rotating coordinate system.

Then, the controller 120 is configured to control the voltage commands, i.e., i- and q-axis voltage commands v1d* and v1q*, for the first motor 11 such that the converted d- and q-axis current values i1d and i1q respectively approach the d- and q-axis current commands, which will be referred to as i1d* and q1d* for the first motor 11. Similarly, the controller 120 is configured to control the voltage commands, i.e., i- and q-axis voltage commands v2*d*\* and v2*q*\*, for the second motor 12 such that the converted d- and q-axis current values i2*d* and i2*q* respectively approach the d- and q-axis current commands, which will be referred to as i2*d*\* and q2*d*\* for the second motor 12.

FIG. 2 illustrates a flowchart of a measured-current correction routine to be executed by the current measurement unit 150 for a target phase power line connected to the first motor 11, and FIG. 3 illustrates a flowchart of a measured-current correction routine to be executed by the current measurement unit 150 for a target phase power line connected to the second motor 12.

Specifically, the current measurement unit 150 is configured to calculate, for each multiphase rotary electric machine, i.e., each motor 11, 12, to be controlled by the control apparatus 10, an error arising in a measured value of a target phase current, and correct, based on the calculated error, the measured value of the target phase current for each multiphase rotary electric machine, i.e., each motor 11, 12.

The current measurement unit 150 is configured to iterate, as a measurement cycle, the measured-current correction routine illustrated in FIG. 2 at regular intervals, and iterate, as a measurement cycle, the measured-current correction routine illustrated in FIG. 3 at regular intervals.

First, the current measurement unit 150 acquires a measured value I1*m* of at least one target phase current in step S101 of the present cycle of the correction routine. Specifically, the current measurement unit 150 acquires a measured value I1*u* of the U-phase current from the current sensor S1*u*, a measured value I1*v* of the V-phase current from the current sensor S1*v*, and a measured value I1*w* of the W-phase current from the current sensor S1*w* in step S101. The first electric-angle sensor 13 measures the rotational angle of the first motor 11.

Figures 4A, 4B, 4C, 4D:
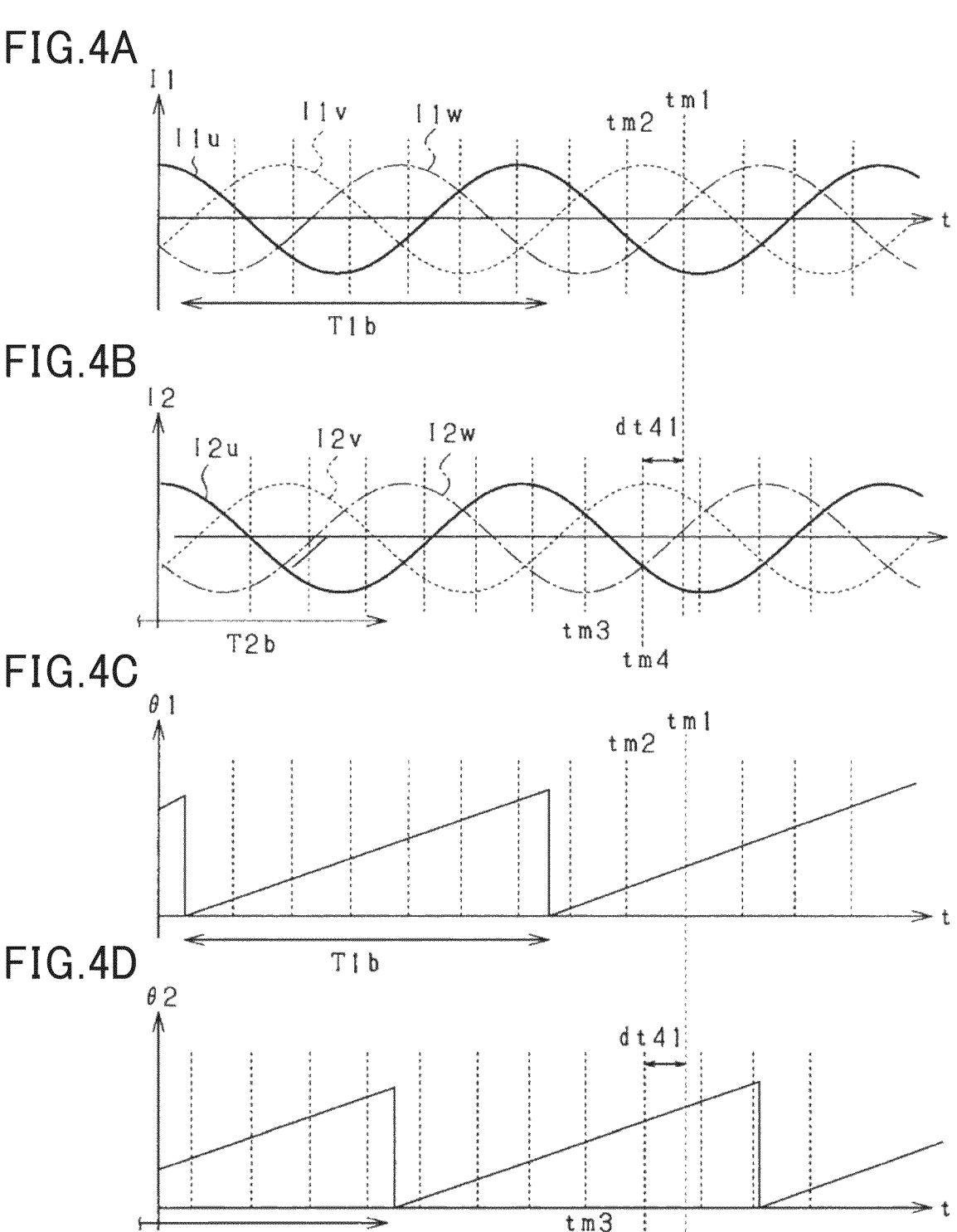
FIGS. 4A to 4D are each a graph, and illustrate a timing chart of current measurement times for the first motor.

FIGS. 4A to 4D, each of which is a graph, illustrate a difference between current measurement times for the second motor 12 and current measurement times for the first motor 11. In each graph, the horizontal axis represents time t. FIG. 4A shows how each of the U-, V-, and W-phase currents I1*u*, I1*v*, and I1*w* flowing through the corresponding one of the U-, V-, and W-phase power lines connected to the first motor 11 is changed over time. FIG. 4B shows that how each of the U-, V-, and W-phase currents I2*u*, I2*v*, and I2*w* flowing through the corresponding one of the U-, V-, and W-phase power lines connected to the second motor 12 is changed over time. FIG. 4C shows how the electric angle θ1 of the first motor 11 is changed over time, and FIG. 4D shows how the electric angle θ2 of the second motor 12 is changed over time.

In step S101, the current measurement unit 150 acquires the measured value I1*m* of the at least one target phase current at a present measurement time tm1 for the first motor 11. The measurement time tm1 is delayed by a time difference dt41 from the latest measurement time tm4 for the second motor 12. Thereafter, the present cycle of the correction routine proceeds to step S102.

Next, the current measurement unit 150 acquires, for each multiphase rotary electric machine, i.e., each motor 11, 12, to be controlled by the control apparatus 10, a corrected value of each-phase current that was corrected at a previous measurement time before the present measurement time in step S102. In the microcomputer 100, corrected values I1*b* of the U-, V-, and W-phase currents for the first motor 11 have been stored; correction of values of the U-, V-, and W-phase currents measured by the respective current sensors S1*u*, S1*v*, and S1*w* at the previous measurement time was carried out to acquire the corrected values I1*b* of the U-, V-, and W-phase currents. Similarly, in the microcomputer 100, corrected values I2*b* of the U-, V-, and W-phase currents for the second motor 12 have been stored; correction of values of the U-, V-, and W-phase currents measured by the respective current sensors S2*u*, S2*v*, and S2*w* at the previous measurement time was carried out to acquire the corrected values I2*b* of the U-, V-, and W-phase currents.

For example, for the first motor 11, values of the U-, V-, and W-phase currents, which were measured at a measurement time tm2 immediately previous the present measurement time tm1, were corrected as immediately previous corrected values of the U-, V-, and W-phase currents; the immediately previous corrected values of the U-, V-, and W-phase currents for the first motor 11 can be used as the corrected values I1*b* of the U-, V-, and W-phase currents for the first motor 11.

For the second motor 12, values of the U-, V-, and W-phase currents, which were measured at a measurement time tm3 immediately previous the latest measurement time tm4, were corrected as immediately previous corrected values of the U-, V-, and W-phase currents; the immediately previous corrected values of the U-, V-, and W-phase currents for the second motor 12 can be used as the corrected values I2*b* of the U-, V-, and W-phase currents for the second motor 12.

After the operation in step S102, the present cycle of the correction routine proceeds to step S103.

In step S103, the current measurement unit 150 acquires the current amplitude A1 of the first motor 11, and the current amplitude A2 of the second motor 12. For example, the current measurement unit 150 calculates the current amplitude A1 based on the corrected values I1*b* of the U-, V-, and W-phase currents for the first motor 11, and calculates the current amplitude A2 based on the corrected values I2*b* of the U-, V-, and W-phase currents for the second motor 12.

More specifically, the current measurement unit 150 transforms the corrected values I1*b* of the U-, V-, and W-phase currents for the first motor 11 into current values in the rotating coordinate system or the stationary coordinate system in accordance with the equations (20) and (21), and calculates the magnitude of the current vector of the transformed current values in the rotating coordinate system or the stationary coordinate system as the current amplitude A1 of the first motor 11 in accordance with the equations (22) to (25). Similarly, the current measurement unit 150 transforms the corrected values I2*b* of the U-, V-, and W-phase currents for the second motor 12 into current values in the rotating coordinate system or the stationary coordinate system in accordance with the equations (20) and (21), and calculates the magnitude of the current vector of the transformed current values in the rotating coordinate system or the stationary coordinate system as the current amplitude A2 of the second motor 12 in accordance with the equations (22) to (25).

Alternatively, the current measurement unit 150 calculates, as illustrated in FIGS. 4A and 4C, the peak amplitude of the waveform based on the corrected values I1*b* of each phase current for the first motor 11 within one electric angular period T1*b* to accordingly calculate the current amplitude A1 of the first motor 11. Similarly, the current measurement unit 150 calculates, as illustrated in FIGS. 4B and 4D, the peak amplitude of the waveform based on the corrected values I2*b* of each phase current for the second motor 12 within one electric angular period T1$b$ to accordingly calculate the current amplitude A2 of the second motor 12.

After the operation in step S103, the present cycle of the correction routine proceeds to step S105.

In step S105, the current measurement unit 150 acquires the electric angle θ1 of the first motor 11, and acquires the current phase φ1 of the first motor 11 estimated based on the voltage commands for the first motor 11. Additionally, in step S105, the current measurement unit 150 acquires the measured electric angle θ2 of the second motor 12, and acquires a predicted electric angle θ2$p$ of the second motor 12 and the current phase φ2 of the second motor 12 estimated based on the voltage commands for the second motor 12.

Specifically, the current measurement unit 150 acquires, from the first electric-angle sensor 13, the electric angle θ1 of the first motor 11 measured by the first electric-angle sensor 13 at the measurement time tm1. The current measurement unit 150 can calculate the predicted electric angle θ2$p$ of the second motor 12 in accordance with (i) a measured electric angle θ2$m$ of the second motor 12 acquired from the second electric-angle sensor 14 at the measurement time tm4, (ii) an angular velocity φ2 of the second motor 12, and (iii) a time difference dt41 between the measurement times tm1 and tm4 using the equation θ2$p$=θ2$m$+ω2×dt41.

The predicted electric angle θ2$p$ of the second motor 12 can be applied to the above equations (13) to (15) in place of the electric angle θ2.

Specifically, if current measurement times for the first motor 11 are non-synchronized with those for the second motor 12 as illustrated in FIGS. 4A to 4D, using the predicted value θ2$p$ of the electric angle θ of the second motor 12 in place of a measured value of the electric angle θ enables reduction in both the measurement frequency of the second electric-angle sensor 14 and the processing load of the microcomputer 100.

After the operation in step S105, the present cycle of the correction routine proceeds to step S106.

In step S106, the current measurement unit 150 calculates an error I1$e$ estimated to arise in the measured value I1$m$ of the at least one target phase current in accordance with, for example, the above equation (13). Specifically, the parameters X11$j$, Y11$j$, X21$j$, and Y21$j$, that is, the parameters X11$u$, Y11$u$, X21$u$, Y21$u$ X11$v$, Y11$v$, X21$v$, Y21$v$ X11$w$, Y11$w$, X21$w$, and Y21$w$, which are constant values, have been previously stored in the microcomputer 100. Substituting the current amplitudes A1 and A2 acquired in step S103 and the electric angle θ1, the current phase φ1, the predicted electric angle θ2$p$, and the current phase φ2 acquired in step S105 to the equation (13) enables the error I1$e$ estimated to arise in the measured value I1$m$ of the at least one target phase current to be calculated at a lighter calculation load.

After the operation in step S106, the present cycle of the correction routine proceeds to step S107.

In step S107, the current measurement unit 150 calculates, based on the measured value I1$m$ and the error I1$e$ of the at least one target phase current, a corrected value I1$a$ of the at least one target phase current at the measurement time tm1.

Specifically, the current measurement unit 150 calculates, based on the measured value I1$u$ and the error I1$e$ of the U-phase current, a true value I1$ru$ of the U-phase current in accordance with the above equation (1), calculates, based on the measured value I1$v$ and the error I1$e$ of the V-phase current, a true value I1$rv$ of the V-phase current in accordance with the above equation (1), and calculates, based on the measured value I1$w$ and the error I1$e$ of the W-phase current, a true value I1$rw$ of the W-phase current in accordance with the above equation (1). The calculated true values I1$ru$, I1$rv$, and I1$rw$ of the respective U-, V-, and W-phase currents correspond to the corrected values I1$a$ of the respective target three-phase currents at the measurement time tm1.

After the operation in step S107, the present cycle of the correction routine proceeds to step S108.

In step S108, the current measurement unit 150 outputs the corrected values I1$a$ of the respective target three-phase currents to the controller 120. The controller 120 controls the first motor 11 based on the corrected values I1$a$ of the respective target three-phase currents. The corrected values I1$a$ of the respective target three-phase currents acquired for the present cycle of the correction routine are stored in the microcomputer 100. That is, the corrected values I1$a$ of the respective target three-phase currents acquired for the present cycle of the correction routine stored in the microcomputer 100 can be used as previous corrected values I1$b$ of the respective target three-phase currents in any of subsequent cycles of the correction routine after the present cycle of the correction routine.

The measured-current correction routine for the second motor 12 illustrated in FIG. 3 can be carried out in the same manner as that for the first motor 11 illustrated in FIG. 2.

In step S201 of the present cycle of the correction routine, the current measurement unit 150 acquires a measured value I2$m$ of at least one target phase current. Specifically, the current measurement unit 150 acquires a measured value I2$u$ of the U-phase current from the current sensor S2$u$, a measured value I2$v$ of the V-phase current from the current sensor S2$v$, and a measured value I2$w$ of the W-phase current from the current sensor S2$w$ in step S201.

Figures 5A, 5B, 5C, 5D:
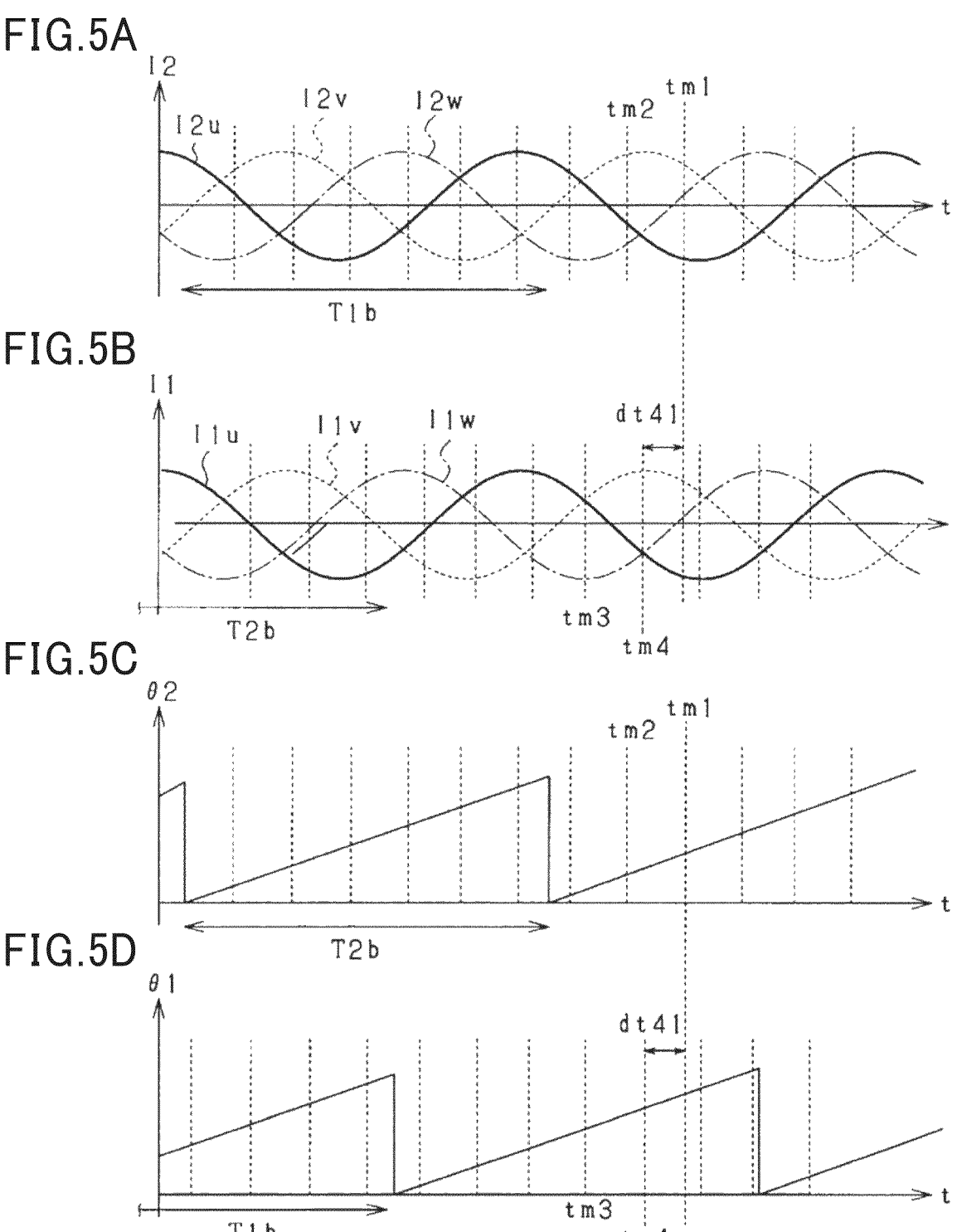
FIGS. 5A to 5D are each a graph, and illustrate a timing chart of current measurement times for the second motor.

FIGS. 5A to 5D, each of which is a graph, illustrate a difference of current measurement times for the first motor 11 from current measurement times for the second motor 12. In each graph, the horizontal axis represents time. FIG. 5A shows how each of the U-, V-, and W-phase currents I2$u$, I2$v$, and I2$w$ flowing through the corresponding one of the U-, V-, and W-phase power lines connected to the second motor 12 is changed over time. FIG. 5B shows that how each of the U-, V-, and W-phase currents I1$u$, I1$v$, and I1$w$ flowing through the corresponding one of the U-, V-, and W-phase power lines connected to the first motor 11 is changed over time. FIG. 5C shows how the electric angle θ2 of the second motor 12 is changed over time, and FIG. 5D shows how the electric angle θ1 of the first motor 11 is changed over time.

Specifically, in step S201, the current measurement unit 150 acquires the measured value I2$m$ of the at least one target phase current at a present measurement time tm1 for the second motor 12. The measurement time tm1 is delayed by a time difference dt41 from the latest measurement time tm4 for the first motor 11. Thereafter, the present cycle of the correction routine proceeds to step S202.

Next, the current measurement unit 150 acquires, for each multiphase rotary electric machine, i.e., each motor 11, 12, to be controlled by the control apparatus 10, a corrected value of each-phase current that was corrected at a previous measurement time before the present measurement time in step S202. In the microcomputer 100, corrected values I2$b$ of the U-, V-, and W-phase currents for the second motor 12 have been stored; correction of values of the U-, V-, and W-phase currents measured by the respective current sensors S2$u$, S2$v$, and S2$w$ at the previous measurement time was carried out to acquire the corrected values I2$b$ of the U-, V-, and W-phase currents. Similarly, in the microcomputer 100, corrected values I1$b$ of the U-, V-, and W-phase currents for the first motor 11 have been stored; correction of values of the U-, V-, and W-phase currents measured by the respective current sensors S1$u$, S1$v$, and S1$w$ at the previous measurement time was carried out to acquire the corrected values I1$b$ of the U-, V-, and W-phase currents.

For example, for the second motor 12, values of the U-, V-, and W-phase currents, which were measured at a measurement time tm2 immediately previous the present measurement time tm1, were corrected as immediately previous corrected values of the U-, V-, and W-phase currents; the immediately previous corrected values of the U-, V-, and W-phase currents for the second motor 12 can be used as the corrected values I2$b$ of the U-, V-, and W-phase currents for the second motor 12.

For the first motor 11, values of the U-, V-, and W-phase currents, which were measured at a measurement time tm3 immediately previous the latest measurement time tm4, were corrected as immediately previous corrected values of the U-, V-, and W-phase currents; the immediately previous corrected values of the U-, V-, and W-phase currents for the first motor 11 can be used as the corrected values I1$b$ of the U-, V-, and W-phase currents for the first motor 11.

After the operation in step S202, the present cycle of the correction routine proceeds to step S203.

In step S203, the current measurement unit 150 acquires the current amplitude A1 of the first motor 11, and the current amplitude A2 of the second motor 12. For example, like the operation in step S103, the current measurement unit 150 calculates the current amplitude A1 based on the corrected values I1$b$ of the U-, V-, and W-phase currents for the first motor 11, and calculates the current amplitude A2 based on the corrected values I2$b$ of the U-, V-, and W-phase currents for the second motor 12. As a method of calculating the current amplitudes A1 and A2, one of the methods of calculating the current amplitudes A1 and A2 described in step S103 can be used.

After the operation in step S203, the present cycle of the correction routine proceeds to step S205.

In step S205, the current measurement unit 150 acquires the measured electric angle θ1 of the first motor 11, and acquires a predicted electric angle θ1$p$ of the first motor 11 and the current phase ϕ1 of the first motor 11 estimated based on the voltage commands for the first motor 11. Additionally, the current measurement unit 150 acquires the electric angle θ2 of the second motor 12, and acquires the current phase ϕ2 of the second motor 12 estimated based on the voltage commands for the second motor 12.

Specifically, the current measurement unit 150 acquires, from the second electric-angle sensor 14, the electric angle θ2 of the second motor 12 measured by the second electric-angle sensor 14 at the measurement time tm1. The current measurement unit 150 can calculate the predicted electric angle θ1$p$ of the first motor 11 in accordance with (i) a measured electric angle 1$m$ of the first motor 11 acquired from the first electric-angle sensor 13 at the measurement time tm4, (ii) an angular velocity ω1 of the first motor 11, and (iii) a time difference dt41 between the measurement times tm1 and tm4 using the equation θ1$p$=θ1$m$+ω1×dt41.

The predicted electric angle θ1$p$ of the first motor 11 can be applied to the above equations (13) to (15) in place of the electric angle θ1.

Specifically, if current measurement times for the first motor 11 are non-synchronized with those for the second motor 12 as illustrated in FIGS. 5A to 5D, using the predicted value θ1$p$ of the electric angle θ of the first motor

11 in place of a measured value of the electric angle θ of the first motor 11 enables reduction in both the measurement frequency of the first electric-angle sensor 13 and the processing load of the microcomputer 100.

After the operation in step S205, the present cycle of the correction routine proceeds to step S206.

In step S206, the current measurement unit 150 calculates an error 12$e$ estimated to arise in the measured value I2$m$ of the at least one target phase current in accordance with, for example, the above equation (18). Specifically, the parameters X12$j$, Y12$j$, X22$j$, and Y22$j$, that is, the parameters X12$u$, Y12$u$, X22$u$, Y22$u$, X12$v$, Y12$v$, X22$v$, Y22$v$ X12$w$, Y12$w$, X22$w$, and Y22$w$, which are constant values, have been previously stored in the microcomputer 100. Substituting the current amplitudes A1 and A2 acquired in step S203 and the electric angle θ2, the current phase ϕ2, the predicted electric angle θ1$p$, and the current phase ϕ1 acquired in step S205 to the equation (18) enables the error 12$e$ estimated to arise in the measured value I2$m$ of the at least one target phase current to be calculated at a lighter calculation load.

After the operation in step S206, the present cycle of the correction routine proceeds to step S207.

In step S207, the current measurement unit 150 calculates, based on the measured value I2$m$ and the error 12$e$ of the at least one target phase current, a corrected value I2$a$ of the at least one target phase current at the measurement time tm1.

Specifically, the current measurement unit 150 calculates, based on the measured value I2$u$ and the error 12$e$ of the U-phase current, a true value I2$ru$ of the U-phase current in accordance with the above equation (19), calculates, based on the measured value I2$v$ and the error 12$e$ of the V-phase current, a true value I2$rv$ of the V-phase current in accordance with the above equation (19), and calculates, based on the measured value I2$w$ and the error 12$e$ of the W-phase current, a true value I2$rw$ of the W-phase current in accordance with the above equation (19). The calculated true values I2$ru$, I2$rv$, and I2$rw$ of the respective U-, V-, and W-phase currents correspond to the corrected values I2$a$ of the respective target three-phase currents at the measurement time tm1.

After the operation in step S207, the present cycle of the correction routine proceeds to step S208.

In step S208, the current measurement unit 150 outputs the corrected values I2$a$ of the respective target three-phase currents to the controller 120. The controller 120 controls the second motor 12 based on the corrected values I2$a$ of the respective target three-phase currents. The corrected values I2$a$ of the respective target three-phase currents acquired for the present cycle of the correction routine are stored in the microcomputer 100. That is, the corrected values I2$a$ of the respective target three-phase currents acquired for the present cycle of the correction routine stored in the microcomputer 100 can be used as previous corrected values I2$b$ of the respective target three-phase currents in any of subsequent cycles of the correction routine after the present cycle of the correction routine.

The microcomputer 100 of the first embodiment has previously calculated and stored the amplitude-correction coefficients, such as parameters X11$u$ and X21$u$, and the angle-correction coefficients, such as Y11$u$ and Y21$u$, based on (i) the predetermined error factors C1$k$1$j$, C2$k$1$j$, C1$k$2$j$, and C2$k$2$j$ and (ii) the phase differences among the phase currents in accordance with the above equations (7) to (10) and (14) to (17).

This enables the current measurement unit 150 to simply calculate (I) The error I1*ej* arising in the measured value of the j-phase current for the first motor 11, with higher accuracy, based on (i) the current amplitude A1 of the first motor 11, (ii) the electric angle θ1 of the first motor 11, (iii) the current phase φ1 of the first motor 11, (iv) the current amplitude A2 of the second motor 12, (v) the electric angle θ2, (vi) the phase φ2 of the j-phase current for the second motor 12 in accordance with, for example, the above equation (13)

(II) The error I2*ej* arising in the measured value of the j-phase current for the second motor 12, with higher accuracy, based on (i) the current amplitude A1 of the first motor 11, (ii) the electric angle θ1, (iii) the phase φ1 of the j-phase current for the first motor 11, (iv) the current amplitude A2 of the second motor 12, (v) the electric angle θ2, (vi) the phase φ2 of the j-phase current for the second motor 12 in accordance with, for example, the above equation (18)

More specifically, the measured-current correction routine for the first motor 11 illustrates in FIG. 2, which is carried out for each measurement time, performs a measured current value acquiring step S101 of acquiring a measured value of at least one target phase current flowing through corresponding at least one target power line.

Additionally, the measured-current correction routine for the first motor 11 acquires a measured value or an estimated value of each of (i) the current amplitude A1 of the first motor 11, (ii) the electric angle θ1 of the first motor 11, (iii) the current phase φ1 of the first motor 11, (iv) the current amplitude A2 of the second motor 12, (v) the electric angle θ2 of the second motor 12, and (vi) the current phase φ2 of the second motor 12.

Then, the measured-current correction routine for the first motor 11 performs correction steps S106 and S107 of calculating, based on the error factors, an error arising in the measured value of the at least one target phase current due to magnetic flux generated by the other non-target power lines to accordingly correct the measured value of the at least one target phase current.

The error factor defined for each of all the power lines of the first and second motors 11 and 12 with respect to the at least one target phase current is a constant value or a variable determined based on (i) one or more shields located between the corresponding current sensor and the corresponding one of all the power lines and (ii) the distance between the corresponding current sensor and the corresponding one of all the power lines. The error factor defined for each of all the power lines with respect to at least one target phase current has been stored in, for example, microcomputer 100.

Similarly, the measured-current correction routine for the second motor 12 illustrates in FIG. 3, which is carried out for each measurement time, performs a measured current value acquiring step S201 of acquiring a measured value of at least one target phase current flowing through corresponding at least one target power line.

Additionally, the measured-current correction routine for the second motor 12 acquires a measured value or an estimated value of each of (i) the current amplitude A1 of the first motor 11, (ii) the electric angle θ1 of the first motor 11, (iii) the current phase φ1 of the first motor 11, (iv) the current amplitude A2 of the second motor 12, (v) the electric angle θ2 of the second motor 12, and (vi) the current phase φ2 of the second motor 12.

Then, the measured-current correction routine for the second motor 12 performs correction steps S206 and S207 of calculating, based on the error factors, an error arising the measured value of the at least one target phase current due to magnetic flux generated from the other non-target power lines to accordingly correct the measured value of the at least one target phase current.

The error factor defined for each of all the power lines of the first and second motors 11 and 12 with respect to the at least one target phase current is a constant value or a variable determined based on (i) one or more shields located between the corresponding current sensor and the corresponding one of all the power lines and (ii) the distance between the corresponding current sensor and the corresponding one of all the power lines. The error factor defined for each of all the power lines with respect to at least one target phase current has been stored in, for example, microcomputer 100.

Accordingly, the above configuration of the control apparatus 10 of the first embodiment enables the current measurement unit 150 to simply calculate the error I1*ej* arising in the measured value of the j-phase current for the first motor 11 and the error I2*ej* arising in the measured value of the j-phase current for the second motor 12 with higher accuracy, making it possible to correct a measured value of at least one target phase current for each of the first and second motors 11 and 12 while balancing both reduction of calculation load of the microcomputer 100 and ensuring of calculation accuracy of the corresponding one of the errors I1*ej* and I2*ej*.

The current measurement unit 150 is configured to calculate the current amplitude A1 of the first motor 11 based on the corrected values I1*b* of the U-, V-, and W-phase currents for the first motor 11, and calculate the current amplitude A2 of the second motor 12 based on the corrected values I2*b* of the U-, V-, and W-phase currents for the second motor 12 (see steps S102, S103, S202, and S203). The corrected values I1*b* of the U-, V-, and W-phase currents for the first motor 11 were corrected at a previous measurement time, and the corrected values I2*b* of the U-, V-, and W-phase currents for the second motor 12 were corrected at a previous measurement time.

This configuration enables calculation of the current amplitudes A1 and A2 of the respective first and second motors 11 and 12 with higher accuracy, resulting in the corrected value I1*a* of the at least one target phase current for the first motor 11 and the corrected value I2*a* of the at least one target phase current for the second motor 12 having higher accuracy.

In particular, the current measurement unit 150 can use, as the corrected values I1*b* of the U-, V-, and W-phase currents for the first motor 11 and the corrected values I2*b* of the U-, V-, and W-phase currents for the second motor 12 at a present cycle of the correction routine, the corrected values I1*a* of the three-phase currents for the first motor 11 and the corrected values I2*a* of the three-phase currents for the second motor 12 calculated at the immediately previous cycle of the correction routine. This therefore results in calculation of the current amplitudes A1 and A2 of the respective first and second motors 11 and 12 with much higher accuracy.

Les us assume that current measurement times for the first motor 11 are non-synchronized with those for the second motor 12. In this assumption, when correcting a measured value of at least one target phase current for one of the first and second motors 11 and 12 at a measurement time thereof, the current measurement unit 150 is configured to use a predicted value of at least one parameter related to the other of the first and second motors 11 and 12 in place of a measured value of the at least one parameter. This therefore enables reduction in both (i) the measurement frequency of the corresponding at least one sensor for measuring the at least one parameter and (ii) the processing load of the microcomputer 100.

In step S105, the current measurement unit 150 can be configured to use, in place of the predicted electric angle θ2p of the second motor 12, a measured value of the electric angle θ2 of the second motor 12 measured at the measurement time tm1. Similarly, in step S205, the current measurement unit 150 can be configured to use, in place of the predicted electric angle θ1p of the first motor 11, a measured value of the electric angle θ1 of the first motor 11 measured at the measurement time tm1.

This modified configuration uses both a measured value of the electric angle of one of the first and second motors 11 and 12, which is a target motor at a measurement time, and a measured value of the electric angle of the other of the first and second motors 11 and 12, which is not a target motor at the measurement time, resulting in the corrected value I1a of the at least one target phase current for the first motor 11 and the corrected value I2a of the at least one target phase current for the second motor 12 having higher accuracy.

As described above, the current measurement unit 150 is capable of simply calculating the error I1ej arising in the measured value of the j-phase current for the first motor 11 and the error I2ej arising in the measured value of the j-phase current for the second motor 12 with higher accuracy. For this reason, the current measurement unit 150 is more preferably applied to a control apparatus, such as the control apparatus 10, equipped with current sensors, such as the current sensors S1u, S1v, S1w, S2u, S2v, and S2w, each of which is configured to measure magnetic flux caused by a current flowing through a corresponding power line to accordingly measure the current that may be likely to have an error.

Second Embodiment

Figure 6:
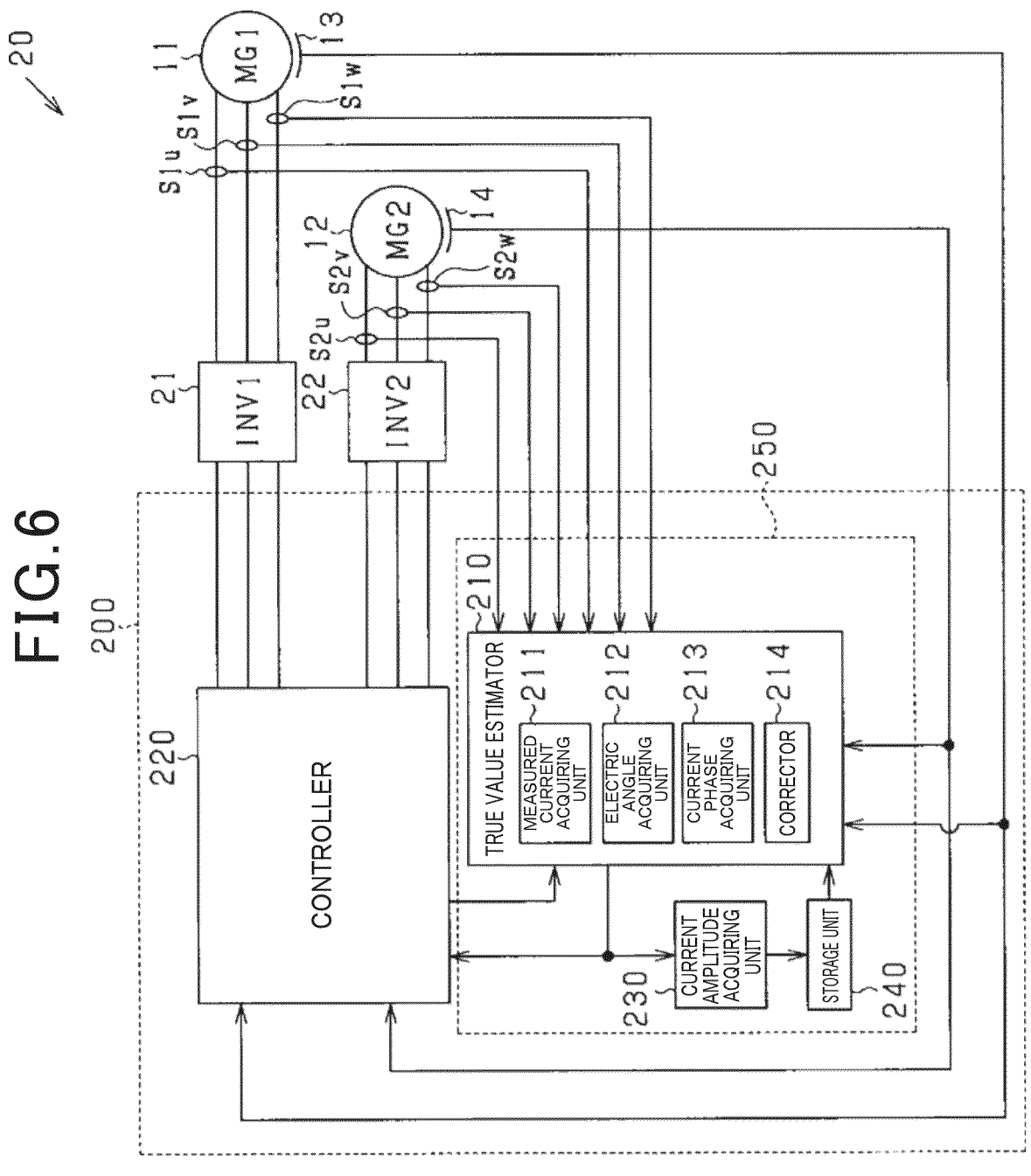
FIG. 6 is a block and circuit diagram illustrating a control apparatus, which includes a current measurement apparatus of the second embodiment, for the rotary electric machines.

FIG. 6 illustrates a control apparatus 20 for rotary electric machines; the control apparatus 20 includes a current measurement unit 250 according to the second embodiment. Referring to FIG. 6, the configuration of the current measurement unit 250 of the control apparatus 20 installed in the microcomputer 200 is different from that of the current measurement unit 150 of the control apparatus 10 installed in the microcomputer 100.

Specifically, the current measurement unit 250 includes a storage unit 240.

Like the current amplitude acquiring unit 130, the current amplitude acquiring unit 230 is configured to be able to directly acquire, from each of the first and second motors 11 and 12, the current amplitude itself of the corresponding one of the first and second motors 11 and 12.

Additionally, the current amplitude acquiring unit 230 is configured to be able to acquire, from each of the first and second motors 11 and 12, a parameter, such as the current waveform, related to the current amplitude of the corresponding one of the first and second motors 11 and 12, and calculate or estimate the current amplitude of each of the first and second motors 11 and 12 based on the parameter related to the current amplitude of the corresponding one of the first and second motors 11 and 12. That is, the current amplitude acquiring unit 230 is configured to be able to handle the calculated current amplitude of each of the first and second motors 11 and 12 as the acquired current amplitude of the corresponding one of the first and second motors 11 and 12. Then, the current amplitude acquiring unit

230 is configured to output the acquired current amplitude of each of the first and second motors 11 and 12 to the storage unit 240. The storage unit 240 is configured to output the acquired current amplitude of each of the first and second motors 11 and 12 to the true value estimator 210.

Let us consider a case where the current amplitude of each of the first motor 11 and the second motor 12 is estimated based on the magnitude of the current vector in the rotating coordinate system or stationary coordinate system. In this case, the current amplitude acquiring unit 230 can be configured to multiply the magnitude of the current vector in the stationary coordinate system or the rotating coordinate system by the coordinate transformation coefficient Ca shown in the equation (22) or (23), and thereafter output the product to the storage unit 240. Alternatively, in this case, the current amplitude acquiring unit 230 can be configured to calculate the magnitude of the current vector in the rotating coordinate system or stationary coordinate system, and output the amplitude of the current vector in the rotating coordinate system or stationary coordinate system to the storage unit 240. Then, the storage unit 240 or the true value estimator 210 can be configured to multiply the magnitude of the current vector in the stationary coordinate system or the rotating coordinate system by the coordinate transformation coefficient Ca shown in the equation (22) or (23).

The storage unit 240 can be configured to store a first map created based on a first relationship between the variable of a current value through each of the multiphase power lines of the first and second motors 11 and 12 and the error factor defined for the corresponding one of the multiphase power lines.

The storage unit 240 can also be configured to store a second map representing a second relationship between (I) The variable of the error I1ej
(II) The variable of the electric angle θ1
(III) The variable of the electric angle θ2
(IV) The variable of the current phase φ1
(V) The variable of the current phase φ2
The second map additionally represents a third relationship between
(I) The variable of the error I2ej
(II) The variable of the electric angle θ1
(III) The variable of the electric angle θ2
(IV) The variable of the current phase φ1
(V) The variable of the current phase φ2
For example, let us assume that
(1) The product of the current amplitude A1 and the amplitude-correction coefficient X11j included in the equation (13) will be referred to as a corrected current amplitude Z11j
(2) The product of the current amplitude A2 and the amplitude-correction coefficient X21j included in the equation (13) will be referred to as a corrected current amplitude Z21j
(3) The product of the current amplitude A1 and the amplitude-correction coefficient X12j included in the equation (18) will be referred to as a corrected current amplitude Z12j
(4) The product of the current amplitude A2 and the amplitude-correction coefficient X22j included in the equation (18) will be referred to as a corrected current amplitude Z22j
At that time, the second relationship can be expressed as a map defined by the following equation (26) using the corrected current amplitudes Z11j, Z21j, Z12j, and Z22j, and the third relationship can be expressed as a map defined by the following equation (27) using the corrected current amplitudes Z11$j$, Z21$j$, Z12$j$, and Z22$j$:

$$I1ej=Z11j\times\sin(\theta1+\phi1+Y11j)+Z21j\times\sin(\theta2+\phi2+Y21j) \quad (26)$$

$$I2ej=Z12j\times\sin(\theta1+\phi1+Y11j)+Z22j\times\sin(\theta2+\phi2+Y22j) \quad (27)$$

where:

the corrected current amplitude Z11$j$ is A1×X11$j$;

the corrected current amplitude Z21$j$ is A2×X21$j$;

the corrected current amplitude Z12$j$ is A1×X12$j$; and the corrected current amplitude Z22$j$ is A2×X22$j$ The corrected amplitudes Z11$j$, Z21$j$, Z12$j$, and Z22$j$ and the angle-correction coefficients Y11$j$, Y21$j$, Y12$j$, and YZ22$j$ can be mapped as the second map, and the second map can be stored in the storage unit 240.

The corrector 214 can be configured to refer to the second map stored in the storage unit 240 using the electric angles θ1 and θ2 and the current phases φ1 and φ2 to accordingly retrieve, from the second map, (i) values of the corrected amplitudes Z11$j$, Z21$j$, Z11$j$, and Z22$j$ corresponding to the electric angles θ1 and θ2 and the current phases φ1 and φ2, and (ii) values of the angle-correction coefficients Y11$j$, Y21$j$, Y12$j$, and YZ22$j$ corresponding to the electric angles θ1 and θ2 and the current phases φ1 and φ2.

This enables the corrector 214 to simply calculate (i) the error I1$ej$ in accordance with the retrieved corrected current amplitudes Z11$j$ and Z21$j$ and the retrieved angle-correction coefficients Y11$j$ and Y21$j$, and (ii) the error I2$ej$ in accordance with the retrieved corrected current amplitudes Z12$j$ and Z22$j$ and the retrieved angle-correction coefficients Y12$j$ and Y22$j$.

Alternatively, if the storage unit 240 stores the first map, the corrector 214 can be configured to refer to the first map to accordingly correct a measured value of at least one target phase current for the first motor 11, and a measured value of at least one target phase current for the second motor 12.

The other configuration of the microcomputer 200 is identical to the corresponding configuration of the microcomputer 100. For this reason, descriptions of the other configuration of the microcomputer 200 are omitted, and hereinafter, the hundreds digit of the reference number assigned to each component of the other configuration of the microcomputer 200, which is 1 in the first embodiment, will be is replaced with 2.

FIG. 7 illustrates a flowchart of a measured-current correction routine to be executed by the current measurement unit 250 for a target phase power line connected to the first motor 11, and FIG. 8 illustrates a flowchart of a measured-current correction routine to be executed by the current measurement unit 250 for a target phase power line connected to the second motor 12.

The current measurement unit 250 is configured to iterate, as a measurement cycle, the measured-current correction routine illustrated in FIG. 7 at regular intervals, and iterate, as a measurement cycle, the measured-current correction routine illustrated in FIG. 8 at regular intervals.

The measured-current correction routine illustrated in FIG. 7 differs from the measured-current correction routine illustrated in FIG. 2 in the following point that the measured-current correction routine illustrated in FIG. 7 includes an operation in step S304. That is, the operations in steps S301 to S303 and S305 to S308 are identical to the operation in steps S101 to S103 and S105 to S108, and therefore, descriptions of the operations steps S301 to S303 and S305 to S308 are omitted. Similarly, the operations in steps S401 to S403 and S405 to S408 are identical to the operation in steps S201 to S203 and S205 to S208, and therefore, the descriptions of the operations steps S401 to S403 and S405 to S408 are omitted.

Like the operation in step S103 of FIG. 2, the current measurement unit 250 acquires the current amplitude A1 of the first motor 11, and the current amplitude A2 of the second motor 12 in S303 of FIG. 7. After the operation in step S303, the correction routine proceeds to step S304.

In step S304, the current measurement unit 250 retrieves, from the second map, the corrected amplitudes Z11$u$, Z11$v$, Z11$w$, Z21$u$, Z21$v$, and Z21$w$ and the angle-correction coefficients Y11$u$, Y11$v$, Y11$w$, Y21$u$, Y21$v$, and Y21$w$. After the operation in step S303, the present cycle of the correction routine proceeds to step S305.

In step S305, like the operation in step S105, the current measurement unit 250 acquires the electric angle θ1 of the first motor 11, and acquires the current phase φ1 of the first motor 11 estimated based on the voltage commands for the first motor 11. Additionally, in step S305, the current measurement unit 150 acquires the measured electric angle θ2 of the second motor 12, and acquires a predicted electric angle θ2$p$ of the second motor 12 and the current phase φ2 of the second motor 12 estimated based on the voltage commands for the second motor 12. After the operation in step S305, the present cycle of the correction routine proceeds to step S306.

In step S306, the current measurement unit 250 calculates the error I1$e$ estimated to arise in the measured value I1$m$ of the at least one target phase current in accordance with the above equation (26).

Like the operation in step S203 of FIG. 3, the current measurement unit 250 acquires the current amplitude A1 of the first motor 11, and the current amplitude A2 of the second motor 12 in S403 of FIG. 8. After the operation in step S403, the correction routine proceeds to step S404.

In step S404, the current measurement unit 250 retrieves, from the second map, the corrected amplitudes Z12$u$, Z12$v$, Z12$w$, Z22$u$, Z22$v$, and Z22$w$ and the angle-correction coefficients Y12$u$, Y12$v$, Y12$w$, Y22$u$, Y22$v$, and Y22$w$. After the operation in step S403, the present cycle of the correction routine proceeds to step S405.

In step S405, like the operation in step S205, the current measurement unit 250 acquires the measured electric angle θ1 of the first motor 11, and acquires a predicted angle θ1$p$ of the first motor 11 and the current phase φ1 of the first motor 11 estimated based on the voltage commands for the first motor 11. Additionally, the current measurement unit 150 acquires the electric angle θ2 of the second motor 12, and acquires the current phase φ2 of the second motor 12 estimated based on the voltage commands for the second motor 12.

After the operation in step S405, the present cycle of the correction routine proceeds to step S406.

In step S406, the current measurement unit 250 calculates the error I2$e$ estimated to arise in the measured value I2$m$ of the at least one target phase current in accordance with the above equation (27).

The storage unit 240 of the microcomputer 200 stores the corrected amplitudes Z11$j$, Z21$j$, Z12$j$, and Z22$j$ and the angle-correction coefficients Y11$j$, Y21$j$, Y12$j$, and YZ22$j$ as the second map. This enables, as shown in the equations (26) and (27), the error I1$ej$ and the error I2$ej$ to be simply calculated based on the electric angle θ1 and the current phase φ1 of the first motor 11 and the electric angle θ2 and the current phase φ2 of the second motor 12, making it possible to further reduce the calculation load of the microcomputer 200.

As shown in the equations (26) and (27), the second embodiment enables the corrected value I1$a$ of the at least one target phase current for the first motor 11 and the corrected value I2$a$ of the at least one target phase current for the second motor 12 to be calculated without using the current amplitudes A1 and A2 calculated in respective steps S303 and S403. The current amplitudes A1 and A2 calculated in respective steps S303 and S403 can be used for the storage unit 240 to update the second map.

The first and second embodiments can achieve the following advantageous benefits.

The current measurement unit (150, 250) is applicable to the control apparatus (10, 20) for a multiphase rotary electric machine. The current measurement unit (150, 250) serves as a current measurement apparatus for measuring a phase current flowing through a corresponding phase power line connected to the first motor 11 as the multiphase rotary electric machine and for measuring a phase current flowing through a corresponding phase power line connected to the second motor 12 as the multiphase rotary electric machine.

Specifically, the current measurement unit (150, 250) includes the measured current acquiring unit (111, 211), the electric angle acquiring unit (112, 212), the current phase acquiring unit (113, 213), and the corrector (114, 214).

The measured current acquiring unit (111, 211) is configured to acquire, from a corresponding at least one of the current sensors, a measured value of at least one target phase current flowing through a corresponding phase power line.

The electric angle acquiring unit (112, 212) is configured to acquire a rotational angle of the multiphase rotary electric machine.

The current phase acquiring unit (113, 212) is configured to acquire, from the multiphase rotary electric machine, the current phase of the multiphase rotary electric machine.

The current amplitude acquiring unit (130, 230) is configured to acquire, from the multiphase rotary electric machine, an amplitude of a selected phase current as a current amplitude of the multiphase rotary electric machine.

The sum of plural-phase products, each of which is the product of the phase current flowing through the corresponding one of the multiphase power lines and the error factor defined for the corresponding one of the multiphase power lines, enables an error arising in the measured value of the at least one target phase current to be calculated.

Specifically, the corrector (114, 214) is configured to calculate the error arising in the measured value of the at least one target phase current as a function of the error factor defined for each of the multiphase power lines, the phase differences among the multiphase rotary electric machine, acquired current amplitude of the multiphase rotary electric machine, the acquired electric angle of the multiphase rotary electric machine, and the acquired current phase of the multiphase rotary electric machine. Then, the corrector (114, 214) is configured to correct the measured value of the at least one target phase current based on the calculated error.

When correcting a measured value of at least one target phase current, the current measurement unit (150, 250) makes it possible to calculate the error arising in the measured value of the at least one target phase current based on (i) the current amplitude acquired by the current amplitude acquiring unit (130, 230), (ii) the electric angle acquired by the electric angle acquiring unit (112, 212), and (iii) the current phase acquired by the current phase acquiring unit (113, 213). This therefore makes it possible to correct a measured value of the at least one target phase current while balancing both reduction of calculation load of the error and ensuring of calculation accuracy of the error.

The measured current acquiring unit (111, 211) can be configured to iteratively acquire a measured value of each phase current.

When the measured current acquiring unit (111, 211) acquiring a measured value of at least one target phase current at a present measurement time, the current amplitude acquiring unit (130, 230) can be configured to (I) Acquire, based on corrected values (I1$b$, I2$b$) of respective previous measured values of the at least one target phase current, which were measured by the measured current acquiring unit (111, 211) and corrected by the corrector (114, 214) at respective previous measurement times, a current waveform of the corrected values (I1$b$, I2$b$) of the respective previous measured values of the at least one target phase current (II) Acquire, from the acquired current waveform, a current amplitude (A1, A2) of the multiphase rotary electric machine Correcting the measured value of the at least one target phase current at the present measurement time based on the high-accuracy current amplitude (A1, A2) acquired based on the corrected values (I1$b$, I2$b$) of the respective previous measured values of the at least one target phase current enables the corrected value (I1$a$, I2$a$) of the at least one target current at the present measurement time to have higher accuracy.

In particular, when the measured current acquiring unit (111, 211) acquiring a measured value of the at least one target phase current at a present measurement time, the current amplitude acquiring unit (130, 230) can be configured to calculate a waveform parameter related to the current amplitude (A1, A2) of the multiphase rotary electric machine in accordance with corrected values (I1$b$, I2$b$) of previous measured values of the at least one target phase current, which were measured by the measured current acquiring unit (111, 211) and corrected by the corrector (114, 214) at an immediately previous measurement time immediately previous to the present measurement time. Then, the current amplitude acquiring unit (130, 230) can be configured to determine the current amplitude of the multiphase rotary electric machine based on the calculated waveform parameter. This enables the current amplitude (A1, A2) of the multiphase rotary electric machine to have much higher accuracy, making it possible to contribute a further improvement of the accuracy of the corrected value (I1$a$, I2$a$) of the target phase current at the present measurement time.

The corrector (114, 214) can be configured to (I) Previously calculate the amplitude-correction coefficients, such as parameters X11$u$ and X21$u$, based on the predetermined error factors and the phase differences among the phase currents (II) Previously calculate the angle-correction coefficients, such as Y11$u$ and Y21$u$, based on the predetermined error factors and the phase differences among the phase currents (III) Correct the acquired current amplitude (A1, A2) based on the amplitude-correction coefficients (IV) Correct the acquired electric angle and the acquired current phase based on the angle-correction coefficients (V) Correct the measured value of the target phase current based on the corrected current amplitude, the corrected electric angle, and the corrected current phase This configuration enables the current measurement unit (150, 250) to cyclically execute the measured-current correction routine based on the previously calculated amplitude-correction coefficients and angle-correction coefficients, resulting in reduction of the computing load of the current measurement unit (150, 250).

The current measurement unit 250 can include the storage unit 240 in which the second map is stored; the second map represents a relationship between (i) the variable of the error arising in a measured value of the target phase current, (ii) the variable of the electric angle of the multiphase rotary electric machine, and (iii) the variable of the current phase of the multiphase rotary electric machine. This enables the corrector 214 to refer to the second map based on a value of the electric angle and a value of the current phase to accordingly correct the measured value of the target phase current.

Let us assume that the current measurement apparatus set forth above is applied to a control apparatus for a plurality of multiphase rotary electric machines.

In this assumption, the corrector can be configured to calculate, for each multiphase rotary electric machine, an error in a measured value of at least one target current in accordance with (i) predetermined error factors, (ii) phase differences among all the phase currents, (iii) an acquired current amplitude, (iv) an acquired electric angle, and (v) an acquired current phase. Then, the corrector can be configured to correct the measured value of the at least one target phase current based on the errors respectively calculated for all the phase currents of all the multiphase rotary electric machines.

The corrector (114, 214) can be configured to calculate a time difference, such as a time difference dt41, between (i) a first measurement time, such as a measurement time tm1, of measuring a value of at least one target phase current flowing through a corresponding power line connected to a first multiphase rotary electric machine and (ii) a second measurement time, such as a measurement time tm4, of measuring a value of a phase current flowing in a second multiphase rotary electric machine. Then, the corrector (114, 214) can be configured to predict an electric angle of the second rotary electric machine at the first measurement time based on the calculated time difference. This configuration enables reduction in both the measurement frequency of an electric-angle sensor for measuring the electric angle of the second rotary electric machine and the processing load of the current measurement apparatus.

When a value of at least one target phase current flowing through a corresponding power line connected to a first rotary electric machine is measured at a scheduled measurement time, the electric angle acquiring unit (112, 212) can be configured to acquire an electric angle of a second rotary electric machine in synchronization with the first measurement time. This configuration uses the electric angle of the second rotary electric machine measured at the scheduled measurement time for the first rotary electric machine, which is an unscheduled measurement time for the second rotary electric machine. Accordingly, it is possible to improve the accuracy of a corrected value of the at least one target phase current.

The current amplitude acquiring unit (130, 230) can be configured to acquire the peak amplitude of the waveform of a selected at least one phase current for a multiphase rotary electric machine during at least one electric-angular period thereof as the current amplitude of the multiphase rotary electric machine. This configuration reduces the calculation load required to calculate the current amplitude.

The current amplitude acquiring unit (130, 230) can be configured to transform at least two-phase currents in a three-phase coordinate system flowing through at least two power lines for a multiphase rotary electric machine into two-phase currents in a rotating coordinate system or a stationary coordinate system to accordingly acquire, based on the amplitude of the current vector of the two-phase currents, the current amplitude of the multiphase rotary electric machine.

The current amplitude acquiring unit (130, 230) can be configured to acquire the current amplitude of a multiphase rotary electric machine in accordance with a current waveform defined by current commands for controlling drive of the multiphase rotary electric machine. This enables the current amplitude acquiring unit (130, 230) to acquire the current amplitude of the multiphase rotary electric machine only each time the current waveform is changed, making it possible to reduce the load required to acquire the current amplitude. The current phase acquiring unit (113, 213) can be configured to acquire the current phase defined by the current commands for controlling drive of the multiphase rotary electric machine as the current phase of the multiphase rotary electric machine.

The current measurement unit (150, 250) is more preferably applied to a control apparatus equipped with current sensors, such as the current sensors S1$u$, S1$v$, S1$w$, S2$u$, S2$v$, and S2$w$, each of which is configured to measure magnetic flux caused by a current flowing through a corresponding power line to accordingly measure the current.

Third Embodiment

Figure 9:
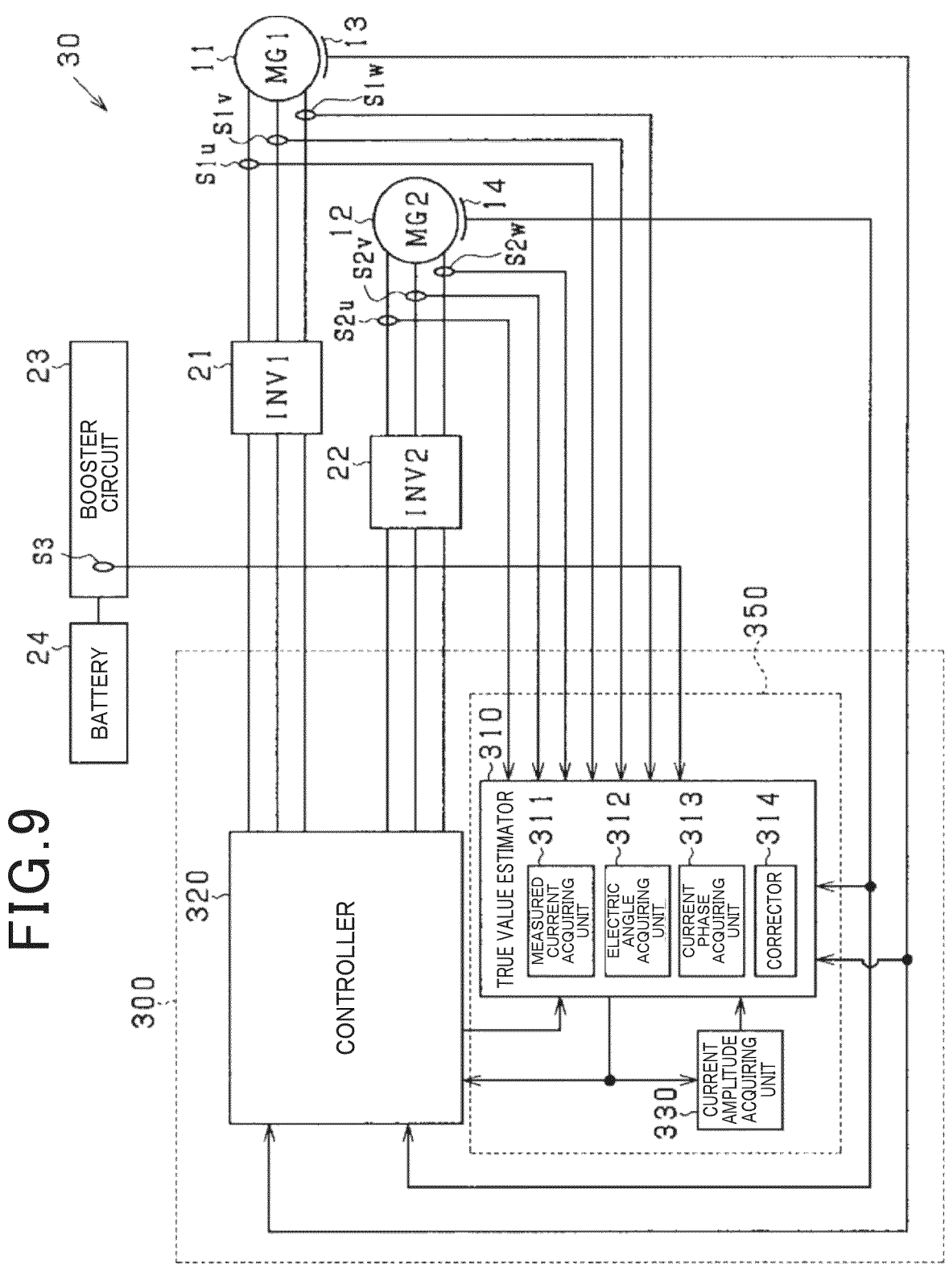
FIG. 9 is a block and circuit diagram illustrating a control apparatus, which includes a current measurement apparatus of the third embodiment, for the rotary electric machines.

FIG. 9 illustrates a control apparatus 30 for rotary electric machines; the control apparatus 30 includes a current measurement unit 350 according to the third embodiment. Referring to FIG. 9, the control apparatus 30 has a configuration, which is different from the configuration of the control apparatus 10, that the control apparatus 30 includes a booster circuit 23, a battery 24, and a current sensor S3, and the current measurement unit 350 of the control apparatus 30 is configured to correct a current value measured by the current sensor S3. That is, the current measurement technologies described in the present disclosure can be applied to such a control apparatus in which one or more current sensors are provided in addition to the current sensors provided for the respective power lines for the first and second motors 11 and 12.

The booster circuit 23 is configured to supply power outputted from the battery 24 to each of the first and second inverters 21 and 22. The current sensor S3 is provided on a power line included in the booster circuit 23, and is configured to measure magnetic flux generated based on a current I3 flowing through the power line of the booster circuit 23 to accordingly measure the current I3 flowing through the power line of the booster circuit 23.

A measured current acquiring unit 311 is configured to acquire, from the current sensors S1$u$, S1$v$, S1$w$, S2$u$, S2$v$, and S2$w$, measured values of phase currents I1$u$, I1$v$, I1$w$, I2$u$, I2$v$, and I2$w$ flowing through the corresponding phase power lines measured by the current sensors S1$u$, S1$v$, S1$w$, S2$u$, S2$v$, and S2$w$, respectively. Additionally, the measured current acquiring unit 311 is configured to acquire, from the current sensor S3, a measured value of the current I3 flowing through the power line of the booster circuit 23 measured by the current sensor S3. The measured current acquiring unit 311 can be configured to acquire, from sensors selected from the current sensors S1$u$, S1$v$, S1$w$, S2$u$, S2$v$, S2$w$, and S3, measured values of currents measured by the selected sensors at a given measurement time.

Like the electric angle acquiring unit 112, an electric angle acquiring unit 312 is configured to acquire, from the first electric-angle sensor 13, the electric angle θ1 of the first motor 11 measured by the first electric-angle sensor 13, and acquire, from the second electric-angle sensor 14, the electric angle θ2 of the second motor 12 measured by the second electric-angle sensor 14.

Like the current phase acquiring unit 113, a current phase acquiring unit 313 is configured to acquire, from each of the first and second motors 11 and 12, the current phase φ1, 2 of the corresponding one of the first and second motors 11 and 12.

A corrector 314 is configured to correct values of the phase currents I1$u$, I1$v$, I1$w$, I2$u$, I2$v$, I2$w$, and 13 measured by the respective current sensors S1$u$, S1$v$, S1$w$, S2$u$, S2$v$, S2$w$, and 13.

Let us assume that a measured value of the current I3 flowing through the booster circuit 23 is represented as 13$m$, a true value of the current I3 flowing through the booster circuit 23 is represented as 13$r$, and an error arising in the measured value of the current I3 flowing through the booster circuit 23 is represented as 13$e$. In this assumption, the measured value I3$m$ of the current I3 can be expressed by the following equation (28):

$$I3m = I3r + I3e \tag{28}$$

The error I3$e$ is subjected to a current flowing through each power line for the first motor 11, a current flowing through each power line for the second motor 12, and the current I3 flowing through the booster circuit 23. Assuming that an error arising in the measured value of the current I3 due to the current flowing through each power line for the first motor 11 is represented as I13$ej$, an error arising in the measured value of the current I3 due to the current flowing through each power line for the second motor 12 is represented as I23$ej$, and an error arising in the measured value of the current I3 due to the current I3 is represented as 133$e$, the error I3$e$ can be expressed by the following equation (29):

$$I3e = I13ej + I23ej + I33e \tag{29}$$

The error 133$e$ due to the current I3 flowing through the booster circuit 23 can be calculated by the product of the true value I3$r$ of the current I3 flowing through the booster circuit 23 and a corresponding error factor C33 (see the following equation (30)):

$$I33e = C33 \times I3r \tag{30}$$

Similarly, the error I1$ej$ arising in the measured value of the j-phase current for the first motor 11 is subjected to a current flowing through each power line for the first motor 11, a current flowing through each power line for the second motor 12, and the current I3 flowing through the booster circuit 23, and the error I2$ej$ arising in the measured value of the j-phase current for the second motor 12 is subjected to a current flowing through each power line for the first motor 11, a current flowing through each power line for the second motor 12, and the current I3 flowing through the booster circuit 23.

Assuming that an error arising in the measured value of the j-phase current for the first motor 11 due to the current I3 flowing through the booster circuit 23 is represented as I31$e$ and an error arising in the measured value of the j-phase current for the second motor 12 due to the current I3 flowing through the booster circuit 23 is represented as 132$e$, the error I1$ej$ arising in the measured value of the j-phase current for the first motor 11 can be expressed by the following equation (31), and the error I2$ej$ arising in the measured value of the j-phase current for the second motor 12 can be expressed by the following equation (32):

$$I1ej = I11ej + I21ej + I31e \tag{31}$$

$$I2ej = I12ej + I22ej + I32e \tag{32}$$

The above equation (31) is equivalent to the equation (3), to the right-hand side of which the error I31$e$ has been added, and the above equation (32) is equivalent to the equation (4), to the right-hand side of which the error 132$e$ has been added. The error I31$e$ due to the current I3 flowing through the booster circuit 23 can be calculated by the product of the true value I3$r$ of the current I3 flowing through the booster circuit 23 and corresponding error factors C31$j$ (see the following equation (33)), and the error 132$e$ due to the current I3 flowing through the booster circuit 23 can be calculated by the product of the true value I3$r$ of the current I3 flowing through the booster circuit 23 and corresponding error factors C32$j$ (see the following equation (34)):

$$I31e = C31j \times I3r \tag{33}$$

$$I32e = C32j \times I3r \tag{34}$$

The error factors C31$j$, C32$j$, and C33 are constant values or variables that have been known since the design phase of the current measurement unit 350. The index "31$j$" attached to the error factor C31$j$ represents that an energized power line is the power line included in the booster circuit 23, and that a target phase, i.e., an evaluation-target phase, is the j-phase of the first motor 11. Similarly, the index "32$j$" attached to the error factor C32$j$ represents that an energized power line is the power line included in the booster circuit 23, and that a target phase, i.e., an evaluation-target phase, is the j-phase of the second motor 12. Additionally, the index "33" attached to the error factor C33 represents that an energized power line and a target power line, i.e., an evaluation-target power line, is the power line included in the booster circuit 23.

The errors I11$ej$ and I21$ej$ included in the above equation (31) can be expressed by the respective equations (5) and (6) set forth above. That is, the error I11$ej$ can be expressed by the equation (11) set forth above using the correction coefficients X11$j$ and Y11$j$ expressed by the respective equations (7) and (8). Similarly, the error I21$ej$ can be expressed by the equation (12) set forth above using the correction coefficients X21$j$ and Y21$j$ expressed by the respective equations (9) and (10).

Interchanging specified indices "1" with corresponding indices "2" in each of the equations (5) and (6) enables the errors I12$ej$ and I22$ej$ included in the above equation (32) to be expressed by the respective modified equations (5) and (6). Additionally, the error I12$ej$ can be expressed by the equation (11) set forth above using the correction coefficients X12$j$ and Y12$j$ expressed by the respective equations (14) and (15). Similarly, the error I22$ej$ can be expressed by the equation (12) set forth above using the correction coefficients X22$j$ and Y22$j$ expressed by the respective equations (16) and (17).

Specifically, the errors I12$ej$ and I22$ej$ can be respectively expressed by the following equations (35) and (36):

$$I12ej = A1 \times X12j \times \sin(\theta1 + \phi1 + Y12j) \qquad (35)$$

$$I22ej = A2 \times X22j \times \sin(\theta2 + \phi2 + Y22j) \qquad (36)$$

Similarly, the errors I13$ej$ and I23$ej$ shown in the equation (29) can be respectively expressed in accordance with the following equations (37) and (38):

$$I13ej = A1 \times X13 \times \sin(\theta1 + \phi1 + Y13) \qquad (37)$$

$$I23ej = A2 \times X23 \times \sin(\theta2 + \phi2 + Y23) \qquad (38)$$

In the equations (37) and (38), the parameters X13 and X23 will be referred to as amplitude-correction coefficients, and the parameters Y13 and Y23 will be referred to as angle-correction coefficients. The amplitude-correction coefficients X13 and X23 can be calculated respectively in accordance with the following equations (39) and (40), and the angle-correction coefficients Y13 and Y23 can be calculated respectively in accordance with the following equations (41) and (42).

The error factor C1$k$3 included in the following equations (39) and (40) is an error factor corresponding to a k-phase current for the first motor 11 (k is each of U, V, and W), and an error arising in the current I3 flowing through the booster circuit 23 due to the k-phase current for the first motor 11 (k is each of U, V, and W) can be calculated in accordance with the product of a true value I1$rk$ of the k-phase current for the first motor 11 and the corresponding error factor C1$k$3. Similarly, the error factor C2$k$3 included in the following equations (41) and (42) is an error factor corresponding to a k-phase current for the second motor 12 (k is each of U, V, and W), and an error arising in the current I3 flowing through the booster circuit 23 due to the k-phase current for the second motor 12 (k is each of U, V, and W) can be calculated in accordance with the product of a true value I2$rk$ of the k-phase current for the second motor 12 and the corresponding error factor C2$k$3.

$$X13 = \sqrt{\left\{ \frac{1}{4}(2C1u3 - C1w3 - C1v3)^2 + \frac{3}{4}(C1w3 - C1v3)^2 \right\}} \qquad (39)$$

$$Y13 = \arcsin \left( \frac{\frac{\sqrt{3}}{2}(C1w3 - C1v3)}{\left\{ \frac{1}{4}(2C1u3 - C1w3 - C1v3)^2 + \frac{3}{4}(C1w3 - C1v3)^2 \right\}} \right) \qquad (40)$$

$$X23 = \sqrt{\left\{ \frac{1}{4}(2C2u3 - C2w3 - C2v3)^2 + \frac{3}{4}(C2w3 - C2v3)^2 \right\}} \qquad (41)$$

$$Y23 = \arcsin \left( \frac{\frac{\sqrt{3}}{2}(C2w3 - C2v3)}{\left\{ \frac{1}{4}(2C2u3 - C2w3 - C2v3)^2 + \frac{3}{4}(C2w3 - C2v3)^2 \right\}} \right) \qquad (42)$$

From the above equations (28), (37), and (38), the following equation (43) is derived, and the equation (43) enables the true value I3$r$ of the current i3 to be calculated.

$$I3r = \frac{\{I3m - A1 \times X13\sin(\theta1 + \phi1 + Y13) - A2 \times X23\sin(\theta2 + \phi2 + Y23)\}}{1 + C33} \qquad (43)$$

The above equation (1) enables the true value of the j-phase current (j=each of U, V, and W) for the first motor 11 to be expressed as I1$rj$=I1$mj$–I1$ej$, and the true value of the j-phase current (j=each of U, V, and W) for the second motor 12 to be expressed as I2$rj$=I2$mj$–I2$ej$.

Then, the above equations (11), (12), and (31) to (36) enable the following equations (44) and (45) to be obtained:

$$I1rj = I1mj - I1ej \qquad (44)$$
$$= I1mj - \{A1 \times X11j \times \sin(\theta1 + \phi1 + Y11j)$$
$$+ A2 \times X21j \times \sin(\theta2 + \phi2 + Y21j) + C31j \times I3r\}$$

$$I2rj = I2mj - I2ej \qquad (45)$$
$$= I2mj - \{A1 \times X12j \times \sin(\theta1 + \phi1 + Y12j)$$
$$+ A2 \times X22j \times \sin(\theta2 + \phi2 + Y22j) + C32j \times I3r\}$$

The above equations (43) to (45) enable the true value I1$j$ of the j-phase current (j=each of U, V, and W) for the first motor 11, the true value I2$j$ of the j-phase current (j=each of U, V, and W) for the second motor 12, and the true value Ir3 of the current I3 flowing through the booster circuit 23 to be calculated.

Like the first embodiment, the current amplitude acquiring unit 330 can be configured to transform at least two-phase currents in the three-phase coordinate system flowing through at least two power lines for the first motor 11 or the second motor 12 into two-phase currents in the rotating coordinate system, i.e., the dq coordinate system, or the stationary coordinate system, i.e., the αβ coordinate system, to accordingly acquire, based on the amplitude of the current vector of the two-phase currents, the current amplitude of the first motor 11 or the second motor 12. In this modification, the above equations (43) to (45) enable the true value I1$j$ of the j-phase current (j=each of U, V, and W) for the first motor 11, the true value I2$j$ of the j-phase current (j=each of U, V, and W) for the second motor 12, and the true value Ir3 of the current I3 flowing through the booster circuit 23 to be calculated.

Figure 10:
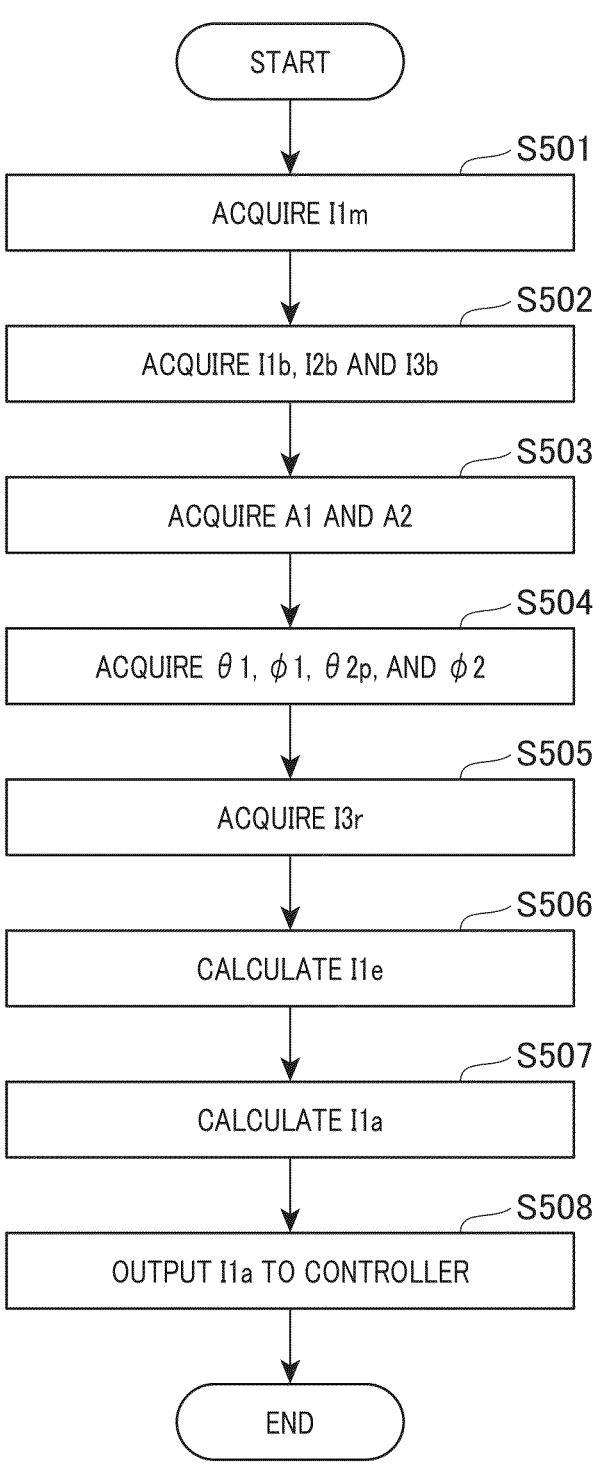
FIG. 10 is a flowchart illustrating a measured-current correction routine for the first motor.
Figure 11:
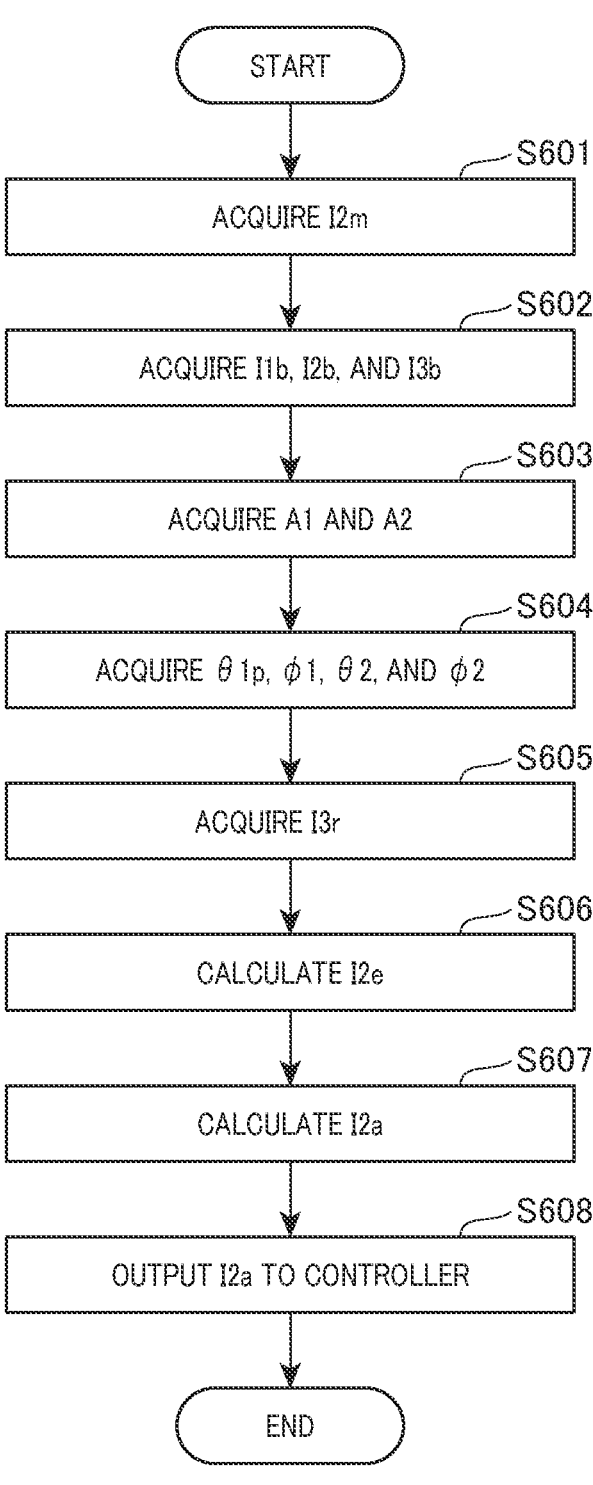
FIG. 11 is a flowchart illustrating a measured-current correction routine for the second motor.

FIG. 10 illustrates a flowchart of a measured-current correction routine to be executed by the current measurement unit 350 for a target phase power line connected to the first motor 11, and FIG. 11 illustrates a flowchart of a measured-current correction routine to be executed by the current measurement unit 350 for a target phase power line connected to the second motor 12. Additionally, FIG. 12 is a flowchart of a measured-current correction routine to be executed by the current measurement unit 350 for a target power line connected to the booster circuit 23.

Specifically, the current measurement unit 350 is configured to calculate, for each of the multiphase rotary electric machines (motors 11 and 12) and the booster circuit 23 to be controlled by the control apparatus 30, an error arising in a measured value of a target current, and correct, based on the calculated error, the measured value of the target current for each of the multiphase rotary electric machines (motors 11 and 12) and booster circuit 23.

Figure 12:
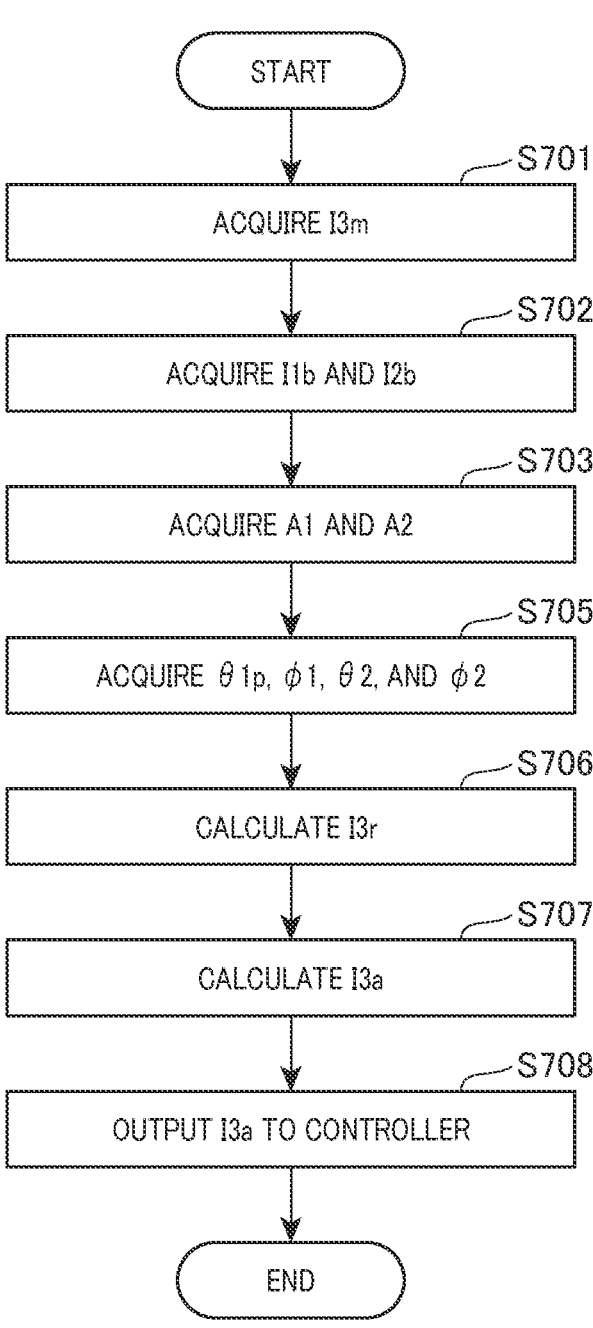
FIG. 12 is a flowchart illustrating a measured-current correction routine for a booster circuit.

The current measurement unit 350 is configured to iterate, as a measurement cycle, each of the measured-current correction routines illustrated in FIGS. 10 to 12 at regular intervals.

First, like the operation in step S101, the current measurement unit 350 acquires a measured value I1*m* of at least one target phase current in step S501 of the present cycle of the correction routine illustrated in FIG. 10. Thereafter, the present cycle of the correction routine proceeds to step S502.

Next, the current measurement unit 350 acquire, for each of the multiphase rotary electric machines (motors 11 and 12) and the booster circuit 23, to be controlled by the control apparatus 30, a corrected value of each target current that was corrected at a previous measurement time before the present measurement time in step S502.

In the microcomputer 300, corrected values I1*b* of the U-, V-, and W-phase currents for the first motor 11 have been stored; correction of values of the U-, V-, and W-phase currents measured by the respective current sensors S1*u*, S1*v*, and S1*w* at the previous measurement time was carried out to acquire the corrected values I1*b* of the U-, V-, and W-phase currents. Similarly, in the microcomputer 300, corrected values I2*b* of the U-, V-, and W-phase currents for the second motor 12 have been stored; correction of values of the U-, V-, and W-phase currents measured by the respective current sensors S2*u*, S2*v*, and S2*w* at the previous measurement time was carried out to acquire the corrected values I2*b* of the U-, V-, and W-phase currents. Additionally, in the microcomputer 300, a corrected value I3*b* of the current I3 flowing through the power line of the booster circuit 23 have been stored; correction of a value of the booster current I3 measured by the current sensor S3 at the previous measurement time was carried out to acquire the corrected value I3*b* of the current I3. After the operation in step S502, the present cycle of the correction routine proceeds to step S503.

Like the operation in step S103, the current measurement unit 350 acquires the current amplitude A1 of the first motor 11, and the current amplitude A2 of the second motor 12 in step S503. After the operation in step S503, the present cycle of the correction routine proceeds to step S504. Like the operation in step S105, the current measurement unit 350 acquires the electric angle θ1 of the first motor 11, and acquires the current phase φ1 of the first motor 11 estimated based on the voltage commands for the first motor 11 in step S504. Additionally, in step S504, the current measurement unit 350 acquires the measured electric angle θ2 of the second motor 12, and acquires a predicted electric angle θ2*p* of the second motor 12 and the current phase 2 of the second motor 12 estimated based on the voltage commands for the second motor 12. After the operation in step S504, the present cycle of the correction routine proceeds to step S505.

In step S505, the current measurement unit 350 acquires a true value I3*r* of the current I3 flowing through the power line of the booster circuit 23. The current measurement unit 350 can be configured to acquire the measured value I3*m* of the current I3, and calculate, based on the measured value I*m*3 of the current I3, the true value I3*r* of the current I3 in accordance with the above equation (43). If the current I3 flowing through the power line of the booster circuit 23 is substantially kept at a constant value, the current measurement unit 350 can be configured to use, as the true value I*r*3, the corrected value I3*b* of the current I3 that was corrected at a previous measurement time in step S502. After the operation in step S505, the present cycle of the correction routine proceeds to step S506.

In step S506, the current measurement unit 305 calculates an error I1*e* estimated to arise in the measured value I1*mj* of the target phase current in accordance with, for example, the above equation (46):

$$I1ej = A1 \times X11j \times \sin(\theta1 + \phi1 + Y11j) \qquad (46)$$
$$+ A2 \times X21j \times \sin(\theta2 + \phi2 + Y21j)$$
$$+ C31j \times I3r$$

In the equation (46), the parameters X11*u*, Y11*u*, X21*u*, Y21*u* X11*v*, Y11*v*, X21*v*, Y21*v* X11*w*, Y11*w*, X21*w*, and Y21*w*, which are constant values, have been previously stored in the microcomputer 300. Additionally, the error factors C31*u*, C31*v*, and C31*w*, which are constant values, have been previously stored in the microcomputer 300. Substituting the current amplitudes A1 and A2 acquired in step S503, the electric angle θ1, the current phase φ1, the predicted electric angle θ2*p*, and the current phase φ2 acquired in step S504, and the true value I3*r* of the current I3 acquired in step S505 to the equation (46) enables the error I1*ej* to be calculated at a lighter calculation load. After the operation in step S506, the present cycle of the correction routine proceeds to step S507.

Like the operation in step S107, the current measurement unit 350 calculates, based on the measured value I1*m* and the error I1*e* of the target phase current, a corrected value I1*a* of the target phase current at the measurement time tm1. After the operation in step S507, the present cycle of the correction routine proceeds to step S508.

In step S508, the current measurement unit 350 outputs the corrected values I1*a* of the respective target three-phase currents to the controller 120. The controller 120 controls the first motor 11 based on the corrected values I1*a* of the respective target three-phase currents. The corrected values I1*a* of the respective target three-phase currents acquired for the present cycle of the correction routine are stored in the microcomputer 300. That is, the corrected values I1*a* of the respective target three-phase currents acquired for the present cycle of the correction routine stored in the microcomputer 300 can be used as previous corrected values I1*b* of the respective target three-phase currents in any of subsequent cycles of the correction routine after the present cycle of the correction routine.

The measured-current correction routine for the second motor 12 illustrated in FIG. 11 can be carried out in the same manner as that for the first motor 11 illustrated in FIG. 10.

In step S601 of the present cycle of the correction routine illustrated in FIG. 11, the current measurement unit 350 acquires a measured value I2*m* of at least one target phase current. Thereafter, the present cycle of the correction routine proceeds to step S602.

The operations in steps S602 to S605 are identical to the operations in steps S502 to S505, and therefore, descriptions of the operations in steps S602 to S605 are omitted. After the operation in step S605, the present cycle of the correction routine proceeds to step S606.

In step S606, the current measurement unit 305 calculates an error I2*e* estimated to arise in the measured value I2*m* of the target phase current in accordance with, for example, the above equation (47):

$$I2ej = A1 \times X12j \times \sin(\theta1 + \phi1 + Y12j) \tag{47}$$

$$+ A2 \times X22j \times \sin(\theta2 + \phi2 + Y22j)$$

$$+ C32j \times I3r$$

In the equation (47), the parameters X12u, Y12u, X22u, Y22u X12v, Y12v, X22v, Y22v X12w, Y112, X22w, and Y22w, which are constant values, have been previously stored in the microcomputer 300. Additionally, the error factors C32u, C32v, and C32w, which are constant values, have been previously stored in the microcomputer 300. Substituting the current amplitudes A1 and A2 acquired in step S603, the electric angle θ1, the current phase φ1, the predicted electric angle θ2p, and the current phase φ2 acquired in step S604, and the true value I3r of the current I3 acquired in step S605 to the equation (47) enables the error 12e to be calculated at a lighter calculation load. After the operation in step S606, the present cycle of the correction routine proceeds to step S607.

Like the operation in step S507, the current measurement unit 350 calculates, based on the measured value I2m and the error 12e of the target phase current, a corrected value I2a of the target phase current. After the operation in step S607, the present cycle of the correction routine proceeds to step S608.

In step S608, the current measurement unit 350 outputs the corrected values I2a of the respective target three-phase currents to the controller 120. The controller 320 controls the second motor 12 based on the corrected values I2a of the respective target three-phase currents. The corrected values I2a of the respective target three-phase currents acquired for the present cycle of the correction routine are stored in the microcomputer 300. That is, the corrected values I2a of the respective target three-phase currents acquired for the present cycle of the correction routine stored in the microcomputer 300 can be used as previous corrected values I2b of the respective target three-phase currents in any of subsequent cycles of the correction routine after the present cycle of the correction routine.

In step S701 of the present cycle of the measured-current correction routine for the booster circuit 23 illustrated in FIG. 12, the current measurement unit 350 acquires a measured value I3m of the current I3 flowing through the booster circuit 23, which is measured by the current sensor S3. Thereafter, the present cycle of the correction routine proceeds to step S702.

Next, the current measurement unit 350 acquire, for each of the multiphase rotary electric machines (motors 11 and 12), to be controlled by the control apparatus 30, a corrected value of each target current that was corrected at a previous measurement time before the present measurement time in step S702.

In the microcomputer 300, corrected values I1b of the U-, V-, and W-phase currents for the first motor 11 have been stored; correction of values of the U-, V-, and W-phase currents measured by the respective current sensors S1u, S1v, and S1w at the previous measurement time was carried out to acquire the corrected values I1b of the U-, V-, and W-phase currents. Similarly, in the microcomputer 300, corrected values I2b of the U-, V-, and W-phase currents for the second motor 12 have been stored; correction of values of the U-, V-, and W-phase currents measured by the respective current sensors S2u, S2v, and S2w at the previous measurement time was carried out to acquire the corrected values I2b of the U-, V-, and W-phase currents. After the operation in step S702, the present cycle of the correction routine proceeds to step S703.

The operations in steps S703 and S705 are identical to the operations in steps S503 and S540, and therefore descriptions of the operations in steps S703 and S705 are omitted.

In step S706, the current measurement unit 305 calculates an error I3e estimated to arise in the measured value I3m of the current I3 in accordance with, for example, the following equation (48) that is derived from the above equations (29), (30), (37), and (38):

$$I3e = I13ej + I23ej + I33e \tag{48}$$

$$= A1 \times X13 \times \sin(\theta1 + \phi1 + Y13) + A2 \times X23 \times$$

$$\sin(\theta2 + \phi2 + Y23) + C33 \times I3r$$

In the equation (48), the parameters X13, Y13, X23, Y23, and C33, which are constant values, have been previously stored in the microcomputer 300. Using the measured value Im3 of the current I3 acquired in step S701 enables the true value I3r to be calculated in accordance with the equation (43). Substituting the current amplitudes A1 and A2 acquired in step S703, the electric angle θ1, the current phase φ1, the predicted electric angle θ2p, and the current phase φ2 acquired in step S704, to the equation (48) enables the error I3e to be calculated at a lighter calculation load. After the operation in step S706, the present cycle of the correction routine proceeds to step S707.

Like the operation in step S507, the current measurement unit 350 calculates, based on the measured value I3m and the error I3e of the target phase current, a corrected value I3a of the current I3 in step S707. After the operation in step S707, the present cycle of the correction routine proceeds to step S708.

Like the operation in step S508, the current measurement unit 350 outputs the corrected values I3a of the current I3 to the controller 320. The controller 320 controls the booster circuit 23 based on the corrected value I3a of the current I3. The corrected value I3a of the current I3 acquired for the present cycle of the correction routine is stored in the microcomputer 300. That is, the corrected value I3a of the current I3 acquired for the present cycle of the correction routine stored in the microcomputer 300 can be used as a previous corrected value I3b of the current I3 in any of subsequent cycles of the correction routine after the present cycle of the correction routine.

Figures 13A, 13B, 13C:
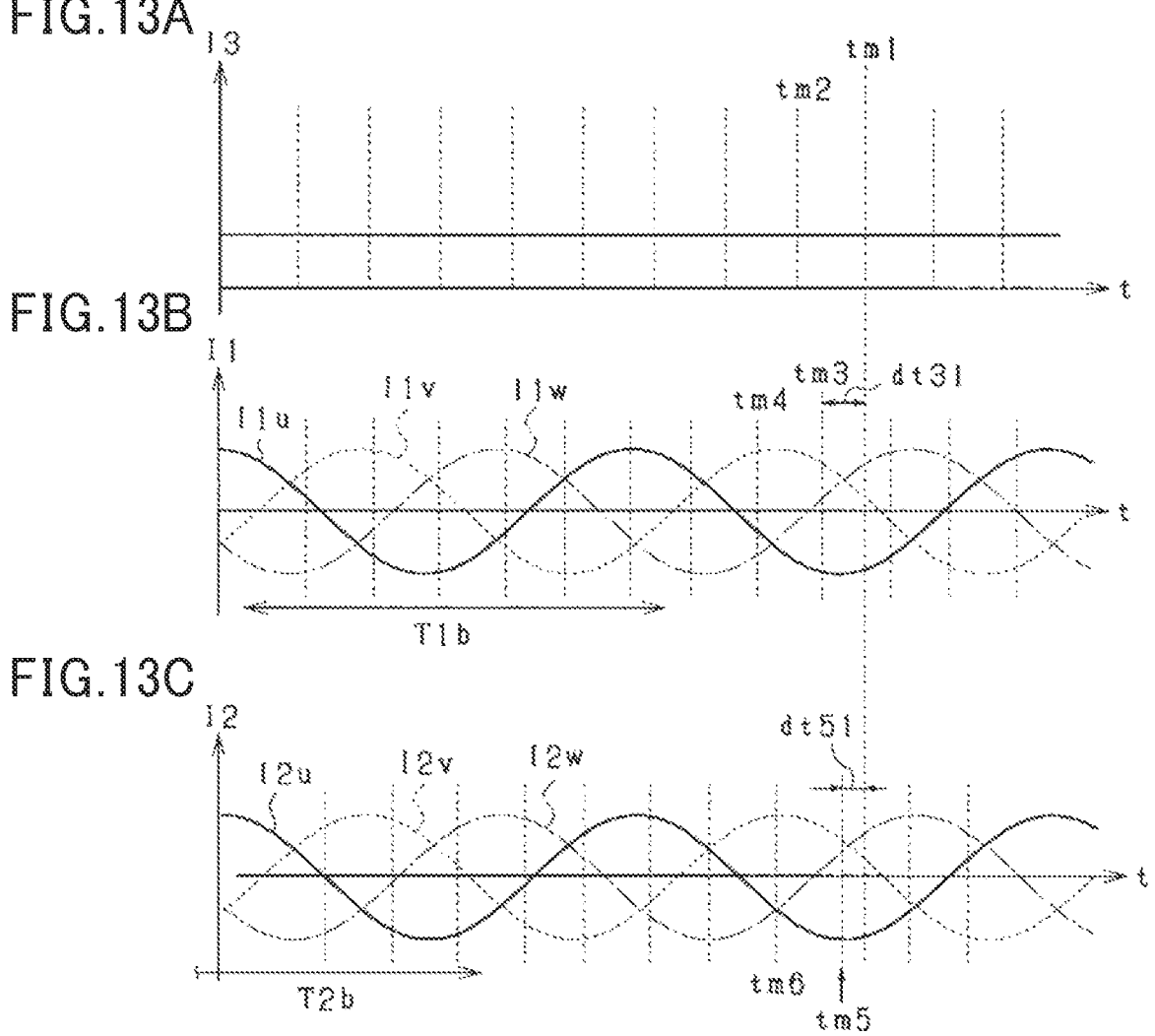
FIGS. 13A to 13C are each a graph, and illustrate a timing chart of current measurement times for the booster circuit.

FIGS. 13A to 13C, each of which is a graph, illustrate a difference of current measurement times for each of the first and second motors 11 and 12 from current measurement times for the booster circuit 23. In each graph, the horizontal axis represents time t. FIG. 13A shows how the current I3 flowing through the power line of the booster circuit 23 is changed over time. FIG. 13B shows how each of the U-, V-, and W-phase currents I1u, I1v, and I1w flowing through the corresponding one of the U-, V-, and W-phase power lines connected to the first motor 11 is changed over time. FIG. 13C shows that how each of the U-, V-, and W-phase currents I2u, I2v, and I2w flowing through the corresponding one of the U-, V-, and W-phase power lines connected to the second motor 12 is changed over time.

Let us assume that a value of the current I3 is measured at a present measurement time tm1, and the present measurement time tm1 is delayed by a time difference dt31 from the latest measurement time tm3 for the first motor 11, and is delayed by a time difference dt51 from the latest measurement time tm5 for the second motor 12.

In this assumption, as the current amplitude A1 of the first motor 11, a value of the current amplitude A1 acquired at the measurement time tm3 can be used or a value of the current amplitude A1 acquired at a measurement time tm4 immediately pervious to the measurement time tm3 can be used. As the electric angle θ1 of the first motor 11, a value of the electric angle θ1 acquired at the measurement time tm3 can be used or a value of the electric angle θ1 acquired at the measurement time tm4 immediately pervious to the measurement time tm3 can be used. Alternatively, as the electric angle θ1 of the first motor 11, a predicted electric angle θ1p of the first motor 11 can be used. The predicted electric angle θ1p of the first motor 11 can be calculated in accordance with (i) a measured electric angle 1m of the first motor 11 acquired from the first electric-angle sensor 13 at the measurement time tm4, (ii) the angular velocity ω1 of the first motor 11, and (iii) a time difference dt41 between the measurement times tm1 and tm4 using the equation θ1p=θ1m+ω1×dt41. As the current phase φ1 of the first motor 11, a value of the current phase of the first motor estimated based on the voltage commands can be used.

Additionally, in this assumption, as the current amplitude A2 of the second motor 12, a value of the current amplitude A2 acquired at the measurement time tm5 can be used or a value of the current amplitude A2 acquired at a measurement time tm6 immediately pervious to the measurement time tm5 can be used. As the electric angle θ2 of the second motor 12, a value of the electric angle θ2 acquired at the measurement time tm5 can be used or a value of the electric angle θ2 acquired at the measurement time tm6 immediately pervious to the measurement time tm5 can be used. Alternatively, as the electric angle θ2 of the second motor 12, a predicted electric angle θ2p of the second motor 12 can be used. The predicted electric angle θ2p of the second motor 12 can be calculated in accordance with (i) a measured electric angle θ2m of the second motor 12 acquired from the second electric-angle sensor 14 at the measurement time tm5, (ii) the angular velocity ω2 of the second motor 12, and (iii) a time difference dt51 between the measurement times tm1 and tm5 using the equation θ2p=θ2m+ω2×dt51. As the current phase φ2 of the second motor 12, a value of the current phase of the second motor estimated based on the voltage commands can be used.

Figures 14A, 14B, 14C:
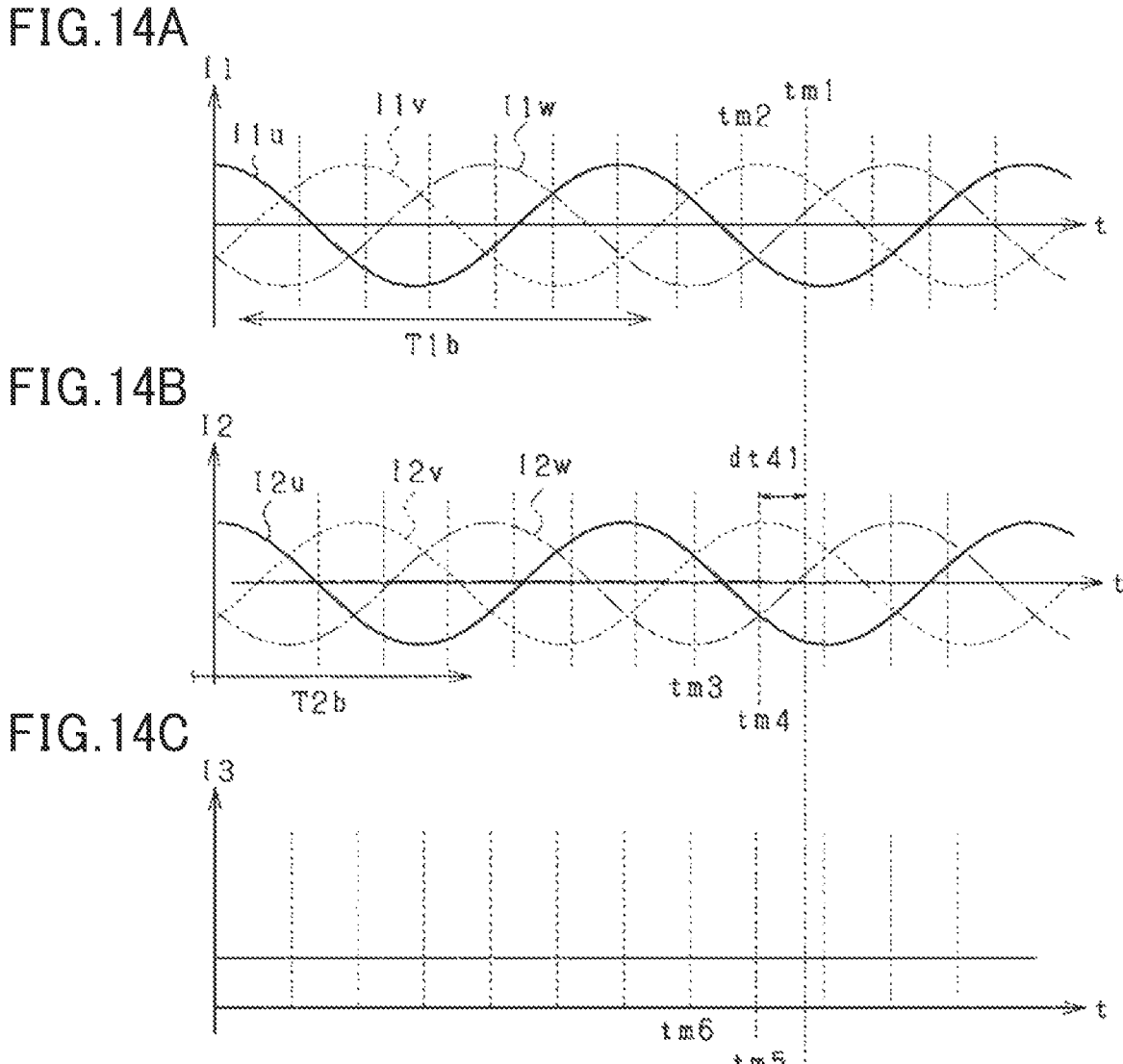
FIGS. 14A to 14C are each a graph, and illustrate a timing chart of current measurement times for the first motor.

FIGS. 14A to 14C, each of which is a graph, illustrate a difference of current measurement times for each of the second motor 12 and the booster circuit 23 from measurement times for the first motor 11. In each graph, the horizontal axis represents time t. FIG. 14A shows how each of the U-, V-, and W-phase currents I1u, I1v, and I1w flowing through the corresponding one of the U-, V-, and W-phase power lines connected to the first motor 11 is changed over time. FIG. 14B shows that how each of the U-, V-, and W-phase currents I2u, I2v, and I2w flowing through the corresponding one of the U-, V-, and W-phase power lines connected to the second motor 12 is changed over time. FIG. 14C shows how the current I3 flowing through the power line of the booster circuit 23 is changed over time.

Let us assume that a value of at least one target phase current for the first motor 11 is measured at a present measurement time tm1, and the present measurement time tm1 is delayed by a time difference dt41 from the latest measurement time tm4 for the second motor 12.

In this assumption, like the first embodiment, the current amplitude A1 of the first motor 11 can be calculated based on immediately previous corrected values used as corrected values I1b of the three-phase currents for the first motor 11. The immediately previous corrected values can be calculated by correcting measured values of the three-phase currents at a measurement time tm2 that is immediately previous to the present measurement time tm1. As the electric angle θ2 of the second motor 12, a value of the electric angle θ2 acquired at the measurement time tm4 can be used or a value of the electric angle θ2 acquired at a measurement time tm3 immediately pervious to the measurement time tm4 can be used. Alternatively, as the electric angle θ2 of the second motor 12, a predicted electric angle θ2p of the second motor 12 can be used. The predicted electric angle θ2p of the second motor 12 can be calculated in accordance with (i) a measured electric angle θ2m of the second motor 12 acquired from the second electric-angle sensor 14 at the measurement time tm4, (ii) the angular velocity ω2 of the second motor 12, and (iii) a time difference dt41 between the measurement times tm1 and tm4 using the equation θ2p=θ2m+ω2×dt41. As the current phase φ1 of the first motor 11, a value of the current phase of the first motor estimated based on the voltage commands can be used. Similarly, as the current phase φ2 of the second motor 12, a value of the current phase of the second motor estimated based on the voltage commands can be used.

Additionally, in this assumption, the true value I3r of the current I3 flowing through the booster circuit 23 can be calculated based on a value I3m of the current I3 measured at the measurement time tm1 Alternatively, the true value Ir3 of the current I3 flowing through the booster circuit 23 can be calculated based on a value I3m of the current I3 measured at a measurement time tm5 or a measurement time tm6.

If the measured value I3m of the current I3 is used for calculating the true value I3r of the current I3, the true value I3r of the current I3 can be calculated in accordance with the equation (43) and the measured value I3m measured at the measurement time tm3. Then, using the true value I3r of the current I3 and the equations (44) and (45) enables the measured value of each phase current for each of the first and second motors 11 and 12 to be corrected. As another example, a corrected value I3a of the current I3 calculated at the measurement time tm5 or tm6 can be used as the true value I3r. As a further example, an average of corrected values I3a of the current I3 calculated at past several measurement times can be used as the true value I3r. Using the corrected value I3a or the average of the past corrected values I3a enables the measured value of each phase current for each of the first and second motors 11 and 12 to be corrected in accordance with the equations (44) and (45).

Fourth Embodiment

Figure 15:
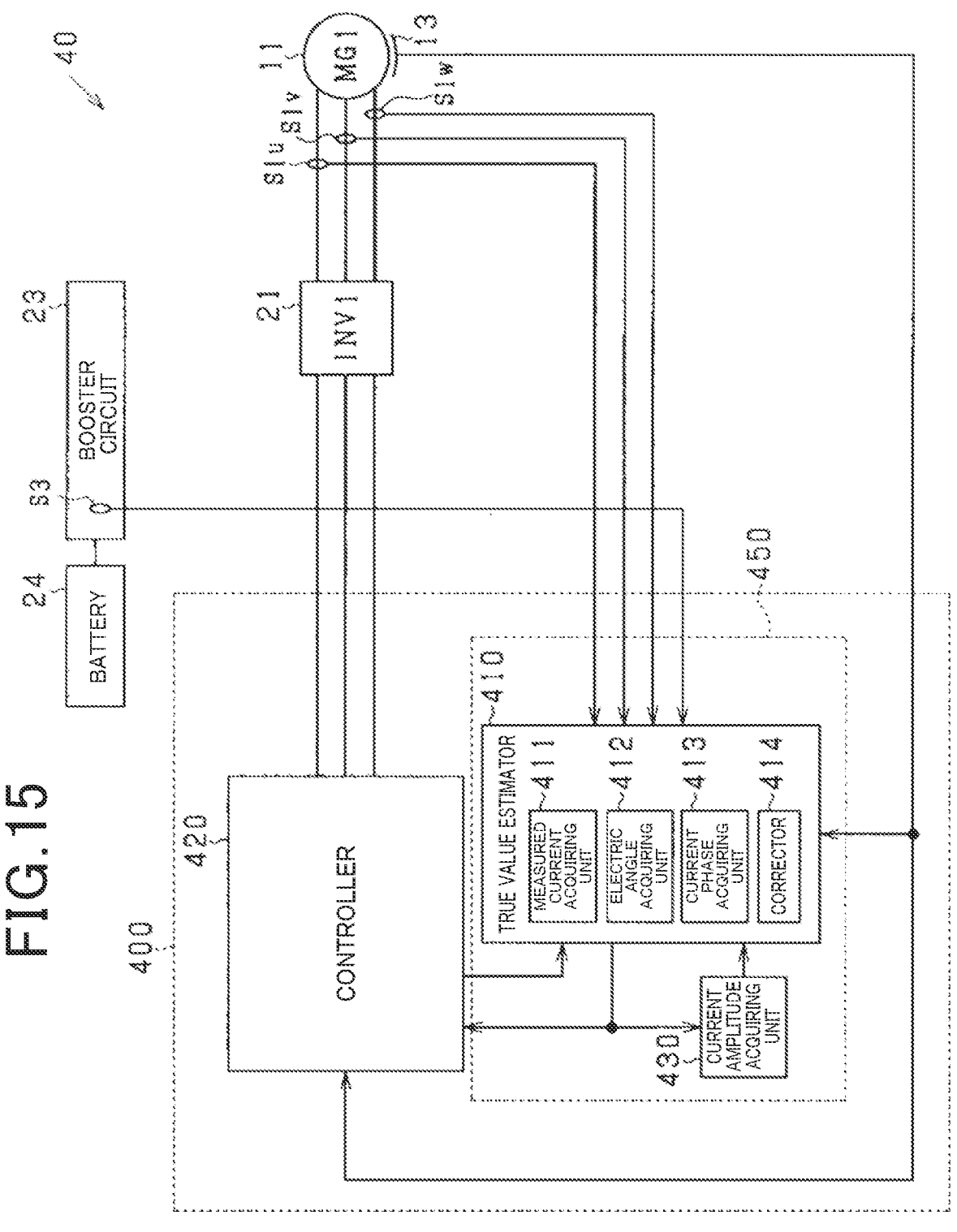
FIG. 15 is a block and circuit diagram illustrating a control apparatus, which includes a current measurement apparatus of the fourth embodiment, for the rotary electric machines.

FIG. 15 illustrates a control apparatus 40 for rotary electric machines; the control apparatus 40 includes a current measurement unit 450 according to the fourth embodiment. Referring to FIG. 15, the configuration of the control apparatus 40 is different from that of the control apparatus 30 of the third embodiment in that the control apparatus 40 does not aim to control the second motor 12, so that the control apparatus 40 does not include any structures required to control the second motor 12.

The other configuration of the control apparatus 40 of the fourth embodiment is identical to the corresponding configuration of the control apparatus 30 of the third embodiment. For this reason, descriptions of the other configuration of the control apparatus 40 are omitted, and hereinafter, the hundreds digit of the reference number assigned to each component of the other configuration of the control apparatus 40, which is 3 in the third embodiment, will be is replaced with 4.

Figure 16:
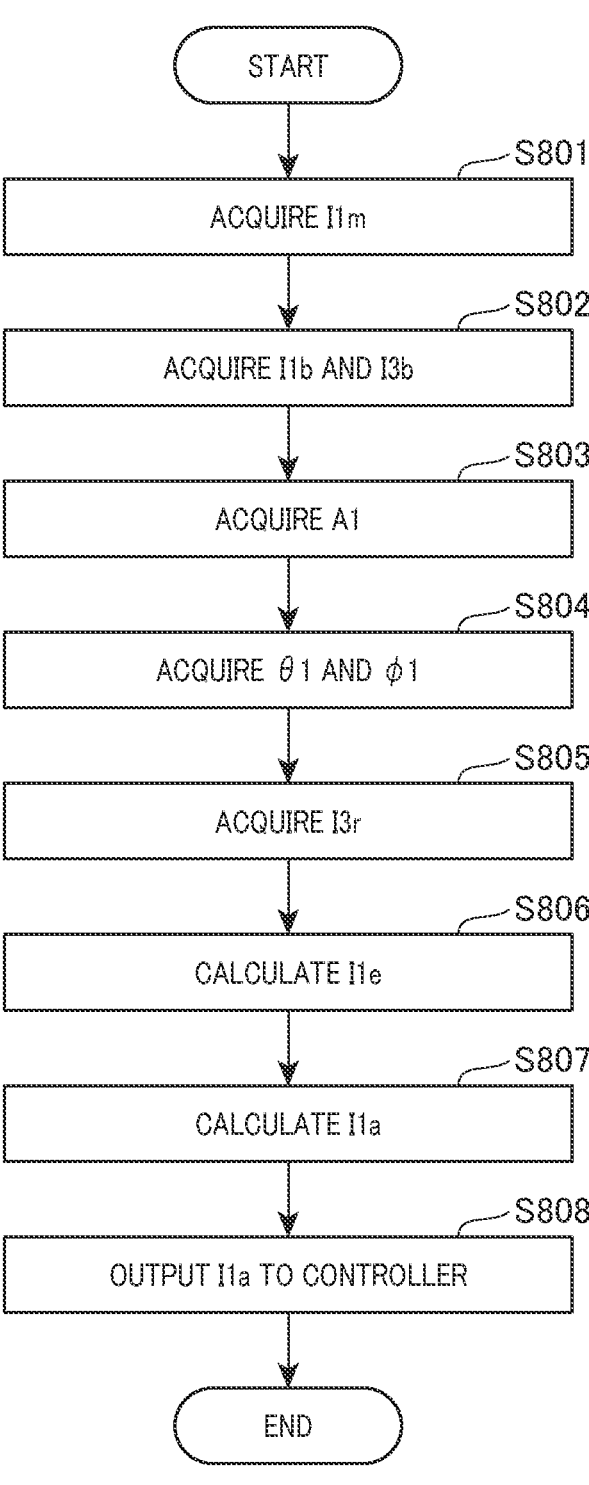
FIG. 16 is a flowchart illustrating a measured-current correction routine for the first motor.
Figure 17:
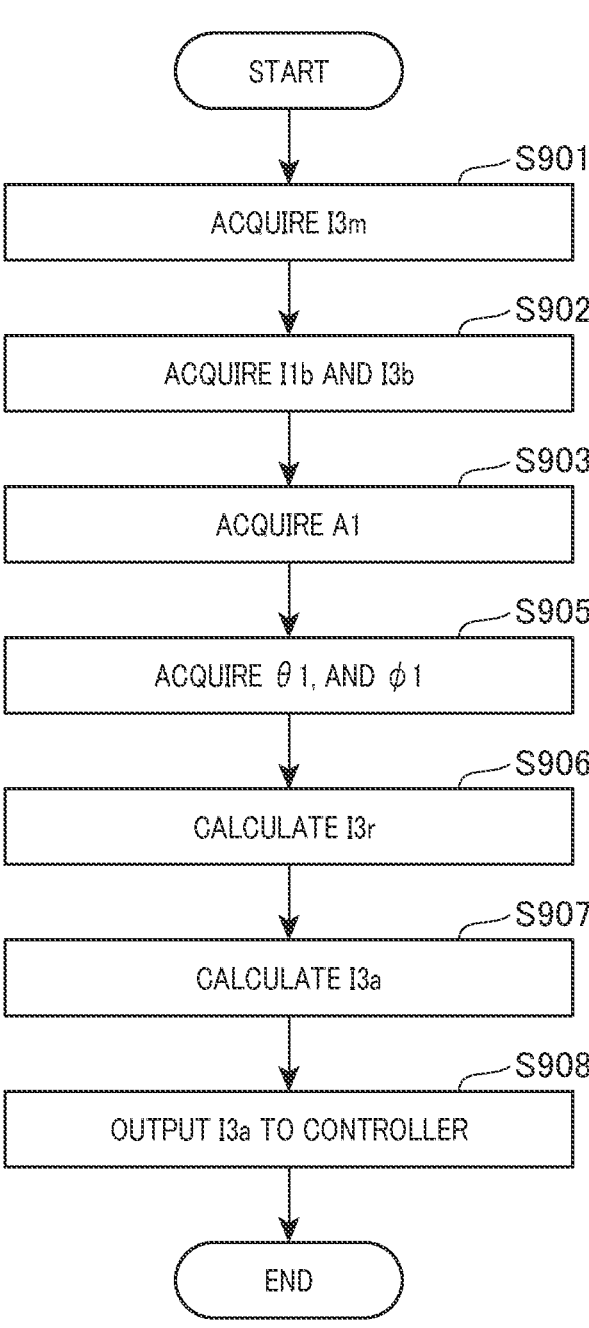
FIG. 17 is a flowchart illustrating a measured-current correction routine for a booster circuit.

FIG. 16 illustrates a flowchart of a measured-current correction routine to be executed by the current measurement unit 450 for a target phase power line connected to the first motor 11, and FIG. 17 is a flowchart of a measured-current correction routine to be executed by the current measurement unit 450 for a target power line connected to the booster circuit 23.

Specifically, the current measurement unit 450 is configured to calculate, for each of the multiphase rotary electric machine (first motor 11) and the booster circuit 23 to be controlled by the control apparatus 40, an error arising in a measured value of a target current, and correct, based on the calculated error, the measured value of the target current for each of the multiphase rotary electric machine (first motor 11) and booster circuit 23.

The current measurement unit 450 is configured to iterate, as a measurement cycle, each of the measured-current correction routines illustrated in FIGS. 16 and 17 at regular intervals.

The operation in each of steps S802 to S804 of the correction routine illustrated in FIG. 16 is different from the operation in the corresponding one of steps S502 to S504 of FIG. 10 in that the operation in each of steps S802 to S804 does not acquire parameters related to the second motor 12, because the control apparatus 40 does not aim to control the second motor 12.

In particular, the operation in step S806 uses the equation (46) while rendering the term related to the error from the second motor 12 to zero to accordingly calculate the error I1$e$ estimated to arise in the measured value I1$m$ of the target phase current. Specifically, rendering the second term "A2×X21$j$×sin(θ2+φ2+Y21$j$)" in the equation (46) to zero enables the error I1$e$ to be calculated. Other operations in the correction routine of FIG. 16 are substantially identical to those in the correction routine of FIG. 10, and therefore, descriptions of the other operations in the correction routine of FIG. 16 are omitted.

Similarly, the operation in each of steps S902, S903, and S905 of the correction routine illustrated in FIG. 17 is different from the operation in the corresponding one of steps S702, S703, and S705 of FIG. 12 in that the operation in each of steps S902, S903, and S905 does not acquire parameters related to the second motor 12.

In particular, the operation in step S906 uses the equation (48) while rendering the term related to the error from the second motor 12 to zero to accordingly calculate the error I3$e$ estimated to arise in the measured value I3$m$ of the current I3. Specifically, rendering the second term "A2×X23×sin(θ2+φ2+Y23)" in the equation (48) to zero enables the error I3$e$ to be calculated. Other operations in the correction routine of FIG. 17 are substantially identical to those in the correction routine of FIG. 12, and therefore, descriptions of the other operations in the correction routine of FIG. 18 are omitted.

FIGS. 18A and 18B, each of which is a graph, illustrate a difference of current measurement times for the first motor 11 from current measurement times for the booster circuit 23. In each graph, the horizontal axis represents time t. FIG. 18A shows how the current I3 flowing through the power line of the booster circuit 23 is changed over time. FIG. 18B shows how each of the U-, V-, and W-phase currents I1$u$, I1$v$, and I1$w$ flowing through the corresponding one of the U-, V-, and W-phase power lines connected to the first motor 11 is changed over time.

Let us assume that a value of the current I3 is measured at a present measurement time tm1, and the present measurement time tm1 is delayed by a time difference dt41 from the latest measurement time tm4 for the first motor 11.

In this assumption, as the current amplitude A1 of the first motor 11, a value of the current amplitude A1 acquired at the measurement time tm4 can be used or a value of the current amplitude A1 acquired at a measurement time tm3 immediately pervious to the measurement time tm4 can be used. As the electric angle θ1 of the first motor 11, a value of the electric angle θ1 acquired at the measurement time tm1 can be used. As the electric angle θ1 of the first motor 11, a predicted electric angle θ1$p$ of the first motor 11 can be used. The predicted electric angle θ1$p$ of the first motor 11 can be calculated in accordance with (i) a measured electric angle 1$m$ of the first motor 11 acquired from the first electric-angle sensor 13 at the measurement time tm4, (ii) the angular velocity ω1 of the first motor 11, and (iii) a time difference dt41 between the measurement times tm1 and tm4 using the equation θ1$p$=θ1$m$+ω1×dt41. As another example, the predicted electric angle θ1$p$ of the first motor 11 can be calculated in accordance with (i) a measured electric angle of the first motor 11 acquired from the first electric-angle sensor 13 at the measurement time tm3, (ii) the angular velocity ω1 of the first motor 11, and (iii) a time difference between the measurement times tm1 and tm4 using the above equation. The current phase φ1 of the first motor 11, a value of the current phase of the first motor estimated based on the voltage commands can be used.

FIGS. 19A and 19B, each of which is a graph, illustrate a difference of current measurement times for the booster circuit 23 from measurement times for the first motor 11. In each graph, the horizontal axis represents time t. FIG. 19A shows how each of the U-, V-, and W-phase currents I1$u$, I1$v$, and I1$w$ flowing through the corresponding one of the U-, V-, and W-phase power lines connected to the first motor 11 is changed over time. FIG. 19B shows how the current I3 flowing through the power line of the booster circuit 23 is changed over time.

Let us assume that a value of a target phase current for the first motor 11 is measured at a present measurement time tm1.

In this assumption, like the first or third embodiment, the current amplitude A1 of the first motor 11 can be calculated based on immediately previous corrected values used as corrected values I1$b$ of the three-phase currents for the first motor 11. The immediately previous corrected values can be calculated by correcting measured values of the three-phase currents at a measurement time tm2 that is immediately previous to the present measurement time tm1. As the current phase φ1 of the first motor 11, a value of the current phase of the first motor estimated based on the voltage commands can be used.

Additionally, in this assumption, the true value I3$r$ of the current I3 flowing through the booster circuit 23 can be calculated based on a value I3$m$ of the current I3 measured at the measurement time tm1. Alternatively, the true value Ir3 of the current I3 flowing through the booster circuit 23 can be calculated based on a value I3$m$ of the current I3 measured at a measurement time tm3 or a measurement time tm4. If the measured value I3$m$ of the current I3 is used for calculating the true value I3$r$ of the current I3, the true value I3$r$ of the current I3 can be calculated in accordance with the equation (43) and the measured value I3$m$ measured at the measurement time tm3. Then, using the true value I3$r$ of the current I3 and the equation (44) enables the measured value of each phase current for the first motor 11 to be corrected.

As another example, a corrected value I3$a$ of the current I3 calculated at the measurement time tm3 or tm4 can be used as the true value I3$r$. As a further example, an average of corrected values I3$a$ of the current I3 calculated at past several measurement times can be used as the true value I3$r$. Using the corrected value I3$a$ or the average of the past corrected values I3$a$ enables the measured value of each phase current for the first motor 11 to be corrected in accordance with the equation (44).

That is, the current measurement technologies described in the present disclosure can be applied to such a control apparatus for controlling a single multiphase rotary electric machine and a booster circuit.

Fifth Embodiment

Figure 20:
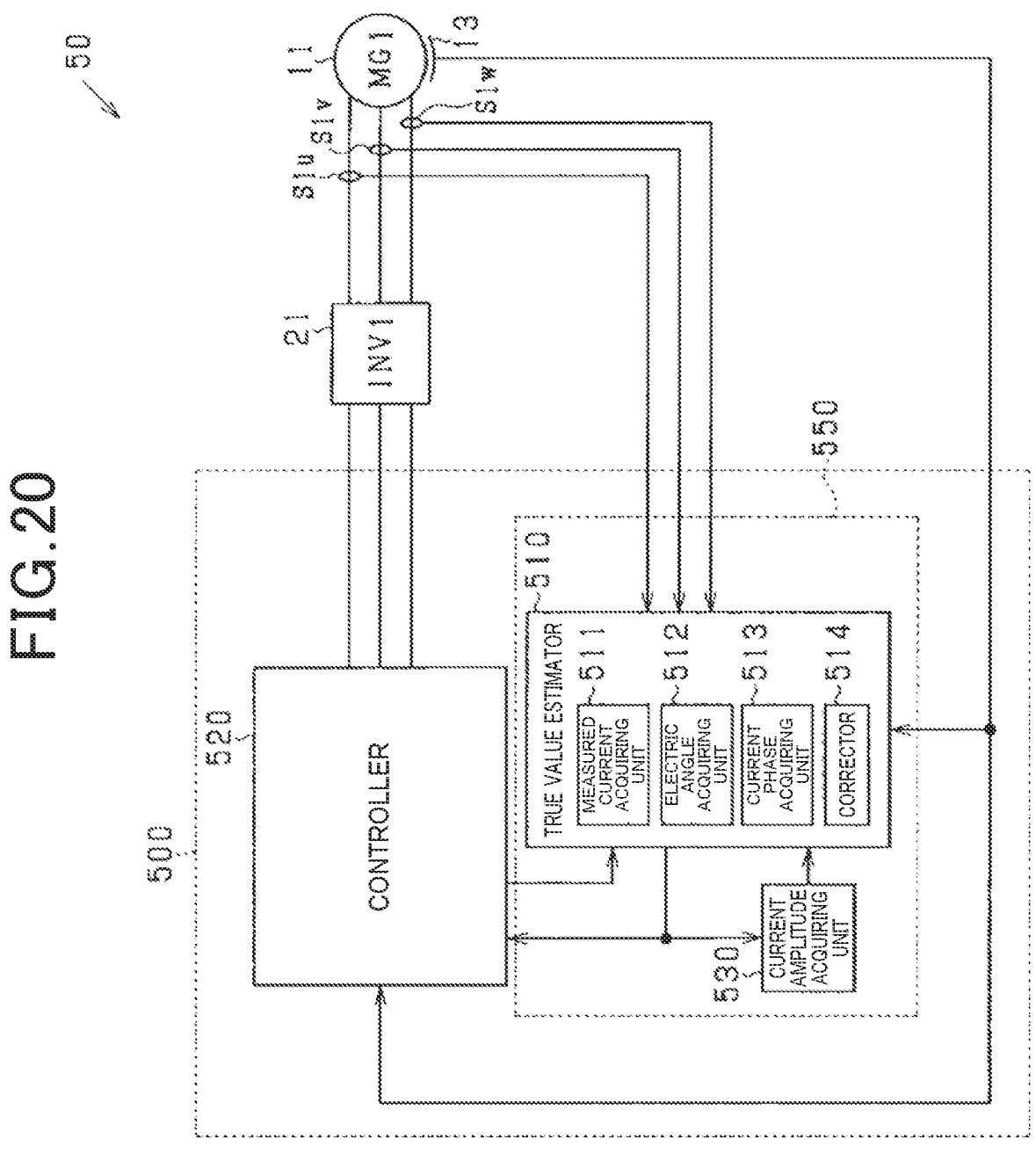
FIG. 20 is a block and circuit diagram illustrating a control apparatus, which includes a current measurement apparatus of the fifth embodiment, for the rotary electric machines.

FIG. 20 illustrates a control apparatus 50 for a rotary electric machine; the control apparatus 50 includes a current measurement unit 550 according to the fifth embodiment. Referring to FIG. 20, the configuration of the control apparatus 50 is different from that of the control apparatus 10 of the first embodiment in that the control apparatus 50 does not aim to control the second motor 12, so that the control apparatus 50 does not include any structures required to control the second motor 12.

The other configuration of the control apparatus 50 of the fifth embodiment is identical to the corresponding configuration of the control apparatus 10 of the first embodiment. For this reason, descriptions of the other configuration of the control apparatus 50 are omitted, and hereinafter, the hundreds digit of the reference number assigned to each component of the other configuration of the control apparatus 40, which is 1 in the first embodiment, will be is replaced with 5.

FIG. 20 illustrates a flowchart of a measured-current correction routine to be executed by the current measurement unit 550 for a target phase power line connected to the first motor 11.

Specifically, the current measurement unit 550 is configured to calculate, for the multiphase rotary electric machine (first motor 11) to be controlled by the control apparatus 50, an error arising in a measured value of a target phase current, and correct, based on the calculated error, the measured value of the target phase current for the multiphase rotary electric machine (first motor 11).

Figure 21:
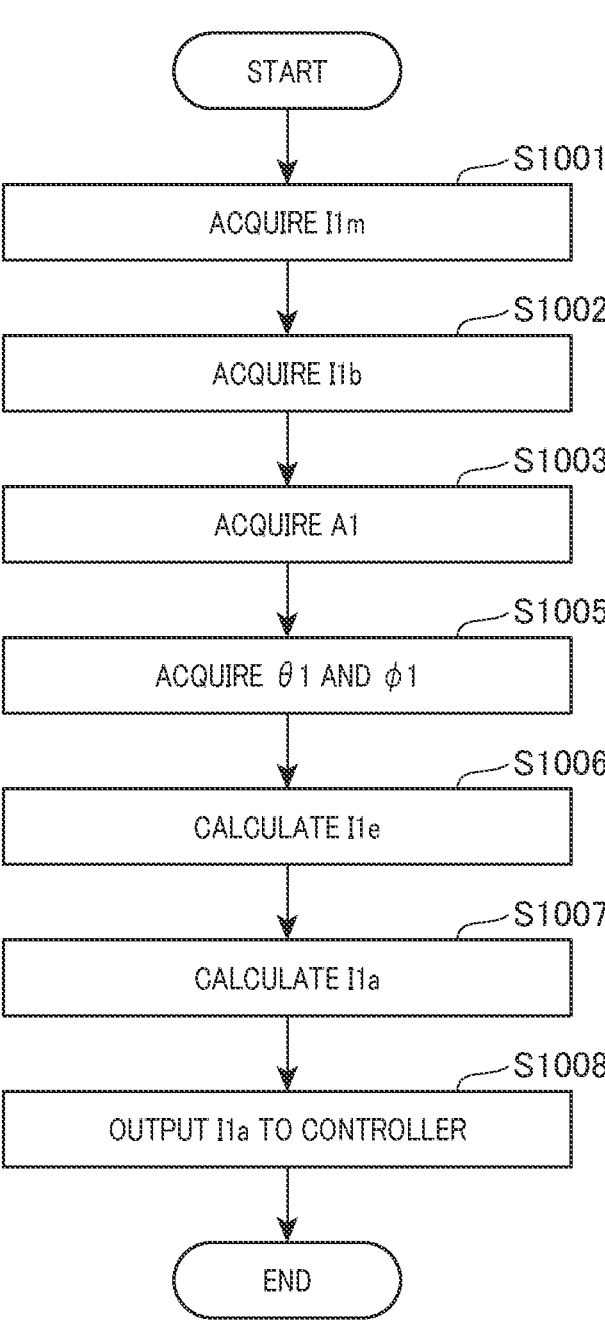
FIG. 21 is a flowchart illustrating a measured-current correction routine for the first motor.

The current measurement unit 550 is configured to iterate, as a measurement cycle, the measured-current correction routine illustrated in FIG. 21 at regular intervals.

The operation in each of steps S1002, S1003, and S1005 of the correction routine illustrated in FIG. 21 is different from the operation in the corresponding one of steps S102, S103, and S105 of FIG. 2 in that the operation in each of steps S1002, S1003, and S1005 does not acquire parameters related to the second motor 12, because the control apparatus 40 does not aim to control the second motor 12.

In particular, the operation in step S1006 uses the equation (13) while rendering the term related to the error from the second motor 12 to zero to accordingly calculate the error I1$e$ estimated to arise in the measured value I1$m$ of the target phase current. Specifically, rendering the second term "A2× X21$j$× sin(θ2+φ2+Y21$j$)" in the equation (13) to zero enables the error I1$e$ to be calculated. Other operations in the correction routine of FIG. 21 are substantially identical to those in the correction routine of FIG. 2, and therefore, descriptions of the other operations in the correction routine of FIG. 21 are omitted.

That is, the current measurement technologies described in the present disclosure can be applied to such a control apparatus for controlling a single multiphase rotary electric machine and a booster circuit.

Sixth Embodiment

The sixth embodiment takes the configuration of the control apparatus 30 for the first and second motors 11 and 12 illustrated in FIG. 9 to accordingly describe a method of correcting a measured value of at least one target phase current for each of the first and second motors 11 and 12 while the current measurement unit 350 does not acquire the electric angle, the current amplitude, and the current phase of each of the first and second motors 11 and 12.

The above equations (1) to (4) and (29) to (32) enable the current measurement unit 350 to solve the following system of equations (49) to accordingly calculate a true value I1$rj$ of a j-phase current for the first motor 11, a true value I2$rj$ of a j-phase current for the second motor 12, and a true value of the current I3 flowing through the booster circuit 23:

$$
\begin{aligned}
I1mj &= I1rj + I1ej \\
&= I1rj + (C1u1j \times I1ru + C1v1j \times I1rv + C1w1j \times I1rw + \\
&\quad C2u1j \times I2ru + C2v1j \times I2rv + C2w1j \times I2rw + C31j \times I3r)
\end{aligned}
\tag{49}
$$

$$
\begin{aligned}
I2mj &= I2rj + I2ej \\
&= I2rj + (C2u1j \times I2ru + C2v1j \times I2rv + C2w1j \times I2rw + \\
&\quad C2u2j \times I2ru + C2v2j \times I2rv + C2w2j \times I2rw + C32j \times I3r)
\end{aligned}
$$

$$
\begin{aligned}
I3m &= I3r + I3e \\
&= I3r + (C1u3 \times I1ru + C1v3 \times I1rv + C3w3 \times I1rw + C2u3 \times \\
&\quad I2ru + C2v3 \times I2rv + C2w3 \times I2rw + C33 \times I3r)
\end{aligned}
$$

The equation (49) can be expressed as the following determinant (50). As illustrated in the determinant (50), the multiplication of the inverse matrix of the error factors and the matrix of the measured values enables the true values I1$rj$, I2$rj$, and 13 to be calculated.

$$
\begin{bmatrix} I1ru \\ I1rv \\ I1rw \\ I2ru \\ I2rv \\ I2rw \\ I3r \end{bmatrix} = A^{-1} \times \begin{bmatrix} I1mu \\ I1mv \\ I1mw \\ I2mu \\ I2mv \\ I2mw \\ I3m \end{bmatrix}
\tag{50}
$$

-continued $$
\begin{bmatrix} I1ru \\ I1rv \\ I1rw \\ I2ru \\ I2rv \\ I2rw \\ I3r \end{bmatrix} = A^{-1} \times \begin{bmatrix} I1mu \\ I1mv \\ I1mw \\ I2mu \\ I2mv \\ I2mw \\ I3m \end{bmatrix}
$$

wherein $$
A = \begin{bmatrix}
1+C1u1u & C1u1v & C1w1u & C2u1u & C2v1u & C2w1u & C31u \\
C1u1v & 1+C1v1v & C1w1v & C2u1v & C2v1v & C2w1v & C31v \\
C1u1w & C1v1w & 1+C1w1w & C2u1w & C2v1w & C2w1w & C31w \\
C1u2u & C1v2u & C1w2u & 1+C2u2u & C2v2u & C2w2u & C32u \\
C1u2v & C1v2v & C1w2v & C2u2v & 1+C2v2v & C2w2v & C32v \\
C1u2w & C1v2w & C1w2w & C2u2v & C2v2w & 1+C2w2w & C32w \\
C1u3 & C1v3 & C1w3 & C2u3 & C2v3 & C2w3 & 1+C33
\end{bmatrix}
$$

FIGS. 22A to 22C, each of which is a graph, illustrate a difference of current measurement times for each of the second motor 12 and the booster circuit 23 from measurement times for the first motor 11. In each graph, the horizontal axis represents time t. FIG. 22A shows how each of the U-, V-, and W-phase currents I1$u$, I1$v$, and I1$w$ flowing through the corresponding one of the U-, V-, and W-phase power lines connected to the first motor 11 is changed over time. FIG. 22B shows that how each of the U-, V-, and W-phase currents I2$u$, I2$v$, and 12$w$ flowing through the corresponding one of the U-, V-, and W-phase power lines connected to the second motor 12 is changed over time. FIG. 22C shows how the current I3 flowing through the power line of the booster circuit 23 is changed over time.

When a measured value I1$m$ of a target phase current for the first motor 11 is acquired at a present measurement time tm1, it is necessary to acquire a measured value I2$m$ of a target phase current for the second motor 12 and a measured value I3$m$ of the current I3 flowing through the booster circuit 23 at the same measurement time tm1. Similarly, when a measured value I2$m$ of a target phase current for the second motor 12 is acquired at a given measurement time, it is necessary to acquire a measured value I2$m$ of a target phase current for the second motor 12 and a measured value I3$m$ of the current I3 flowing through the booster circuit 23 at the same measurement time. Additionally, when a measured value I3$m$ of the current I3 is acquired at a given measurement time, it is necessary to acquire a value I1$m$ of each-phase current for the first motor 11 and a value I2$m$ of each-phase current for the second motor 12 at the same measurement time.

That is, because each error factor is a known variable or a known constant value, simultaneously acquiring measured values I1$m$, I2$m$, and I3$m$ from the respective motors 11 and 12 and booster circuit 23 and solving the simultaneous equations (49) and/or the determinant (50) based on the acquired measured values I1$m$, I2$m$, and I3$m$ enable correction of the measured values I1$m$, I2$m$, and I3$m$ without acquiring the electric angle, the current amplitude, and the current phase of each of the first and second motors 11 and 12.

Each of the current measurement units 150, 250, 350, 450, and 550 of the first to fifth embodiments is configured to correct a measured value of a target current using the electric angle, the current amplitude, and the current phase of each of the first and second motors 11 and 12. However, like the sixth embodiment, each of the current measurement units 150, 250, 350, 450, and 550 of the first to fifth embodiments can be configured to correct a measured value of a target current without acquiring the electric angle, the current amplitude, and the current phase of each of the first and second motors 11 and 12.

The following first to fourth modifications can simplify the simultaneous equations (49) and/or the determinant (50), and therefore more simply correct a measured value of a target current without acquiring the electric angle, the current amplitude, and the current phase of each of the first and second motors 11 and 12.

For example, the error factor defined for each of all the power lines with respect to at least one target phase current is determined based on (i) one or more shields located between the corresponding current sensor and the corresponding one of all the multiphase power lines and (ii) the distance between the corresponding current sensor and the corresponding one of all the multiphase power lines. If the above elements that determine the error factor defined for each of the multiphase power lines cause at least one of the error factors to be zero, at least one of the simultaneous equations (49) and/or the determinant (50) may be simplified.

First Modification

If the error factor C31$j$ is zero and the error factor C32$j$ is zero, the equation related to the measured value I3$r$ in the simultaneous equations (49) can be simplified as I3$m$=I3$r$+C33×I3$r$, and therefore the true value I3$r$ can be calculated based on the following equation I3$r$=I3$m$/(1+C33).

Second Modification

Let us assume cases where a target phase current is subjected to noise due to only the target phase current itself without being subjected to noise due to the other phase currents. That is, the following describes these cases while taking the U-phase current for the first motor 11 as an example.

Specifically, the equation related to the measured value I1$mu$ in the simultaneous equations (49) can be simplified as I1$mu$=I1$ru$+C1$u$1$u$×I1$ru$, and therefore the true value I1$ru$ can be calculated based on the following equation I1$ru$=I1$ru$=I1$mu$/(1+C1$u$1$u$). The true value of each of the V- and W-phase currents for the first motor 11 can be calculated in the same manner as the true value I1$ru$ of the U-phase current for the first motor 11. Similarly, the true value of each of the U-, V-, and W-phase currents for the second motor 12 can be calculated in the same manner as the true value I1$ru$ of the U-phase current for the first motor 11.

The cases where a target phase current is subjected to noise due to only the target phase current itself without being subjected to noise due to the other phase currents may include (I) A first case where the corresponding power line is sufficiently distanced from the other power lines (II) A second case where there are one or more shields between the corresponding power line and each of the other power lines, which block magnetic flux generated from the corresponding one of the other power lines (III) A third case where an angle of the power line of the target phase current relative to each of the other power lines enables magnetic flux generated from the corresponding one of the other power lines to have no or less impact on the target phase current The angle of the power line of the target phase current relative to each of the other power lines can be expressed as a predetermined-directed distance, such as an X-directed distance or Y-directed distance relative to each of the other power lines.

For example, as illustrated in FIGS. 23A and 23B, if a power line connected to a rotary electric machine is bent to have a predetermined angle, there may be a situation where a target phase current flowing through the bent power line is subjected to noise due to only the target phase current itself without being subjected to noise due to the other phase currents.

Specifically, FIG. 23A illustrates a power line 61 and a current sensor 62 provided thereon for measuring a current flowing through the power line 61 in a top view, and FIG. 23B illustrates the power line 61 and the current sensor 62 in a side view. The power line 61 is comprised of a first portion extending in the x-y plane, and a second portion bent from the first portion and extending in the z direction. If the current sensor 60 measures magnetic flux generated based on a current flowing in the x-direction, no current flows in the y direction, so that no magnetic flux is generated based on current flowing in the y direction. This results in the current flowing through the power line 61 being unaffected from y-directional currents, so that, for the current flowing through the power line 61, it is only necessary to consider noise due to currents flowing in parallel to the z direction.

Third Modification

Let us assume that, in the control apparatus 40 illustrated in FIG. 15, which does not aim to control the second motor 12, there is no error between a measured value and a true value of each phase current for the first motor 11, that is, the true value I1$ru$ is equal to the measured value I1$mu$, the true value I1$rv$ is equal to the measured value I1$mv$, and the true value I1$rw$ is equal to the measured value I1$mw$. In this assumption, the simultaneous equations (49) become simplified as the following equation I3$m$=I3$r$+C1$u$3×I1$ru$+C1$v$3×I1$rv$+C3$w$3×I1$rw$+C2$u$3×I2$ru$+C2$v$3×I2$rv$+C2$w$3×I2$rw$+C33×I3$r$, it is possible to calculate the true value I3$r$ in accordance with the following equation I3$r$=(I3$m$−C1$u$3×I1$mu$−C1$v$3×I1$mv$−C1$w$3×I1$mw$)/(1+C33).

Fourth Modification

Let us assume cases where a target phase current of, for example, the first motor 11, is subjected to noise due to only the target phase current itself without being subjected to noise due to the other rotary electric machines, i.e., the second motor 12, and the booster circuit 23. The cases where a target phase current of, for example, the first motor 11, is subjected to noise due to only the target phase current itself without being subjected to noise due to the other rotary electric machines, i.e., the second motor 12, and the booster circuit 23 may include (I) A first case where the first motor 11, the second motor 12, and the booster circuit 23 are sufficiently distanced from one another (II) A second case where there are one or more shields among the first motor 11, the second motor 12, and the booster circuit 23

In these cases, the equation for the first motor 11 included in the simultaneous equations (49) becomes simplified as the equation I1$mj$=I1$rj$+C1$u$1$j$×I1$ru$+C1$v$1$j$×I1$rv$+C1$w$1$j$×I1$rw$. Expressing the simplified equation I1$mj$=I1$rj$+C1$u$1$j$×I1$ru$+C1$v$1$j$×I1$rv$+C1$w$1$j$×I1$rw$ as a determinant like the determinant (50) enables the following determinant to be obtained:

$$\begin{bmatrix} I1ru \\ I1rv \\ I1rw \end{bmatrix} = \begin{bmatrix} 1+C1u1u & C1v1u & C1w1u \\ C1u1v & 1+C1v1v & C1w1v \\ C1u1w & C1v1w & 1+C1w1w \end{bmatrix}^{-1} \times \begin{bmatrix} I1mu \\ I1mv \\ I1mw \end{bmatrix} \quad (51)$$

As described above, the simultaneous equations (49) and the determinant (50) can be simplified, making it possible to reduce the calculation processing of, for example, the microcomputer 300. In this modification, only acquiring a measured value of each phase current for the first motor 11 simultaneously at a given measurement time enables the true value of each phase current for the first motor 11 to be calculated, making it possible to reduce the processing load of, for example, the microcomputer 300 to a trouble-free level.

Like the first motor 11, the equation for the second motor 12 included in the simultaneous equations (49) becomes simplified as the equation I2$mj$=I2$rj$+C2$u$2$j$×I2$ru$+C2$v$2$j$×I2$rv$+C2$w$2$j$×I2$rw$. Like the first motor 11, the simplified equation I2$mj$=I2$rj$+C2$u$2$j$×I2$ru$+C2$v$2$j$×I2$rv$+C2$w$2$j$×I2$rw$ can be expressed as a determinant like the determinant (51). This therefore contributes to reduction in the processing load of, for example, the microcomputer 300.

The above equations and determinants described in the above embodiments can be applied to cases where each phase current flowing through a corresponding power line has, in addition to fundamental frequency components, other frequency components. For example, if each phase current flowing through a corresponding power line for the first motor 11 additionally has nth harmonic frequency components, the true values Irk (Iru, Irv, and Irw) of the k-phase currents in the equation (3) can be expressed by the following equations (52) to (54).

Replacing (i) the term "A1× sin $(\theta 1+\phi 1)$" in the equation (5) to be replaced with the right-hand side of the equation (52), (ii) the term "A1×sin $(\theta 1-2\pi/3+\phi 1)$" in the equation (5) to be replaced with the right-hand side of the equation (53), and (iii) the term "A1× sin $(\theta 1+2\pi/3+\phi 1)$" in the equation (5) to be replaced with the right-hand side of the equation (54) enables the error I11$ej$ to be calculated for cases where each phase current flowing through a corresponding power line for the first motor 11 additionally has nth harmonic frequency components.

$$I1ru = A1 \times \sin(\theta 1 + \phi 1) + A1_2 \sin(2\theta 1 + \phi 1_2) + \ldots + A1_n \sin(n\theta 1 + \phi 1_n) \quad (52)$$

-continued $$I1rv = A1 \times \sin\left(\theta1 - \frac{2}{3}\pi + \phi1\right) + \tag{53}$$

$$A1_2\sin\left(2\theta1 - \frac{2}{3}\pi + \phi1_2\right) + \dots + A1_n\sin\left(n\theta1 - \frac{2}{3}\pi + \phi1_n\right)$$

$$I1rw = A1 \times \sin\left(\theta1 + \frac{2}{3}\pi + \phi1\right) + \tag{54}$$

$$A1_2\sin\left(2\theta1 + \frac{2}{3}\pi + \phi1_2\right) + \dots + A1_n\sin\left(n\theta1 + \frac{2}{3}\pi + \phi1_n\right)$$

Similarly, if each phase current flowing through a corresponding power line for the first motor 11 additionally has nth harmonic frequency components, the equation (11) can be expressed as the following equation (55). Similarly, the other equations can be modified to be applied to cases where each phase current flowing through a corresponding power line has, in addition to fundamental frequency components, other frequency components. Additionally, if the amplitudes and/or the current phases of U-, V-, and W-phase currents of at least one of the first and second motors 11 and 12, the methods described set forth above can calculate the error and/or true value of each phase current of the at least one of the first and second motors 11 and 12.

$$I11ej = A1 \times X_1\sin(\theta1 + \phi1 + Y_1) + \tag{55}$$

$$A1_2 \times X_1\sin(2\theta1 + \phi1_2 + Y_1) + \dots - A1_n \times X_1\sin(n\theta1 + \phi1_n + Y_1)$$

The above embodiments can achieve the following advantageous benefits.

The current measurement unit (150, 250, 350, 450, 550) is applicable to the control apparatus (10, 20, 30, 40, 50) for a multiphase rotary electric machine. The current measurement unit (150, 250, 350, 450, 550) serves as a current measurement apparatus for measuring currents flowing through multiphase power lines used for power supply to the first motor 11 as the multiphase rotary electric machine and for measuring a phase current flowing through a corresponding phase power line used for power supply to the second motor 12 as the multiphase rotary electric machine.

Specifically, the current measurement unit (150, 250, 350, 450, 550) includes the measured current acquiring unit (111, 211, 311, 411, 511), and the corrector (114, 214, 314, 414, 514).

The measured current acquiring unit (111, 211, 311, 411, 511) is configured to acquire, from a corresponding at least one current sensor, a measured value of at least one target current flowing through a corresponding phase power line.

The corrector (114, 214, 314, 414, 514) is configured to calculate the error arising in the measured value of the at least one target current due to magnetic flux generated from each of the multiphase power lines in accordance with the error factor defined for each of the multiphase power lines with respect to the at least one target phase current.

The error factor defined for each of the multiphase power lines with respect to the at least one target phase current is a constant value or a variable determined based on (i) one or more shields located between the current sensor and the corresponding one of the multiphase power lines and (ii) a distance between the current sensor and the corresponding one of the multiphase power lines. Then, the corrector (114, 214, 314, 414, 514) is configured to correct the measured value of the at least one target current based on the calculated error.

The corrector (114, 214, 314, 414, 514) simply calculates the error arising in the measured value of the at least one target current based on the error factor defined for each of the multiphase power lines with respect to the at least one target phase current; the error factor defined for each of the multiphase power lines with respect to the at least one target phase current is a constant value or a variable determined based on (i) one or more shields located between the current sensor and the corresponding one of the multiphase power lines and (ii) a distance between the current sensor and the corresponding one of the multiphase power lines. This therefore makes it possible to correct a measured value of the at least one target current while balancing both reduction of calculation load of the error and ensuring of calculation accuracy of the error.

The corrector (114, 214, 314, 414, 514) can be configured to multiply the error factor defined for each of the multiphase power lines by a current value flowing through the corresponding one of the multiphase power lines to accordingly calculate the error arising in the measured value of the at least one target current, and correct the measured value of the at least one target phase current based on the calculated error. Like the current measurement unit 250, the current measurement unit (150, 250, 350, 450, 550) can include the storage unit 240 that stores the first map created based on the first relationship between the variable of a current value through each of the multiphase power lines of the first and second motors 11 and 12 and the error factor defined for the corresponding one of the multiphase power lines. At that time, the corrector (114, 214, 314, 414, 514) can be configured to refer to the first map to accordingly correct a measured value of at least one target current.

The measured current acquiring unit (111, 211, 311, 411, 511) is configured to acquire, from a corresponding at least one current sensor, a measured value of at least one target current flowing through a corresponding at least one power line.

The electric angle acquiring unit (112, 212, 312, 412, 512) is configured to acquire a rotational angle of a multiphase rotary electric machine.

The electric angle acquiring unit (113, 213, 313, 413, 513) is configured to acquire, from the multiphase rotary electric machine, the current phase of the multiphase rotary electric machine.

The corrector (114, 214, 314, 414, 514) is configured to calculate the error arising in the measured value of the at least one target current as a function of the error factor defined for each of the multiphase power lines, the phase differences in the multiphase rotary electric machine, the acquired current amplitude of the multiphase rotary electric machine, the acquired electric angle of the multiphase rotary electric machine, and the acquired current phase of the multiphase rotary electric machine. Then, the corrector (114, 214) is configured to correct the measured value of the at least one target current based on the calculated error.

When correcting a measured value of at least pone target current, the current measurement unit (150, 250, 350, 450, 550) makes it possible to calculate the error arising in the measured value of the at least one target current based on (i) the current amplitude acquired by the current amplitude acquiring unit (130, 230, 330, 430, 530), (ii) the electric angle acquired by the electric angle acquiring unit (112, 212, 312, 412, 512), and (iii) the current phase acquired by the current phase acquiring unit (113, 213, 313, 413, 513). This therefore makes it possible to correct a measured value of the at least one target current while balancing both reduction of calculation load of the error and ensuring of calculation accuracy of the error.

The current measurement unit (150, 250, 350, 450, 550) can be applied to a control apparatus (10, 20, 30, 40, 50) for at least one multiphase rotary electric machine, and configured to execute a current measurement program for measuring a at least one target phase current flowing through a corresponding at least one power line connected to the at least one multiphase rotary electric machine to accordingly implement functions of the above functional units. The current measurement program causes, for example, the microcomputer 100 to execute a current acquiring step of acquiring, from a corresponding at least one current sensor, a measured value of at least one target current flowing through a corresponding at least one power line. Additionally, the current measurement program causes, for example, the microcomputer 100 to execute a correction step of calculating the error arising in the measured value of the at least one target current in accordance with an error factor defined for each of the multiphase power lines with respect to the at least one target phase current. The error factor defined for each of the multiphase power lines with respect to the at least one target phase current is a constant value or a variable determined based on (i) one or more shields located between the current sensor and the corresponding one of the multiphase power lines and (ii) a distance between the current sensor and the corresponding one of the multiphase power lines. Then, the current measurement program causes, for example, the microcomputer 100 to execute the correction step of correcting the measured value of the at least one target current based on the calculated error.

The current measurement unit (150, 250, 350, 450, 550) can be applied to a control apparatus (10, 20, 30, 40, 50) for at least one multiphase rotary electric machine, and configured to execute a current measurement method for measuring at least one target phase current flowing through a corresponding at least one power line connected to the at least one multiphase rotary electric machine. The current measurement method includes a current acquiring step of acquiring, from a corresponding at least one current sensor, a measured value of at least one target current flowing through a corresponding at least one power line. Additionally, the current measurement method includes a correction step of calculating the error arising in the measured value of the at least one target current in accordance with an error factor defined for each of the multiphase power lines with respect to the at least one target phase current. The error factor defined for each of the multiphase power lines with respect to the at least one target phase current is a constant value or a variable determined based on (i) one or more shields located between the current sensor and the corresponding one of the multiphase power lines and (ii) a distance between the current sensor and the corresponding one of the multiphase power lines. Then, the correction step corrects the measured value of the at least one target current based on the calculated error.

The measured current acquiring unit (111, 211, 311, 411, 511) can be configured to iteratively acquire a measured value of each phase current.

When the measured current acquiring unit (111, 211, 311, 411, 511) acquiring a measured value of the at least one target current at a present measurement time, the current amplitude acquiring unit (130, 230, 330, 430, 530) can be configured to (I) Acquire, based on corrected values (I1$b$, I2$b$) of respective previous measured values of the at least one target current, which were measured by the measured current acquiring unit (111, 211, 311, 411, 511) and corrected by the corrector (114, 214, 314, 414, 514) at respective previous measurement times, a current waveform of the corrected values (I1$b$, I2$b$) of the respective previous measured values of the at least one target phase current (II) Acquire, from the acquired current waveform, a current amplitude (A1, A2) of the multiphase rotary electric machine Correcting the measured value of the at least one target current at the present measurement time based on the high-accuracy current amplitude (A1, A2) acquired based on the corrected value (I1$b$, I2$b$) of the previous measured value of the target current enables the corrected value (I1$a$, I2$a$) of the at least one target phase current at the present measurement time to have higher accuracy.

In particular, when the measured current acquiring unit (111, 211, 311, 411, 511) acquiring a measured value of the at least one target current at a present measurement time, the current amplitude acquiring unit (130, 230, 330, 430, 530) can be configured to calculate a waveform parameter related to the current amplitude (A1, A2) of the multiphase rotary electric machine in accordance with corrected values (I1$b$, I2$b$) of previous measured values of the at least one target phase current, which were measured by the measured current acquiring unit (111, 211, 311, 411, 511) and corrected by the corrector (114, 214, 314, 414, 514) at an immediately previous measurement time immediately previous to the present measurement time. Then, the current amplitude acquiring unit (130, 230, 330, 430, 530) can be configured to determine the current amplitude of the multiphase rotary electric machine based on the calculated waveform parameter. This enables the current amplitude (A1, A2) of the multiphase rotary electric machine to have much higher accuracy, making it possible to contribute a further improvement of the accuracy of the corrected value (I1$a$, I2$a$) of the target phase current at the present measurement time.

The corrector (114, 214, 314, 414, 514) can be configured to (I) Previously calculate the amplitude-correction coefficients, such as parameters X11$u$ and X21$u$, based on the predetermined error factors and the phase differences among the phase currents (II) Previously calculate the angle-correction coefficients, such as Y11$u$ and Y21$u$, based on the predetermined error factors and the phase differences among the phase currents (III) Correct the acquired current amplitude (A1, A2) based on the amplitude-correction coefficients (IV) Correct the acquired electric angle and the acquired current phase based on the angle-correction coefficients (V) Correct the measured value of the target phase current based on the corrected current amplitude, the corrected electric angle, and the corrected current phase This configuration enables the current measurement unit (150, 250, 350, 450, 550) to cyclically execute the measured-current correction routine based on the previously calculated amplitude-correction coefficients and angle-correction coefficients, resulting in reduction of the computing load of the current measurement unit (150, 250, 350, 450, 550).

The current measurement unit 250 can include the storage unit 240 in which the second map is stored; the second map represents a relationship between (i) the variable of the error arising in a measured value of the target phase current, (ii) the variable of the electric angle of the multiphase rotary electric machine, and (iii) the variable of the current phase of the multiphase rotary electric machine. This enables the corrector 214 to refer to the second map based on the acquired electric angle and the acquired current phase to accordingly correct the measured value of the target phase current.

Let us assume that the current measurement apparatus set forth above is applied to a control apparatus for a plurality of multiphase rotary electric machines.

In this assumption, the corrector (114, 214, 413) can be configured to calculate, for each multiphase rotary electric machine, an error in a measured value of at least one target current in accordance with (i) predetermined error factors, (ii) phase differences among all the phase currents, (iii) an acquired current amplitude, (iv) an acquired electric angle, and (v) an acquired current phase. Then, the corrector can be configured to correct the measured value of each phase based on the errors respectively calculated for all the phase currents of all the multiphase rotary electric machines.

The corrector (114, 214, 314) can be configured to calculate a time difference, such as a time difference dt41, between (i) a first measurement time, such as a measurement time tm1, at which a value of at least one target current flowing through a corresponding power line connected to a first multiphase rotary electric machine is measured and (ii) a second measurement time, such as a measurement time tm4, of measuring a value of a phase current flowing in a second multiphase rotary electric machine. Then, the corrector (114, 214, 314) can be configured to predict an electric angle of the second rotary electric machine at the first measurement time based on the calculated time difference. This configuration enables reduction in both the measurement frequency of an electric-angle sensor for measuring the electric angle of the second rotary electric machine and the processing load of the current measurement apparatus.

When a value of at least one target phase current flowing through a corresponding power line connected to a first rotary electric machine is measured at a scheduled measurement time, the electric angle acquiring unit (112, 212, 312) can be configured to acquire an electric angle of a second rotary electric machine in synchronization with the first measurement time. This configuration uses the electric angle of the second rotary electric machine measured at the scheduled measurement time for the first rotary electric machine, which is an unscheduled measurement time for the second rotary electric machine. Accordingly, it is possible to improve the accuracy of a corrected value of the at least one target phase current.

The current amplitude acquiring unit (130, 230, 330, 430, 530) can be configured to acquire the peak amplitude of the waveform of a target phase current for a multiphase rotary electric machine during at least one electric-angular period thereof as the current amplitude of the multiphase rotary electric machine. This configuration reduces the calculation load required to calculate the current amplitude.

The current amplitude acquiring unit (130, 230, 330, 430, 530) can be configured to transform at least two-phase currents in a three-phase coordinate system flowing through at least two power lines for a multiphase rotary electric machine into two-phase currents in a rotating coordinate system or a stationary coordinate system to accordingly acquire, based on the magnitude of the current vector of the two-phase currents in the rotating coordinate system or the stationary coordinate system, the current amplitude of the multiphase rotary electric machine.

The current amplitude acquiring unit (130, 230, 330, 430, 530) can be configured to acquire the current amplitude of a multiphase rotary electric machine in accordance with a current waveform defined by current commands for controlling drive of the multiphase rotary electric machine. This enables the current amplitude acquiring unit (130, 230, 330, 430, 530) to acquire the current amplitude of the multiphase rotary electric machine only each time the current waveform is changed, making it possible to reduce the load required to acquire the current amplitude. The current phase acquiring unit (113, 213, 313, 413, 513) can be configured to acquire a commanded current phase defined by the current commands for controlling drive of the multiphase rotary electric machine as the current phase of the multiphase rotary electric machine.

The current measurement unit (150, 250, 350, 450, 550) is more preferably applied to a control apparatus equipped with current sensors, such as the current sensors S1$u$, S1$v$, S1$w$, S2$u$, S2$v$, and S2$w$, each of which is configured to measure magnetic flux caused by a current flowing through a corresponding power line to accordingly measure the current.

Each phase current flowing through a corresponding power line can have, in addition to fundamental frequency components, other frequency components. In this modification, like cases that consider merely the fundamental frequency components of each phase current, it is possible to simply calculate an error arising in a measured value of at least one target current based on the error factor defined for each of the multiphase power lines with respect to the at least one target phase current. The error factor defined for each of the multiphase power lines with respect to the at least one target phase current is a constant value or a variable determined based on (i) one or more shields located between the current sensor and the corresponding one of the multiphase power lines and (ii) a distance between the current sensor and the corresponding one of the multiphase power lines. This therefore makes it possible to correct a measured value of the at least one target current while balancing both reduction of calculation load of the error and ensuring of calculation accuracy of the error.

The controllers and their control methods described in the present disclosure can be implemented by a dedicated computer including a memory and a processor programmed to perform one or more functions embodied by one or more computer programs.

The controllers and their control methods described in the present disclosure can also be implemented by a dedicated computer including a processor comprised of one or more dedicated hardware logic circuits.

The controllers and their control methods described in the present disclosure can further be implemented by a processor system comprised of a memory, a processor programmed to perform one or more functions embodied by one or more computer programs, and one or more hardware logic circuits.

The one or more computer programs can be stored in a non-transitory storage medium as instructions to be carried out by a computer or a processor.

FIRST CONFIGURATION

A current measurement apparatus (150, 250, 350, 450, 550), applicable to a control apparatus for at least one multiphase rotary electric machine, for measuring phase currents flowing through respective multiphase power lines used for power supply to the at least one multiphase rotary electric machine, the current measurement apparatus including:

a measured current acquiring unit (111, 211, 311, 411, 511) configured to acquire, from a current sensor, a measured value of at least one target phase current flowing through a corresponding at least one target phase power line included in the multiphase power lines; and a corrector (114, 214, 314, 414, 514) configured to:

calculate an error arising in the measured value of the at least one target phase current due to magnetic flux generated from each of the multiphase power lines in accordance with an error factor defined for each of the multiphase power lines with respect to the at least one target phase current, the error factor defined for each of the multiphase power lines with respect to the at least one target phase current being a constant value or a variable determined based on (i) one or more shields located between the current sensor and the corresponding one of the multiphase power lines and (ii) a distance between the current sensor and the corresponding one of the multiphase power lines; and correct the measured value of the at least one target phase current based on the calculated error.

SECOND CONFIGURATION

The current measurement apparatus according to the first configuration, wherein:

the corrector is configured to:

multiply the error factor defined for each of the multiphase power lines by a current value flowing through the corresponding one of the multiphase power lines to accordingly calculate the error arising in the measured value of the at least one target current; and correct the measured value of the at least one target phase current based on the calculated error.

Third Configuration

The current measurement apparatus according to the first configuration, further including:

a storage unit (240) configured to store a first map created based on a relationship between a variable of a current value through each of the multiphase power lines and the error factor defined for the corresponding one of the multiphase power lines, wherein the corrector is configured to:

refer to the first map to accordingly calculate the error arising in the measured value of the at least one target current; and correct the measured value of the at least one target phase current.

FOURTH CONFIGURATION

The current measurement apparatus according to any one of the first to third configurations, further including:

a current amplitude acquiring unit (130, 230, 430, 530) configured to acquire, from the at least one multiphase rotary electric machine, an amplitude of a waveform of a selected phase current in the phase currents as a current amplitude of the at least one multiphase rotary electric machine;

an electric angle acquiring unit (112, 212, 312, 412, 512) configured to acquire an electric angle of the at least one multiphase rotary electric machine; and a current phase acquiring unit configured to acquire a current phase of the at least one multiphase rotary electric machine, wherein:

the corrector is configured to:

calculate the error arising in the measured value of the at least one target phase current as a function of (i) the error factor defined for each of the multiphase power lines, (ii) one or more phase differences among the phase currents, (iii) the acquired electric angle, and (iv) the acquired current phase; and correct the measured value of the at least one target phase current based on the calculated error.

FIFTH CONFIGURATION

The current measurement apparatus according to the fourth configuration, wherein:

the measured current acquiring unit is configured to iteratively acquire the measured value of the at least one target phase current; and the current amplitude acquiring unit is configured to:

acquire, based on corrected values of respective previous measured values of the at least one target current, which were measured by the measured current acquiring unit and corrected by the corrector at respective previous measurement times, a current-waveform parameter of the corrected values of the respective previous measured values of the at least one target phase current; and acquire, from the acquired current-waveform, the current amplitude of the at least one multiphase rotary electric machine.

SIXTH CONFIGURATION

The current measurement apparatus according to the fourth configuration, wherein:

the current amplitude acquiring unit is configured to:

calculate a waveform parameter related to the current amplitude of the at least one multiphase rotary electric machine in accordance with the corrected values of the previous measured values of the at least one target phase current, which were measured by the measured current acquiring unit and corrected by the corrector at one of the previous measurement time immediately previous to the present measurement time; and determine the current amplitude of the at least one multiphase rotary electric machine based on the calculated waveform parameter.

SEVENTH CONFIGURATION

The current measurement apparatus according to any one of the fourth to sixth configurations, wherein:

the corrector is configured to:

store a previously calculated amplitude-correction coefficient based on the error factor defined for each of the multiphase power lines and the phase differences among in the at least one multiphase rotary electric machine;

store a previously calculated angle-correction coefficient based on the error factor defined for each of the multiphase power lines and the phase differences among in the at least one multiphase rotary electric machine;

correct the acquired current amplitude based on the amplitude-correction coefficient;

correct the acquired electric angle and the acquired current phase based on the angle-correction coefficient; and correct the measured value of the at least one target phase current based on the corrected current amplitude, the corrected electric angle, and the corrected current phase.

EIGHTH CONFIGURATION

The current measurement apparatus according to any one of the fourth to sixth configurations, further including:

a storage unit (240) configured to store a second map, the second map representing a relationship between (i) a variable of the error arising in the measured value of the at least one target phase current, (ii) a variable of the electric angle of the at least one multiphase rotary electric machine, and (iii) a variable of the current phase of the at least one multiphase rotary electric machine, wherein the corrector is configured to:

refer to the second map based on a value of the electric angle of the at least one multiphase rotary electric machine and a value of the current phase of the at least one multiphase rotary electric machine to accordingly retrieve, from the second map, a value of the error arising in the measured value of the at least one target current; and correct the measured value of the at least one target phase current based on the retrieved value of the error arising in the measured value of the at least one target current.

NINTH CONFIGURATION

The current measurement apparatus according to any one of the fourth to eighth configurations, wherein:

the at least one multiphase rotary electric machine comprises at least a first multiphase rotary electric machine and a second multiphase rotary electric machine;

the control apparatus is configured to control the at least first multiphase rotary electric machine and the second multiphase rotary electric machine; and the corrector is configured to:

calculate the error arising in the measured value of the at least one target phase current connected to each of the first and second rotary electric machines in accordance with (i) the error factor defined for each of all the multiphase power lines of the first and second rotary electric machines, (ii) the one or more phase differences in each of the first and second multiphase rotary electric machines, (iii) the acquired electric angle of each of the first and second rotary electric machines, and (iv) the acquired current phase of each of the first and second rotary electric machines; and correct the measured value of the at least one target phase current based on the calculated error.

TENTH CONFIGURATION

The current measurement apparatus according to the ninth configuration, wherein:

the corrector is configured to:

calculate a time difference between a first measurement time at which the measured value of the at least one target phase current flowing through the corresponding at least one target power line connected to the first rotary electric machine is acquired by the measured current acquiring unit and a second measurement time at which the measured value of the at least one target phase current flowing through the corresponding at least one target power line connected to the second rotary electric machine is acquired by the measured current acquiring unit; and predict, based on the calculated time difference, an electric angle of the second rotary electric machine at the first measurement time.

ELEVENTH CONFIGURATION

The current measurement apparatus according to the ninth configuration, wherein:

the electric angle acquiring unit is configured to acquire the electric angle of the second rotary electric machine in synchronization with a first measurement time at which the measured value of the at least one target phase current flowing through the corresponding at least one target power line connected to the first rotary electric machine is acquired by the measured current acquiring unit.

TWELFTH CONFIGURATION

The current measurement apparatus according to any one of the fourth to eleventh configurations, wherein:

the current amplitude acquiring unit is configured to acquire a peak amplitude of the waveform of the selected phase current during at least one electric-angular period of the at least one multiphase rotary electric machine as the current amplitude of the at least one multiphase rotary electric machine.

THIRTEENTH CONFIGURATION

The current measurement apparatus according to any one of the fourth to eleventh configurations, wherein:

the current amplitude acquiring unit is configured to transform at least two-phase currents in the phase currents in a three-phase coordinate system flowing through at least two power lines included in the multiphase power lines into two-phase currents in a rotating coordinate system or a stationary coordinate system to accordingly acquire, based on a magnitude of a current vector of the two-phase currents in the rotating coordinate system or the stationary coordinate system, the current amplitude of the at least one multiphase rotary electric machine.

FOURTEENTH CONFIGURATION

The current measurement apparatus according to any one of the fourth to thirteenth configurations, wherein:

the current amplitude acquiring unit is configured to acquire the current amplitude of the at least one multiphase rotary electric machine in accordance with a current waveform defined by current commands for controlling drive of the at least one multiphase rotary electric machine; and the current phase acquiring unit is configured to acquire a commanded current phase defined by the current commands as the current phase of the at least one multiphase rotary electric machine.

FIFTEENTH CONFIGURATION

The current measurement apparatus according to any one of the first to fourteenth configurations, wherein:
the current sensor is configured to measure target magnetic flux generated by the at least one target phase current flowing through the corresponding at least one target phase power line to accordingly measure the at least one target phase current.

SIXTEENTH CONFIGURATION

The current measurement apparatus according to any one of the first to fifteenth configurations, wherein:
each of the phase currents flowing through the respective multiphase power lines has fundamental frequency components and other frequency components.

SEVENTEENTH CONFIGURATION

A current measurement program, applicable to a control apparatus for at least one multiphase rotary electric machine, for measuring phase currents flowing through respective multiphase power lines used for power supply to the at least one multiphase rotary electric machine, the current measurement program causes a computer to execute:
a measured current acquiring step of acquiring, from a current sensor, a measured value of at least one target phase current flowing through a corresponding at least one target phase power line included in the multiphase power lines; and
a correction step of:
calculating an error arising in the measured value of the at least one target phase current due to magnetic flux generated from each of the multiphase power lines in accordance with an error factor defined for each of the multiphase power lines with respect to the at least one target phase current,
the error factor defined for each of the multiphase power lines with respect to the at least one target phase current being a constant value or a variable determined based on (i) one or more shields located between the current sensor and the corresponding one of the multiphase power lines and (ii) a distance between the current sensor and the corresponding one of the multiphase power lines; and
correcting the measured value of the at least one target phase current based on the calculated error.

EIGHTEENTH CONFIGURATION

A current measurement method, applicable to a control apparatus for at least one multiphase rotary electric machine, for measuring phase currents flowing through respective multiphase power lines used for power supply to the at least one multiphase rotary electric machine, the current measurement method comprising:
a measured current acquiring step of acquiring, from a current sensor, a measured value of at least one target phase current flowing through a corresponding at least one target phase power line included in the multiphase power lines; and a correction step of:
calculating an error arising in the measured value of the at least one target phase current due to magnetic flux generated from each of the multiphase power lines in accordance with an error factor defined for each of the multiphase power lines with respect to the at least one target phase current,
the error factor defined for each of the multiphase power lines with respect to the at least one target phase current being a constant value or a variable determined based on (i) one or more shields located between the current sensor and the corresponding one of the multiphase power lines and (ii) a distance between the current sensor and the corresponding one of the multiphase power lines; and
correcting the measured value of the at least one target phase current based on the calculated error.

While the illustrative embodiments of the present disclosure have been described herein, the present disclosure is not limited to the embodiments and their configurations described herein, but includes any and all modifications and/or alternations as long as they are within a range of equivalency of the present disclosure. Additionally, (i) various combinations and embodiments and (ii) modified combinations and embodiments, which can be formed by adding one or more elements to the various combinations and embodiments are within the scope and technical idea of the present disclosure.

The invention claimed is:

1. A current measurement apparatus, applicable to a control apparatus for at least one multiphase rotary electric machine, for measuring phase currents from respective phase current sensors, the phase currents flowing through respective multiphase power lines used for power supply to the at least one multiphase rotary electric machine, the current measurement apparatus comprising:
a measured current acquiring unit configured to acquire, from a target-phase current sensor of the phase current sensors, a measured value of a target-phase current flowing through a corresponding target-phase power line included in the multiphase power lines; and
a corrector configured to:
calculate an error arising in the measured value of the target-phase current due to magnetic flux generated from each of the multiphase power lines in accordance with a target-phase error factor and an other-phase error factor,
the target-phase error factor being a constant value or a variable and being defined for a target-phase power line for the target phase current included in the multiphase power lines, the target-phase error factor being determined based on (i) one or more shields located between the target-phase current sensor and the target-phase power line and (ii) a distance between the target-phase current sensor and the target-phase power line,
the other-phase error factor being a constant value or a variable and being defined for at least one other-phase power line included in the multiphase power lines except for the target phase power line, the other-phase error factor being determined based on (i) one or more shields located between the target-phase current sensor and the at least one other-phase multiphase power line and (ii) a distance between the target-phase current sensor and the at least one other-phase multiphase power line; and correct the measured value of the target-phase current based on the calculated error.

2. The current measurement apparatus according to claim 1, wherein:

the corrector is configured to:

multiply the target-phase error factor defined for the target-phase power line by a current value flowing through the target-phase power line to calculate a first value;

multiply the other-phase error factor defined for the at least one other-phase power line by a current value flowing through the at least one other-phase power line to calculate a second value; and calculate a sum of the first value and the second value to accordingly calculate the error arising in the measured value of the target current.

3. The current measurement apparatus according to claim 1, further comprising:

a storage unit configured to store a first map created based on a relationship between a variable of a current value through each of the multiphase power lines, the target-phase error factor defined for the target-phase power line, and the other-phase error factor defined for the at least one other-phase power line, wherein the corrector is configured to:

refer to the first map to accordingly calculate the error arising in the measured value of the target-phase current; and correct the measured value of the target-phase current.

4. The current measurement apparatus according to claim 1, further comprising:

a current amplitude acquiring unit configured to acquire, from the at least one multiphase rotary electric machine, an amplitude of a waveform of a selected phase current in the phase currents as a current amplitude of the at least one multiphase rotary electric machine;

an electric angle acquiring unit configured to acquire an electric angle of the at least one multiphase rotary electric machine; and a current phase acquiring unit configured to acquire a current phase of the at least one multiphase rotary electric machine, wherein:

the corrector is configured to:

calculate the error arising in the measured value of the target-phase current as a function of (i) the target-phase error factor defined for the target-phase power line, (ii) the other-phase error factor defined for the at least one other-phase power line, (iii) one or more phase differences among the phase currents, (iv) the acquired electric angle, and (v) the acquired current phase; and correct the measured value of the target-phase current based on the calculated error.

5. The current measurement apparatus according to claim 4, wherein:

the measured current acquiring unit is configured to iteratively acquire the measured value of the target-phase current; and the current amplitude acquiring unit is configured to:

acquire, based on corrected values of respective previous measured values of the target-phase current, which were measured by the measured current acquiring unit and corrected by the corrector at respective previous measurement times, a current-waveform parameter of the corrected values of the respective previous measured values of the target-phase current; and acquire, from the acquired current-waveform, the current amplitude of the at least one multiphase rotary electric machine.

6. The current measurement apparatus according to claim 4, wherein:

the current amplitude acquiring unit is configured to:

calculate a waveform parameter related to the current amplitude of the at least one multiphase rotary electric machine in accordance with the corrected values of the previous measured values of the target-phase current, which were measured by the measured current acquiring unit and corrected by the corrector at one of the previous measurement time immediately previous to the present measurement time; and determine the current amplitude of the at least one multiphase rotary electric machine based on the calculated waveform parameter.

7. The current measurement apparatus according to claim 4, wherein:

the corrector is configured to:

store a previously calculated target-phase amplitude-correction coefficient based on the target-phase error factor defined for the target-phase power line, the other-phase error factor defined for the at least one other-phase power line, and the phase differences among in the at least one multiphase rotary electric machine;

store a previously calculated target-phase angle-correction coefficient based on the target-phase error factor defined for the target-phase power line, the other-phase error factor defined for the at least one other-phase power line, and the phase differences among in the at least one multiphase rotary electric machine;

correct the acquired current amplitude based on the amplitude-correction coefficient;

correct the acquired electric angle and the acquired current phase based on the angle-correction coefficient; and correct the measured value of the target-phase current based on the corrected current amplitude, the corrected electric angle, and the corrected current phase.

8. The current measurement apparatus according to claim 4, further comprising:

a storage unit configured to store a second map, the second map representing a relationship between (i) a variable of the error arising in the measured value of the target-phase current, (ii) a variable of the electric angle of the at least one multiphase rotary electric machine, and (iii) a variable of the current phase of the at least one multiphase rotary electric machine, wherein the corrector is configured to:

refer to the second map based on a value of the electric angle of the at least one multiphase rotary electric machine and a value of the current phase of the at least one multiphase rotary electric machine to accordingly retrieve, from the second map, a value of the error arising in the measured value of the target-phase current; and correct the measured value of the target-phase current based on the retrieved value of the error arising in the measured value of the at least one target current.

9. The current measurement apparatus according to claim 4, wherein:

the at least one multiphase rotary electric machine comprises at least a first multiphase rotary electric machine and a second multiphase rotary electric machine;

the control apparatus is configured to control the at least first multiphase rotary electric machine and the second multiphase rotary electric machine; and the corrector is configured to:

calculate the error arising in the measured value of the target-phase current connected to each of the first and second rotary electric machines in accordance with (i) the target-phase error factor defined for the target-phase power line of the corresponding one of the first and second rotary electric machines, (ii) the other-phase error factor defined for the at least one other-phase power line of the corresponding one of the first and second rotary electric machines, (iii) the one or more phase differences in each of the first and second multiphase rotary electric machines, (iv) the acquired electric angle of each of the first and second rotary electric machines, and (v) the acquired current phase of each of the first and second rotary electric machines; and correct the measured value of the target-phase current based on the calculated error.

10. The current measurement apparatus according to claim 9, wherein:

the corrector is configured to:

calculate a time difference between a first measurement time at which the measured value of the target-phase current flowing through the target-phase power line connected to the first rotary electric machine is acquired by the measured current acquiring unit and a second measurement time at which the measured value of the target-phase current flowing through the target-phase power line connected to the second rotary electric machine is acquired by the measured current acquiring unit; and predict, based on the calculated time difference, an electric angle of the second rotary electric machine at the first measurement time.

11. The current measurement apparatus according to claim 9, wherein:

the electric angle acquiring unit is configured to acquire the electric angle of the second rotary electric machine in synchronization with a first measurement time at which the measured value of the target-phase current flowing through the corresponding target-phase power line connected to the first rotary electric machine is acquired by the measured current acquiring unit.

12. The current measurement apparatus according to claim 4, wherein:

the current amplitude acquiring unit is configured to acquire a peak amplitude of the waveform of the selected phase current during at least one electric-angular period of the at least one multiphase rotary electric machine as the current amplitude of the at least one multiphase rotary electric machine.

13. The current measurement apparatus according to claim 4, wherein:

the current amplitude acquiring unit is configured to transform at least two-phase currents in the phase currents in a three-phase coordinate system flowing through at least two power lines included in the multiphase power lines into two-phase currents in a rotating coordinate system or a stationary coordinate system to accordingly acquire, based on a magnitude of a current vector of the two-phase currents in the rotating coordinate system or the stationary coordinate system, the current amplitude of the at least one multiphase rotary electric machine.

14. The current measurement apparatus according to claim 4, wherein:

the current amplitude acquiring unit is configured to acquire the current amplitude of the at least one multiphase rotary electric machine in accordance with a current waveform defined by current commands for controlling drive of the at least one multiphase rotary electric machine; and the current phase acquiring unit is configured to acquire a commanded current phase defined by the current commands as the current phase of the at least one multiphase rotary electric machine.

15. The current measurement apparatus according to claim 1, wherein:

the current sensor is configured to measure target magnetic flux generated by the target-phase current flowing through the target-phase power line to accordingly measure the target-phase current.

16. The current measurement apparatus according to claim 1, wherein:

each of the phase currents flowing through the respective multiphase power lines has fundamental frequency components and other frequency components.

17. A current measurement program, applicable to a control apparatus for at least one multiphase rotary electric machine, for measuring phase currents from respective phase current sensors, the phase currents flowing through respective multiphase power lines used for power supply to the at least one multiphase rotary electric machine, the current measurement program causing a computer to execute:

a measured current acquiring step of acquiring, from a target-phase current sensor of the phase current sensors, a measured value of a target-phase current flowing through a corresponding target-phase power line included in the multiphase power lines; and a correction step of:

calculating an error arising in the measured value of the target-phase current due to magnetic flux generated from each of the multiphase power lines in accordance with a target-phase error factor and an other-phase error factor, the target-phase error factor being a constant value or a variable and being defined for a target-phase power line for the target phase current included in the multiphase power lines, the target-phase error factor being determined based on (i) one or more shields located between the target-phase current sensor and the target-phase power line and (ii) a distance between the target-phase current sensor and the target-phase power line, the other-phase error factor being a constant value or a variable and being defined for at least one other-phase power line included in the multiphase power lines except for the target phase power line, the other-phase error factor being determined based on (i) one or more shields located between the target-phase current sensor and the at least one other-phase multiphase power line and (ii) a distance between the target-phase current sensor and the at least one other-phase multiphase power line; and correcting the measured value of the target-phase current based on the calculated error.

18. A current measurement method, applicable to a control apparatus for at least one multiphase rotary electric machine, for measuring phase currents from respective phase current sensors, the phase currents flowing through respective multiphase power lines used for power supply to the at least one multiphase rotary electric machine, the current measurement method comprising:

a measured current acquiring step of acquiring, from a target-phase current sensor of the phase current sensors, a measured value of a target-phase current flowing through a corresponding target-phase power line included in the multiphase power lines; and a correction step of:

calculating an error arising in the measured value of the target-phase current due to magnetic flux generated from each of the multiphase power lines in accordance with a target-phase error factor and an other-phase error factor, the target-phase error factor being a constant value or a variable and being defined for a target-phase power line for the target phase current included in the multiphase power lines, the target-phase error factor being determined based on (i) one or more shields located between the target-phase current sensor and the target-phase power line and (ii) a distance between the target-phase current sensor and the target-phase power line, the other-phase error factor being a constant value or a variable and being defined for at least one other-phase power line included in the multiphase power lines except for the target phase power line, the other-phase error factor being determined based on (i) one or more shields located between the target-phase current sensor and the at least one other-phase multiphase power line and (ii) a distance between the target-phase current sensor and the at least one other-phase multiphase power line; and correcting the measured value of the target-phase current based on the calculated error.

\* \* \* \* \*